United States Patent [19]
Mital

[11] Patent Number: 5,903,652
[45] Date of Patent: *May 11, 1999

[54] SYSTEM AND APPARATUS FOR MONITORING SECURE INFORMATION IN A COMPUTER NETWORK

[75] Inventor: Amit Mital, Kirkland, Wash.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/753,360

[22] Filed: Nov. 25, 1996

[51] Int. Cl.$^6$ .............................. H04L 9/00; H04K 1/00
[52] U.S. Cl. .............................. 380/25; 380/24; 380/49; 705/26
[58] Field of Search .................. 380/24, 25, 49; 705/1, 18, 26, 27, 34, 39, 40, 42, 44

[56] References Cited

U.S. PATENT DOCUMENTS

| | | | |
|---|---|---|---|
| 4,405,829 | 9/1983 | Rivest et al. | 380/30 |
| 4,799,156 | 1/1989 | Shavit et al. | 705/26 |
| 4,995,082 | 2/1991 | Schnorr | 380/23 |
| 5,231,668 | 7/1993 | Kravitz | 380/28 |
| 5,319,542 | 6/1994 | King, Jr. et al. | 705/27 |
| 5,347,632 | 9/1994 | Filepp et al. | 395/200.32 |
| 5,420,926 | 5/1995 | Low et al. | 380/24 |
| 5,461,708 | 10/1995 | Kahn | 345/440 |
| 5,592,378 | 1/1997 | Cameron et al. | 705/27 |
| 5,671,279 | 9/1997 | Elgamal | 380/23 |
| 5,715,314 | 2/1998 | Payne et al. | 380/24 |

*Primary Examiner*—Gail O. Hayes
*Assistant Examiner*—Pinchus M. Laufer
*Attorney, Agent, or Firm*—Leydig, Voit & Mayer, Ltd.

[57] ABSTRACT

A secure transaction system apparatus and method provide for the auditing of secure messages in a computer network. The secure transaction system includes an electronic commerce service which is in communication with multiple consumer computers and multiple merchant computers. The consumer computers initiate consumer transactions between the consumer computers and the merchant computers. Each consumer transaction can include different items, different merchants, different shipping methods and different payment instructions. An order object within the consumer computer stores summaries about the different items, the different merchants, the different shipping methods and different payment instructions during creation of each commercial transaction. While generating transaction data, the consumer computer also generates related audit data. The consumer computers encrypt the transaction data and the audit data into different encryption formats and send the encrypted transaction data and the encrypted audit data to the electronic commerce service. The electronic commerce service decrypts the audit data and stores copies of the encrypted transaction data. The electronic commerce service also routes the encrypted transaction data to the merchant computers. The merchant computers decrypt the encrypted transaction data and complete the desired commercial transaction. Thus, the electronic commerce service can audit secure transactions while maintaining confidentiality.

18 Claims, 18 Drawing Sheets

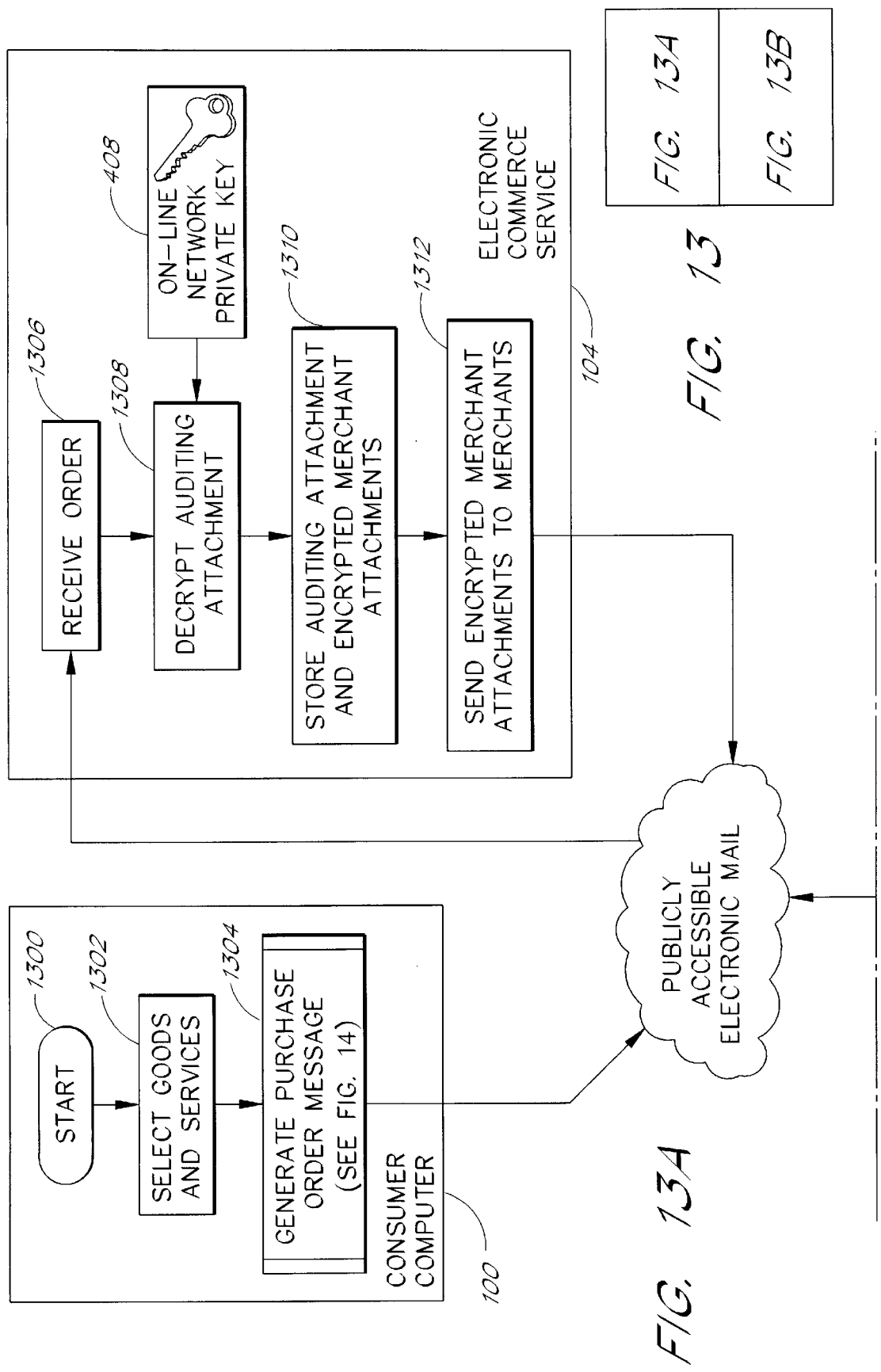

SYSTEM AND APPARATUS FOR MONITORING SECURE INFORMATION IN A COMPUTER NETWORK

BACKGROUND OF THE INVENTION

1. Field of the Invention

This invention relates to computer network communication systems and, more particularly, to a system for monitoring secure commercial transactions in a computer network.

2. Background

Electronic commerce is currently expanding at a rapid rate. With the proliferation of low-cost electronic communication techniques, consumers, purchasing agents, merchants, suppliers, manufacturers, credit companies, banks and other institutions continue to expand their use of electronic commercial transaction technology. Wide scale use of commercial transactions, however, require wide scale accessibility.

In order to cost-effectively provide wide scale accessibility, commercial transaction systems must not only operate with private communication networks, but also operate with general purpose publicly accessible networks such as the internet or publicly accessible network service providers. Because publicly accessible networks have much larger numbers of users, they often provide lower transmission costs than private communication networks. Unfortunately, eavesdroppers and other intermediaries have regular and easy access to electronic messages transported on publicly accessible networks.

As a result, publicly accessible networks are not secure. Accordingly, methods have been developed to create electronic documents which are private and secure from unauthorized use. In conventional systems, an electronic document is usually converted into a secret form before transmission over the publicly accessible network. The process of converting information into a secret form is called "encryption" and a converted document is called an "encrypted" document.

When the encrypted document arrives at its destination, the encrypted document is converted back to its original form. The process of converting an encrypted document into readable form is called "decryption" and the readable document is called a "decrypted" document. A basic introduction to encryption and decryption is described in the text written by Bruce Schneier entitled *"Applied Cryptography: Protocols, Algorithms And Source Code In C,"* published by John Wiley & Sons, 1994, which is hereby incorporated herein by reference.

Typically, secure documents rely on what are called "keys" to encrypt and decrypt secure documents in a particular manner. In encryption, the key is a word, number or encryption format which "locks" the document from unauthorized viewing. In decryption, a matching key is then used to "unlock" or translate the encrypted document back into readable form. Thus, an encryption key is analogous to a mechanical key which locks a door while the decryption key is analogous to a mechanical key which unlocks a door.

One technique called "public key/private key" encryption uses two different keys. The first key is called a public key and it is used to encrypt a document. The second key is called a private key and it is used to decrypt the encrypted document. This is analogous to a door lock with two keys, anyone who owns the public key can lock the door, but only the person who owns the private key can unlock the door. In conventional systems, the public key is publicly disseminated while the private key is kept private.

For example, assume that a computer user named Aaron wishes to receive encrypted information. Aaron first directs his computer to create a public key and a private key pair. Aaron then keeps his private key private while freely distributing his public key to other computer users. If another computer user named Barry wishes to send a document to Aaron, Barry directs his computer to encrypt the document with Aaron's public key and also directs his computer to send the encrypted document to Aaron. When Aaron's computer receives the encrypted document, it decrypts the encrypted document with Aaron's private key. Thus, while Barry and other computer users can send encrypted documents to Aaron, only Aaron can decrypt and read the document.

Besides providing security, current systems also use encryption techniques to authenticate or "digitally sign" a document. While digital signatures authenticate documents, digital signatures differ significantly from hand written signatures in that a digital signature "signs" a document by encrypting a portion of the document in a unique manner.

For example, if a computer user named Carl wishes to digitally sign an electronic document, Carl first directs his computer to create a public key private key pair. Carl's computer then digitally signs the electronic document by encrypting a portion of the document with Carl's private key. Carl can then direct his computer to send the document and Carl's public key to another computer user. In this example, the other computer user is named Doug. When Doug receives the electronic document and Carl's public key, Doug can direct his computer to verify Carl's digital signature by comparing the digitally signed portion of the document with Carl's public key to see if a predefined mathematical relationship exists. If so, the digital signature is authenticated. Because only Carl can properly encrypt the digital signature with his private key, other computer users cannot fraudulently sign the document.

Finally, the security techniques and digital signature techniques can be combined to create secure documents which contain digital signatures. For example, assume that two computer users named Eric and Frank wish to transmit digitally-signed secure documents. In this example, both Eric and Frank create public key/private key pairs. If Frank wishes to receive secure documents he sends his public key to Eric. Eric then directs his computer to generate an electronic document and digitally signs a portion of the electronic document with Eric's private key. Next, Eric directs his computer to encrypt the digitally-signed electronic document with Frank's public key. Eric then sends the encrypted, digitally-signed document and Eric's public key to Frank.

When Frank's computer receives the encrypted, digitally-signed document, it decrypts digitally-signed document with Frank's private key. Because only Frank's computer can decrypt the digitally-signed document, the document is secure. Frank can then verify Eric's digital signature by directing his computer to compare the encrypted digital signature to Eric's public key to see if a predefined mathematical relationship exists. If so, the digital signature is said to be authentic.

Such techniques are widely seen as an essential means for securing the privacy of consumers, and for authenticating the identity of consumers who exchange information on publicly accessible networks. These techniques, however, create a variety of maintenance problems for network service providers. For example, a network service provider needs information to route a secure document to its proper destination. In addition, a network service provider often desires to obtain audit information from the secure transmissions in order to properly bill transaction fees. Still further, in the event of a system crash or power outage, a network service provider needs an efficient means for locating secure documents which have been stored in a backup system.

Thus, while computer users wish to retain the privacy and the integrity of secure documents, providers of publicly accessible networks need the capability of monitoring the transmittal of secure documents to ensure proper routing, proper billing and the proper retrieval of secure documents from backup facilities. Consequently, current encryption and decryption techniques are not optimally adapted for publicly accessible networks. Accordingly, network providers need a cost-effective, flexible and secure system which can both provide secure audit information while maintaining the confidentiality of a secure document.

SUMMARY OF THE INVENTION

The present invention provides a secured transaction system which is configured to audit, store and properly route secure transactions while maintaining the confidentiality of the transaction. Confidentiality is maintained by encrypting different portions of a commercial transaction into different encryption formats.

In the preferred embodiment, the secured transaction system independently encrypts (1) goods and service information, (2) payment instructions, and (3) audit information into different encryption formats. For example, in one embodiment of the present invention, only particular merchants can access the goods and service information, while only a network service provider can access the audit information. Advantageously, the secure system of the present invention preserves transaction confidentiality while allowing low-cost, easily accessible networks to provide routing, backup and auditing services.

In a preferred embodiment of the secure transaction system, multiple consumer computers, an electronic commerce service and multiple merchant computers communicate with each other by sending secure messages over a publicly accessible network. A consumer computer displays goods and services offered by electronic catalogs, advertisements, sales brochures, electronic malls, etc. When an end-user selects an item for purchase, the consumer computer sends a secure electronic message to a network service provider. Preferably, the secure electronic message contains one or more transaction packets and an audit packet. The transaction packets and audit packets are encrypted into different encryption formats.

The consumer computer in the secured transaction system comprises several component modules. In the preferred embodiment, the consumer computer contains a consumer application module, an order manager module, a secured technology module and an electronic mail module. Typically, the component modules are loaded onto the consumer computer by and end-user. In other embodiments, the component modules can be downloaded directly from the publicly accessible network.

For example, an end-user may receive the component modules on a computer readable storage medium such as a compact disk or floppy disk. The end-user then directs the consumer computer to access the computer readable storage medium and execute the component modules. In other embodiments, the consumer component modules may be included in the computer computer's operating system. In still other embodiments, the component modules may be stored on a computer accessible storage media connected to the publicly accessible network. In such cases, the end-user directs the consumer computer to access the offerings in the publicly accessible network and download the component modules directly to the consumer computer.

The consumer application module is the user interface which appears on an end-user's computer and displays items and services offered for sale. In the preferred embodiment, it is an electronic catalog which is installed in the consumer computer. In other embodiments, the consumer application may be a client/server application or an on-line offering such as an electronic mall. As discussed in more detail below, the consumer application communicates with the order manager module in the consumer computer.

The order manager module of the preferred embodiment, creates the secure purchase order message. In particular, the order manager instantiates an order object which stores item information, shipping information and payment information. For example, if an end-user selects a watch while viewing the consumer application module, the order manager module obtains information about the watch, information about the merchant selling the watch, where to ship the watch, and how the end-user plans on paying for the watch.

Upon obtaining information about a selected item, the order manager module creates a transaction packet for each item. Preferably, the transaction packet contains 1) a goods and services order and 2) payment instructions. The goods and services order contains information about the selected item and information about the merchant selling the item. The payment instructions contains credit account information.

The order manager then directs the secured technology module to encrypt the goods and services order into a format which is only accessible by an authorized merchant. Furthermore, the order manager directs the secured technology module to encrypt the payment instructions into a format which is only accessible by an authorized payment entity such as a bank. As described in more detail below such authorized payment entities are typically called "acquirers." The order manager also combines the encrypted goods and services order and the encrypted payment instructions to create a transaction packet.

The order manager also encrypts audit information which is related to the transaction. The audit information typically contains merchant identification data which identifies each merchant associated with a particular transaction packet. In addition, the audit information comprises the value of the transaction, the number of items purchased, etc. The order manager then directs the secured technology module to encrypt the audit packet into a format which is only accessible by an authorized network service provider.

The order manager combines the encrypted transaction packet and the encrypted auditing packet to create a secure purchase order message. In the preferred embodiment, the secure purchase order message is then sent as a secure electronic mail message to the network service provider by the electronic mail module.

Another feature of the present invention includes an electronic commerce service which executes in a publicly accessible network. In the preferred embodiment, the electronic commerce service contains several component modules. The component modules include a decryption module, a secured technology module, and a bindery module. In addition, the electronic commerce service contains an electronic commerce database.

The bindery module registers transaction participants. In the preferred embodiment, the merchants register with the bindery module before they can receive secure transactions. Preferably, the merchants register their publicly accessible encryption keys with the electronic commerce service. The electronic commerce service authenticates the encryption keys and stores copies of the encryption keys in the electronic commerce database. In other embodiments, the consumers can, in a similar manner, also register their publicly accessible encryption keys with the electronic commerce service.

Once the merchants have registered with the network service provider, the decryption module receives the secure purchase order messages and directs the secured technology module to decrypt the audit attachments. Thus the decryption module is similar to an auditor which audits each of the secure purchase order messages. The decryption module also stores the decrypted audit information and a copy of the encrypted transaction packet in the electronic commerce database. The storage of the encrypted transaction packets in the electronic commerce service allows the electronic commerce service to provide backup copies in the event of a system crash or power outage.

In addition, the decryption module routes the encrypted transaction packet to the appropriate merchant computer based on the merchant identification data in the decrypted audit information. Advantageously, the decrypted audit information allows the electronic commerce service to route the encrypted transaction packet while maintaining confidentiality about the specific items and payment instructions.

An additional feature of the present invention improves the efficiency of commercial transactions involving multiple merchants. In conventional systems, when an end-user selects items sold by multiple merchants, the consumer computer typically establishes a connection with each of the merchant computers. This increases connect times, delays response time and increases costs. Advantageously, in a preferred embodiment of the present invention, the secure purchase order message contains an encrypted transaction packet for each merchant.

The electronic commerce service routes the encrypted transaction packets to the appropriate merchants. Thus, in the preferred embodiment, the consumer computer sends a single secured purchase order message to the electronic commerce service. As a result, connection times are reduced and network traffic decreases.

In a further feature, the present invention includes a merchant computer that decrypts the encrypted transaction packets. In the preferred embodiment, the merchant computer contains several component modules which not only decrypt the goods and service order portion but also the payment instruction portion of the encrypted transaction packet. The component modules include an electronic mail module, a merchant module, an acquirer module and a secured technology module.

In general, an acquirer is a credit company which services a credit account, credit card number, etc. An acquirer, however, can be any organization or institution which confirms that a purchaser has a credit account, which confirms that a purchases has sufficient funds to pay for a desired item, or which authorizes a credit purchase. For example, in one embodiment of the present invention, the acquirer may be a credit organization such as Visa, Mastercard, or American Express.

In the preferred embodiment, the merchant and the acquirer are combined into the same entity and thus the merchant not only provides the purchased items, but also conducts the credit confirmation. Thus, in the preferred embodiment, a merchant computer contains both the merchant module and the acquirer module.

Furthermore, in the preferred embodiment, the merchant component modules are stored on a computer readable storage medium such as a compact disk, hard disk or floppy disk. The merchant loads the merchant component modules into the processor of the merchant computer for execution. In other embodiments, the merchant component modules may be included in the computer computer's operating system. In still other embodiments, the merchant component modules may be stored on a computer accessible storage media connected to the publicly accessible network. In such cases, a merchant directs the merchant computer to access the offerings in the publicly accessible network and download the component modules directly to the merchant computer.

Once loaded into the merchant computer, the electronic mail module receives the encrypted transaction packets, the merchant module directs the secured technology module to decrypt the goods and services order. The merchant module then sends the encrypted payment instructions to the acquirer module. The acquirer module then directs the secured technology module to decrypt the encrypted payment instructions and processes the payment instructions to ensure that the purchaser has sufficient funds to pay for the desired item. The acquirer module then sends a payment authorization response back to the merchant module. The payment authorization response either authorizes or denies the credit request.

Once the merchant module receives the payment authorization response, the merchant module provides the goods or services requested by the end-user. For example, if the end-user has purchased a watch, the merchant module directs the merchant to ship the desired watch to the consumer computer. Upon completion of the purchase order, the merchant computer sends a receipt message back to the consumer computer.

BRIEF DESCRIPTION OF THE DRAWINGS

These and other aspects, advantages, and novel features of the invention will become apparent upon reading the following detailed description and upon reference to accompanying drawings in which:

FIGS. 13A and 13B illustrate a data flow diagram of one embodiment of the secured consumer transaction process;

Figure 1:
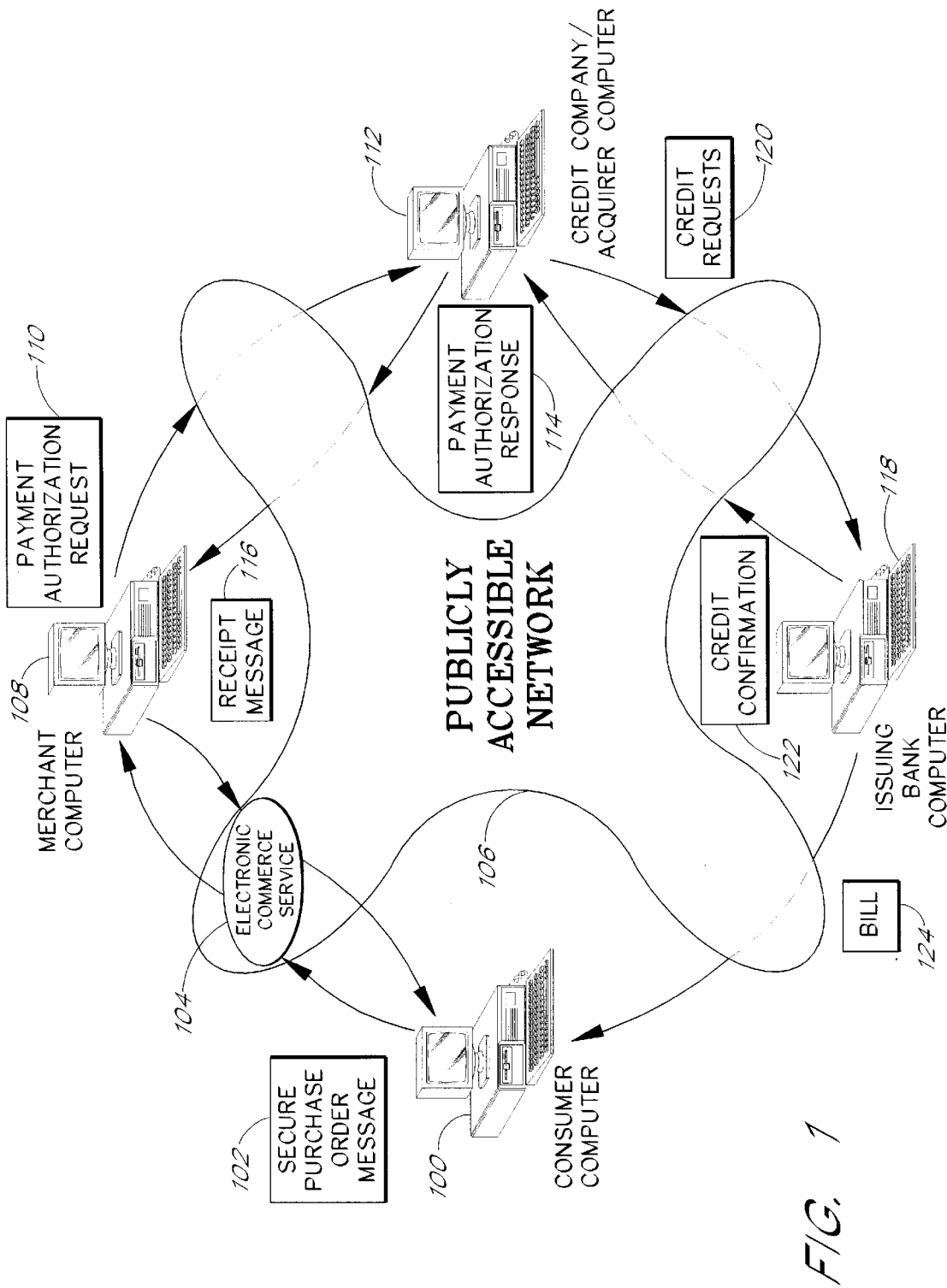
FIG. 1 is a high level block diagram illustrating the communication of secure electronic transactions within a preferred embodiment of the present invention.

In the drawings, the first digit of any three-digit number indicates the number of the figure in which the element first appears. For example, an element with the reference number 402 first appears in FIG. 4. Where four-digit reference numbers are used, the first two digits indicate the figure number.

DETAILED DESCRIPTION OF THE PREFERRED EMBODIMENT

The detailed description which follows is organized into the following sections: Overview Of The Secure Electronic Commerce System, Architectural Overview Of An On-line System Appropriate For Use With The Secure Electronic Commerce System, Implementation Of The Secure Electronic Commerce System, Secure Data Formats, Registration, and Secured Transaction Processing.

I. Overview Of The Secure Electronic Commerce System

This section provides an overview of the secure electronic commerce system in a preferred embodiment of the present invention. A block diagram of a typical electronic transaction is shown in FIG. 1. Initially, a consumer operates a consumer computer 100 to select a desired good or service. The goods or services can be presented in an electronic catalog, advertisement, electronic mall or the like. After selecting the desired good or service, the consumer computer 100 generates a secure purchase order message 102 and sends the secure purchase order message 102 to an electronic commerce service 104 on a publicly accessible on-line network 106.

As discussed in more detail below, the secure purchase order message 102 contains 1) a goods and service order, 2) payment instructions and 3) audit information. Preferably, the goods and services order specifies details about the purchased goods, the identity of the merchant selling the goods, shipping instructions, etc. The payment instructions preferably contain the cost of the goods, the purchaser's credit account, credit card number, etc. In addition, the audit information preferably specifies the identity of the merchant and contains other general information about the price and quantity of items purchased.

The preferred embodiment encrypts the goods and service order, the payment instructions and the audit information into different encryption formats to ensure that only a desired merchant can access the goods and services order, only a desired credit provider can access the payment instructions and only a desired on-line network provider can access the audit information. The preferred embodiment combines the encrypted goods and services order and the encrypted payment instructions into one or more encrypted transaction packets (not shown) and stores the encrypted audit information in at least one encrypted audit packet (not shown). The encrypted transaction packets and the encrypted audit packet are then combined to create a secure purchase order message 102 which is sent to an electronic commerce service 104 executing in a publicly accessible on-line network 106.

The on-line network 106 which receives the secure purchase order message 102 provides the communication links between the parties participating in an electronic commercial transaction. As described in more detail below, the electronic commerce service 104 of the preferred embodiment executes within the on-line network 106. The electronic commerce service 104 provides security registration, transfers secure transactions to their intended destinations and provides audit and backup services.

Upon receiving the secure purchase order message 102, the electronic commerce service 104 decrypts the audit information in the secure purchase order message 102 and saves the audit information in an electronic commerce database. In addition, the electronic commerce service 104 makes a backup copy of the secure purchase order message 102. The electronic commerce service 104 then routes the secure purchase order message 102 to the specified merchant computer 108.

Upon receiving the secure purchase order message 102 from the electronic commerce service 104, the merchant computer 108 decrypts the encrypted goods and services order. The merchant computer 108 also generates a payment authorization request 110 and sends it to the specified credit company's computer 112 (also called the acquirer computer 112) via the on-line network 106 or a variety of other communication networks. The payment authorization request 110 typically contains the encrypted payment instructions.

The credit company associated with a credit account, credit card number, etc. is called an acquirer. An acquirer can be any organization or institution which confirms that a purchaser has a credit account, which confirms that a purchaser has sufficient funds to pay for a desired item, or which authorizes a credit purchase. In some embodiments, the acquirer can be a credit company, credit organization, card service or the like. For example, the acquirer may be a credit service such as Visa, Mastercard, or American Express. As discussed in more detail below, it is preferred that the merchant and the acquirer are combined into the same entity in the preferred embodiment. Thus, the same entity not only provides the purchased items, but also conducts the credit confirmation.

The computer facility associated with the credit company is called the acquirer computer 112. Upon receiving the payment authorization request 110, the acquirer computer 112 decrypts the encrypted payment instructions and uses known techniques to perform a credit confirmation. The acquirer computer 112 then sends a payment authorization response 114 back to the merchant computer 108. The payment authorization response 114 indicates whether sufficient funds exist to pay for the desired transaction.

Once the merchant computer 108 receives the credit confirmation 122, the merchant computer 108 sends the receipt message 116 back to the consumer computer 100 via the on-line network 106. The receipt message 116 either denies or accepts the transaction specified in the secure purchase order message 102.

In other embodiments, the acquirer computer 112 sends a credit request 120 to an issuing bank computer 118. Generally, the issuing bank is the organization which issued the credit account. For example, the issuing bank may include Citibank, Wells Fargo, NationsBank and the like. Preferably, the issuing bank computer 118 is the issuing bank's computing facilities. The issuing bank computer 118 processes the credit request 120 and determines whether sufficient funds are available to pay for the desired transaction. The issuing bank computer 118 then sends a credit confirmation 122 back to the acquirer computer 112. The issuing bank computer 118 then sends a bill 124 to the consumer computer 100 or physically prints the bill 124 and mails it to the consumer.

II. Architectural Overview Of An On-line System Appropriate For Use With The Secure Electronic Commerce System This section provides an overview of the publicly accessible on-line network 106 in which the present invention is employed. The architecture of this network is further described in commonly-assigned copending U.S. application Ser. No. 08/472,807, having the title ARCHITECTURE FOR SCALABLE ON-LINE SERVICES NETWORK, filed Jun. 7, 1995 which is hereby incorporated herein by reference.

Figure 2:
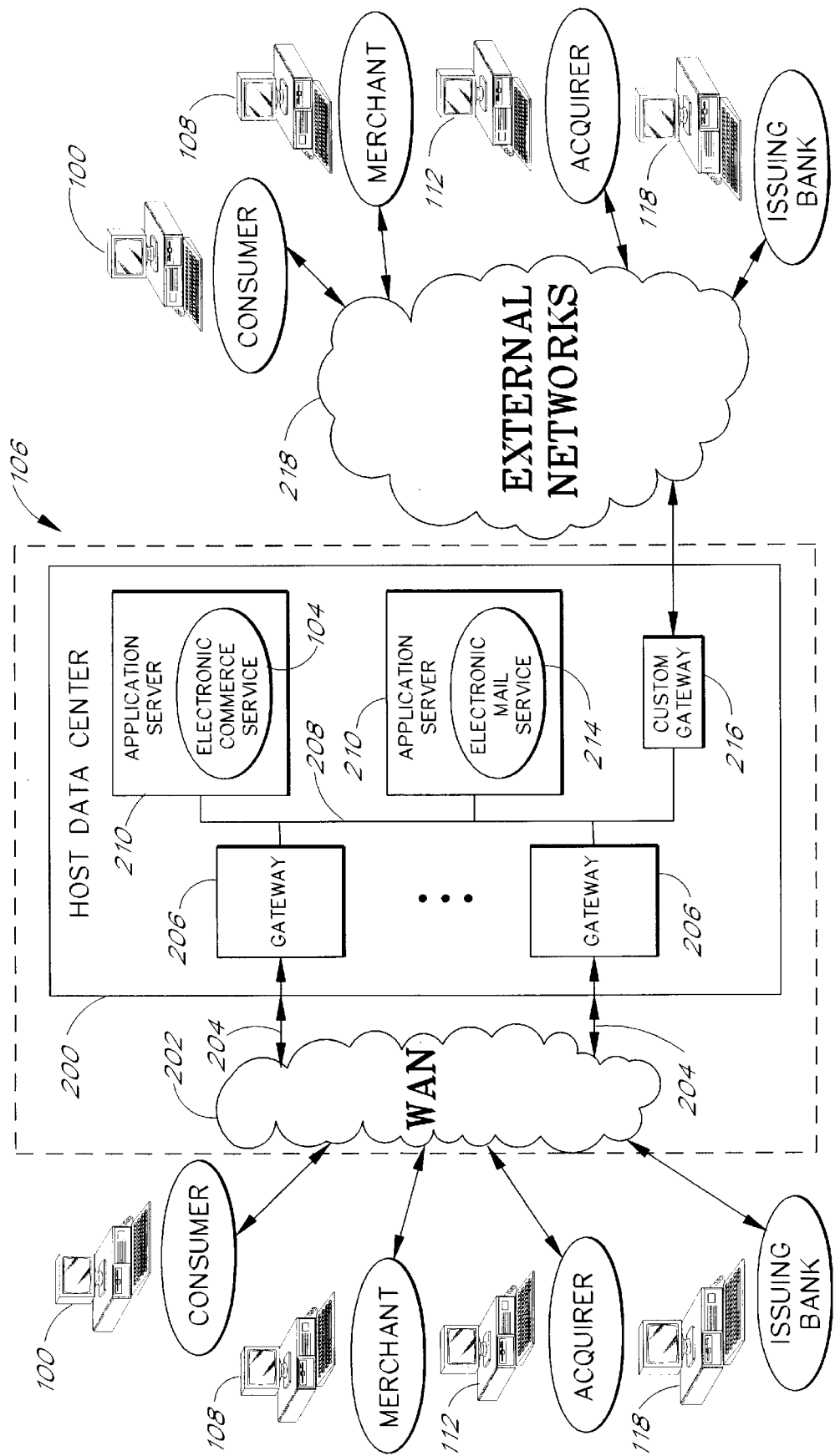
FIG. 2 is a block diagram illustrating the architecture of an on-line network adapted to implement the preferred embodiment of the present invention.

FIG. 2 is a high level drawing illustrating the architecture of an on-line network 106 appropriate for use with the present invention. The on-line network 106 includes multiple consumer computers 100, multiple merchant computers 108, multiple acquirer computers 112 and multiple issuing bank computers 118 connected to a host data center 200 by one or more wide area networks (WANs) 202. The wide area network 202 of the preferred embodiment includes wide area network (WAN) lines 204 which are provided by one or more telecommunications providers. The wide area network 202 allows users of the consumer computers 100, the merchant computers 108, the acquirer computers 112 and the issuing bank computers 118 to access the host data center 200 via a modem.

The host data center 200 comprises multiple gateway computers 206 connected to a high speed local area network (LAN) 208. Also connected to the local area network 208 are multiple application servers 210 which provide different services. The gateway computers 206 link incoming calls from the consumer computers 100, the merchant computers 108, the acquirer computers 112 and the issuing bank computers 118 to the application servers 210. In the preferred embodiment, the application servers 210 and the gateway computers 206 are general purpose Pentium-class (or better) microcomputers which run the Windows NT operating system available from Microsoft Corporation.

The application servers 210 typically have at least 128 megabytes of random-access memory (RAM) and at least 4 gigabytes of disk space. Processing power may vary from application server 210 to application server 210. For example, one application server 210 may have four 100 Mhz processors, while another application server 210 may have one 90 Mhz processor. Each gateway computer 206 typically has at least 64 megabytes of RAM and at least 2 gigabytes of disk space, and is capable of supporting approximately 1000 simultaneous end-users at T1 (1.544 Mbps) or greater data rates. The local area network 208 preferably operates at 100 megabits per second based on the CDDI (Copper Distributed Data Interface) standard. The CDDI specification is a variant of the well-known ANSI Fiber Distributed Data Interface specification, but uses a single copper ring instead of a dual fiber ring.

The host data center 200 provides a variety of communications-based and information-based services to end-users. A service is any service provided in an online environment. Typical services include, for example, an electronic commerce service 104, an electronic mail service 214 and other services not shown such as a chat service, a bulletin board service, a media view service, an interactive game service and various other information services. Preferably, the services in the on-line network 106 are implemented as client-server applications, with server portions (or "server applications") running on the application servers 210, and with client portions (or "client applications") running on the consumer computers 100, the merchant computers 108, the acquirer computers 112 and the issuing bank computers 118. In the presently preferred embodiment, the client applications are implemented as Windows 95 executables and the server applications are implemented as dynamic link libraries which execute under the Microsoft Windows NT operating system.

The application servers 210 associated with a particular service group is preferably a "replicated" version of other application servers 210 within the service, meaning that each runs the same service application as the others to implement a common service. For example, application servers 210 within an electronic mail service group all run an electronic mail server application. A service group may have as few as one application server 210. Further, a given application server 210 can handle multiple services, and can thus be simultaneously allocated to multiple services. This architecture advantageously features a high degree of scalability, allowing the capacity of the network to be scaled (without degrading the services) as the number of end users increases over time.

During a typical logon session, the consumer computers 100, the merchant computers 108, the acquirer computers 112 and the issuing bank computers 118 maintain a communications link with the gateway computers 206, but may access multiple services and thus communicate with multiple application servers 210. The gateway computers 206 translate messages between the protocol of the wide area network 202 and the protocol of the local area network 208 in order to establish connections among the application servers 210, the consumer computers 100, the merchant computers 108, the acquirer computers 112 and the issuing bank computers 118.

As discussed in more detail below, the electronic commerce service 104 establishes secure communication protocols and monitors secured transactions. The electronic mail service 214 receives secured transactions in the form of secure electronic mail messages. The electronic mail service 214 routes the secure electronic mail messages among the electronic commerce service 104, the consumer computers 100, the merchant computers 108, the acquirer computers 112 and the issuing bank computers 118.

The host data center 200 also includes one or more custom gateway computers 216 which link the host data center 200 to one or more external networks 218, such as the Internet, other on-line service providers, or different private networks. The external networks 218 can also link additional consumer computers 100, merchant computers 108, acquirer computers 112 and issuing bank computers 118 to the host data center 200. Each custom gateway computer 216 uses the communications protocol required by the external network 218 to which the custom gateway computer 216 is linked.

III. Implementation Of The Secure Electronic Commerce System

The preferred embodiment of the present invention provides an enhanced system and method for processing secured commercial transactions on publicly accessible on-line networks 106. In general, an end-user directs one of the consumer computers 100 to initiate a commercial transaction such as the purchase of a good or service. The consumer computer 100 generates the secure purchase order message 102 and converts the commercial transaction into a secured format.

A. The Consumer Computers

Figure 3:
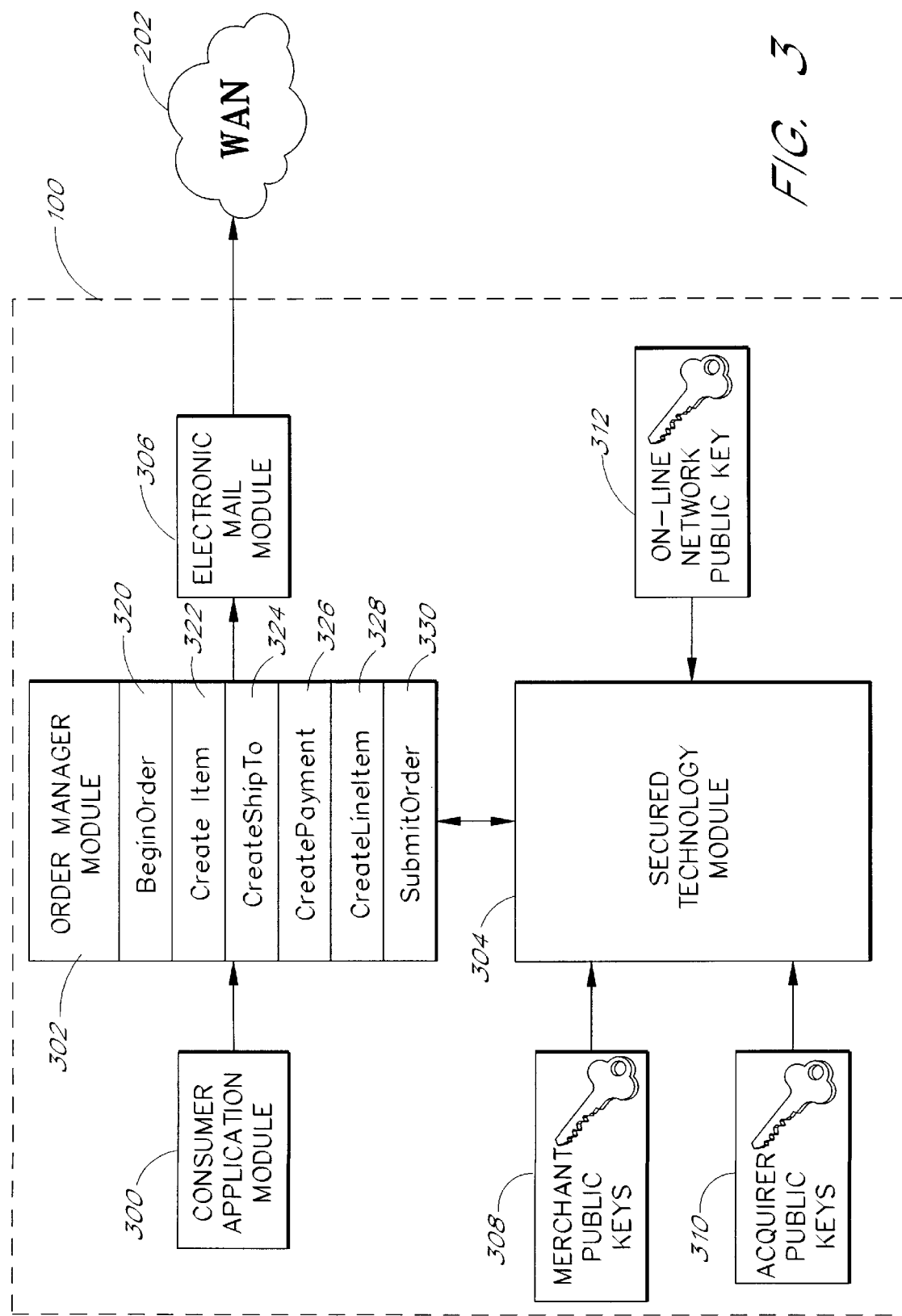
FIG. 3 is a block diagram illustrating a preferred embodiment of the consumer processing modules in the present invention.

FIG. 3 illustrates a block diagram of the modular components existing in the consumer computers 100 in the preferred embodiment of the present invention. The modular components include a consumer application module 300, an order manager module 302, a secured technology module 304 and an electronic mail module 306. In the preferred embodiment, a module is the set of software instructions, methods, interfaces, procedures, routines or the like which direct a computer processor to accomplish a desired function. In the preferred embodiment, the modules are stored in a computer accessible media or memory and are executed by the processor in the consumer computer 100.

The consumer application module 300 (hereinafter referred to as the consumer application 300) executes on the consumer computer 100 and generates the user interface which appears on the consumer computer 100. In the preferred embodiment, the consumer application 300 is a Windows 95 compatible program such as an electronic catalog, electronic advertisement, a page in an excel worksheet, a display page in a network browser or other programs which allow the user of the consumer computer 100 to select desired goods and services. Once the user selects one or more desired items, the consumer application 300 sends item information, merchant identification information, acquirer identification information, and end-user identification information to the order manager module 302

In the preferred embodiment, the order manager module 302 is a set of application programming interfaces implemented in a Win 95 32-bit dynamic link library and is hereinafter referred to as the order manager 302. As discussed in more detail below, the consumer application 300 "calls" the application programming interfaces in the order manager 302 to instantiate an order object (not shown) which contains purchase, payment, shipping and other information regarding a commercial transaction. An application programming interface "call" takes the form of a program instruction which identifies the name of the application programming interface and specifies one or more variables which pass data to the identified application programming interface.

Using the application programming interfaces in the order manager 302, the consumer application 300 calls the order manager application programming interfaces to create and send the secure purchase order message 102 to the electronic commerce service 104 in the on-line network 106. Invoking the routines in an application programming interface typically take the form of a function call. Pertinent application programming interfaces in the order manager 302 include: the BeginOrder function 320, the CreateItem function 322, the CreateShipTo function 324, the CreatePayment function 326, the CreateLineItem function 328 and the SubmitOrder function 330.

In addition, the preferred embodiment provides an Object Linking and Embedding (OLE) server (not shown) which allows a wide variety of consumer applications 300 to access the order application programming interfaces in the order manager 302. For example, the OLE server allows 16-bit consumer applications 300 to invoke the 32-bit order manager 302 dynamic link libraries with OLE 16/32-bit interoperability. The OLE server and automation techniques are well known in the art and are further described in *Microsoft Visual Basic Version* 4.0 *Professional Features,* Microsoft Press, 1995, *OLE* 2 *Programmer's Reference Vols. I and II,* Microsoft Press, 1993 and Brockschmidt, *Inside OLE* 2, Microsoft Press, 1994 which are herein incorporated by reference.

An additional advantage of the OLE server is that the consumer applications 300 can be implemented in a wide range of programming languages. For example, a consumer application 300 programmed in visual basic can instantiate the OLE server with the Visual Basic CreateObject routine. The visual basic techniques for communicating with the OLE server are also well known in the art and are further described in *Microsoft Visual Basic Version* 4.0, *Programmer's Guide,* Microsoft Press, 1995 which is wherein incorporated by reference.

As explained in more detail below, the order manager 302 application programming interfaces communicate with the secured technology module 304 to generate the secure purchase order message 102. The secured technology module 304 of the present invention can incorporate a wide variety of encryption techniques. In the preferred embodiment, the secured technology module 304 is the Secured Transaction Technology standard developed by Visa International and Microsoft Corporation. The Secured Transaction Technology standard, as described above, is known in the art and is described in *"Secured Transaction Technology Open Specification/Wire Formats and Protocols, version* 0.902," published by the Microsoft Corporation which is attached in the Appendix set forth below. Those of ordinary skill in the art, however, will recognize that a wide variety of encryption techniques can be employed in different embodiments of the present invention.

The secured technology module 304 of the preferred embodiment uses one or more merchant public keys 308, one or more acquirer public keys 310 and an on-line network public key 312 to generate secure purchase order messages 102. As explained in further detail below, during the registration process, each merchant computer 108 generates its own merchant public key 308 and merchant private key (not shown), each acquirer computer 112 generates its own acquirer public key 310 and acquirer private key (not shown). The on-line network public key 312 is predefined by the on-line network 106.

As described in more detail below, the secured technology module 304 uses the merchant public keys 308, the acquirer public keys 310, the on-line network public key 312 to create the secure purchase order message 102. After generating a secure purchase order message 102, the order manager 302 sends the secure purchase order message 102 to the electronic mail module 306. In other embodiments, the secured technology module 304 may also use a consumer public key and a consumer private key to generate secure purchase order messages 102. Accordingly, in other embodiments, the consumer computer 100 can generate its own consumer public key and consumer private key.

The electronic mail module 306 uses techniques known to one of ordinary skill in the art to communicate with the electronic commerce service 104 in the on-line network 106. Preferably, the electronic mail module 306 communicates with the electronic commerce service 104 via a modem over the wide area network 202. A person of ordinary skill in the art, however, will appreciate that the electronic mail module 306 can be implemented using any number of different protocols and computer configurations without departing from the scope of the present invention. For example, the electronic mail module 306 could communicate with the electronic commerce service 104 or the external networks 218 via a cable modem, wireless modems, interactive television systems and the like.

In the preferred embodiment, the electronic mail module 306 utilizes Microsoft's Messaging Application Program Interface (MAPI). The Messaging Application Program Interface (MAPI) provides functions such as the MapiDeleteMail function, the MapiReadMail function, and the MapiSendMail function for using Microsoft Mail within a Microsoft Windows application. By calling these functions in the appropriate manner and combination, an application can address, send, and receive electronic mail messages. MAPI is well known to those of ordinary skill in the art and is further discussed in the MAPI Software Development Kit which is available from Microsoft Corporation.

B. The Host Data Center

Figure 4:
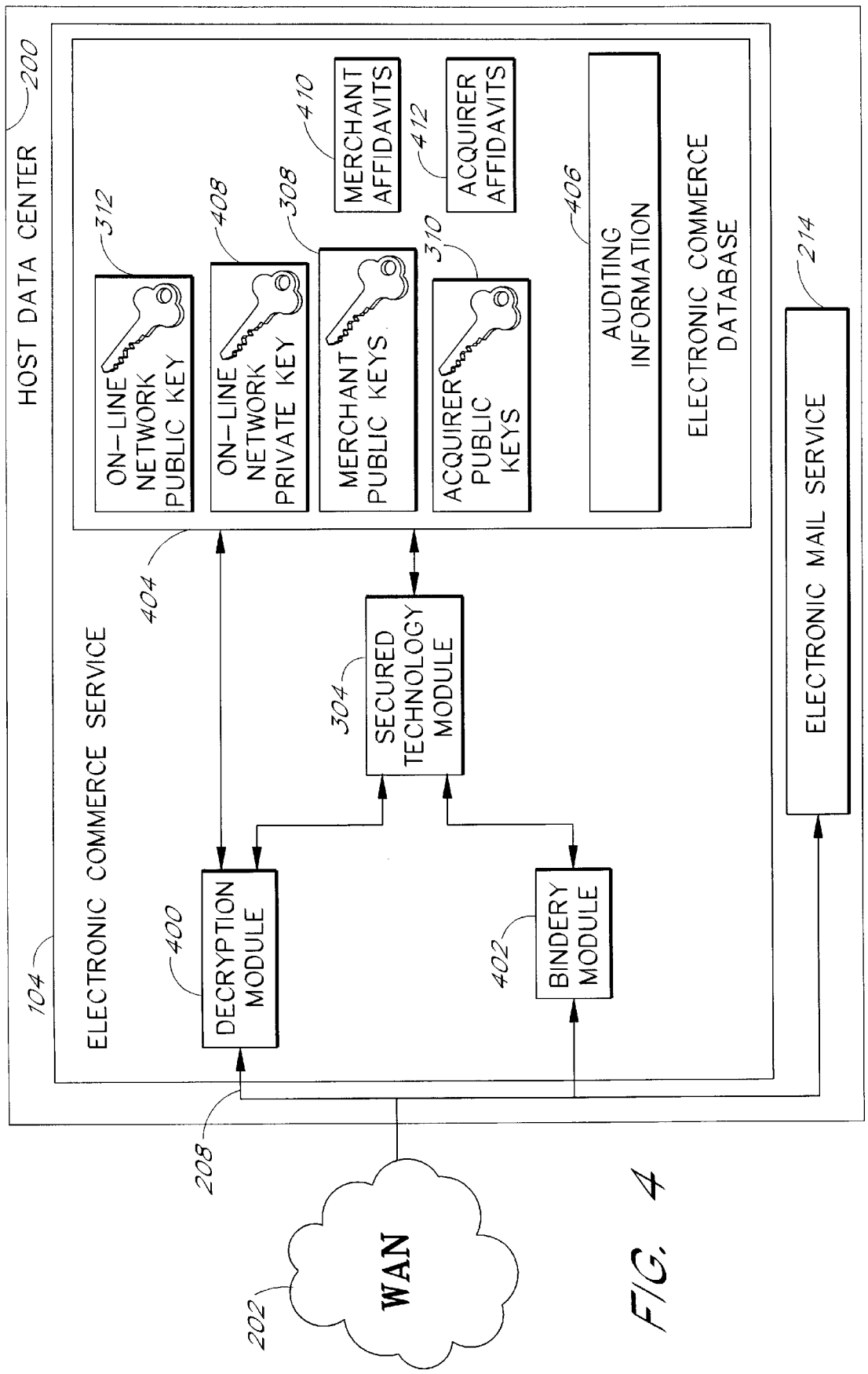
FIG. 4 is a block diagram illustrating a preferred embodiment of the host data center processing modules in the present invention.

Referring now to FIG. 4, a block diagram of the electronic commerce service 104 and the electronic mail service 214 in the host data center 200 is shown. In a preferred embodiment, the electronic commerce service 104 contains multiple application servers 210 which are interconnected by the local area network 208, and are arranged into an electronic commerce service group. Each application server 210 of the electronic commerce service group is preferably a "replicated" version of the other application servers 210 within the electronic commerce service 104, meaning that each application server 210 runs the same electronic commerce software as the others to implement a common electronic commerce service 104.

Preferably, the electronic commerce service 104 comprises a decryption module 400, a bindery module 402, a secured technology module 304 and an electronic commerce database 404. In the preferred embodiment, the decryption module 400 audits the secure purchase order messages 102. Typically, the decryption module 400 receives the secure purchase order messages 102 and other electronic messages from the electronic mail service 214. As discussed in more detail below, the decryption module 400 communicates with the secured technology module 304 to decrypt audit information 406 contained in the secure purchase order messages 102. In addition, the decryption module 400 routes the secure purchase order message 102 to the merchant computers 108 and the acquirer computers 112 via the electronic mail service 214.

The decryption module 400 stores the decrypted audit information 406 in the electronic commerce database 404. Preferably, the electronic commerce database 404 is implemented with Structured Query Language (SQL) code. The structured query language is a language standardized by the International Standards Organization (ISO) for defining, updating and querying relational databases.

The bindery module 402 registers the merchant public keys 308 and the acquirer public keys 310 during the registration process. As discussed in more detail below, the bindery module 402 also uses the on-line network public key 312 to digitally sign the merchant public keys 308 and the acquirer public key 310. In the preferred embodiment, the digitally signed merchant public key 308 is called a merchant affidavit 410, the digitally signed acquirer public key 310 is called an acquirer affidavit 412. In other embodiments, a digitally signed consumer key is called a consumer affidavit.

The bindery module 402 also stores a copy of the on-line network public key 312, the on-line network private key 408, the merchant public keys 308, the merchant affidavits 410, the acquirer public keys 310, and the acquirer affidavits 412 in the electronic commerce database 404. In addition, the electronic commerce database 404 stores audit information 406 about each commercial transaction and backup copies of each secure purchase order message 102.

The electronic mail service 214 communicates with the electronic commerce service 104 via the high speed local area network 208 and routes electronic mail to the electronic commerce service 104, the consumer computers 100, the acquirer computers 112 and the issuing bank computers 118 via the wide area network 202 or the external networks 218. The electronic mail service 214 of the preferred embodiment uses the Microsoft Messaging Application Program Interface (MAPI) which as discussed above, is known to one of ordinary skill in the art.

C. The Merchant/Acquirer Computers

Figure 5:
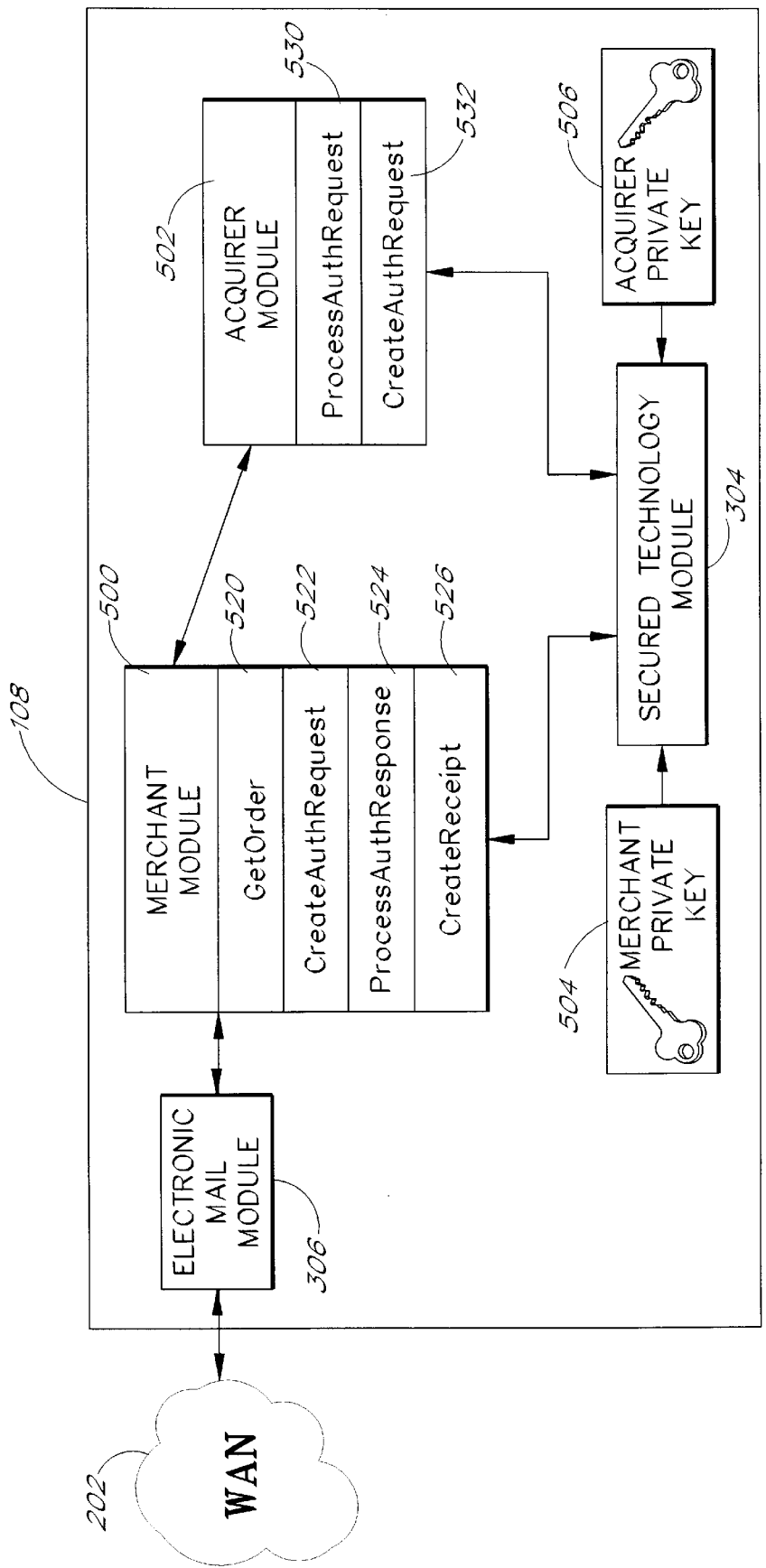
FIG. 5 is a block diagram illustrating a preferred embodiment of the merchant processing modules in the present invention.

Referring now to FIG. 5, the modular components existing in the preferred merchant computer 108 are shown. In the preferred embodiment, the merchant computer 108 and the acquirer computer 112 are combined into a single computer which is hereinafter referred to as the merchant computer 108. The modular components include: an electronic mail module 306, a merchant module 500, an acquirer module 502, a secured technology module 304. In addition, the modules access a merchant private key 504 and an acquirer private key 506.

In the preferred embodiment, a module in the merchant computer 108 is the set of software instructions, methods, interfaces, procedures, routines or the like which direct a computer processor to accomplish a desired function. In the preferred embodiment, the modules are stored in a computer accessible media or memory and are executed by the processor in the merchant computer 108. In other embodiments, the merchant computer 108 and the acquirer computer 112 may exist as separate entities. Accordingly, one of ordinary skill in the art will recognize that the merchant modules 500 and the acquirer modules 502 can execute on separate merchant computers 108 and separate acquirer computers 112.

In the preferred embodiment, the merchant module 500 and the acquirer module 502 are sets of application programming interfaces implemented in a Win 95 32-bit dynamic link library. The application programming interfaces in the merchant module 500 are configured to obtain the secure purchase order message 102 from the electronic mail module 306, to generate the payment authorization request 110 sent to the acquirer module 502, to process the payment authorization response 114 received from the acquirer module 502, and to generate the receipt message 116.

As discussed in more detail below, the pertinent application programming interfaces in the merchant module 500 include: a GetOrder function 520, a CreateAuthRequest function 522, a ProcessAuthResponse function 524 and a CreateReceipt function 526. The preferred merchant computer 108 also contains an Object Linking and Embedding (OLE) server (not shown) which allows a wide variety of merchant applications (not shown) to access the application programming interfaces in the merchant module 500.

The acquirer module 500 also contains application programming interfaces for obtaining and processing the payment authorization request 110 generated by the merchant module 500. The application programming interfaces in the acquirer module 502 are configured to decrypt the payment instruction portion of the secure purchase order message 102, to perform a credit confirmation and to create the payment authorization response 114. As discussed in more detail below, the pertinent application programming interfaces in the merchant module 500 include: a ProcessAuthRequest function 530 and a CreateAuthResponse function 532.

In other embodiments, the acquirer module 502 may generate the credit request 120 (not shown) which sends credit account information to the issuing bank computer 118. The issuing bank computer 118 then uses data processing techniques known to one of ordinary skill in the art to process the credit request 120 and to generate a credit confirmation 122. In addition, in other embodiments, the issuing bank computer 118 prepares a bill 124 or credit statement which is then sent electronically to the consumer computer 100 or which is sent manually printed and sent to the end-user of the consumer computer 100.

IV. Secure Data Formats

Figures 6, 6A:
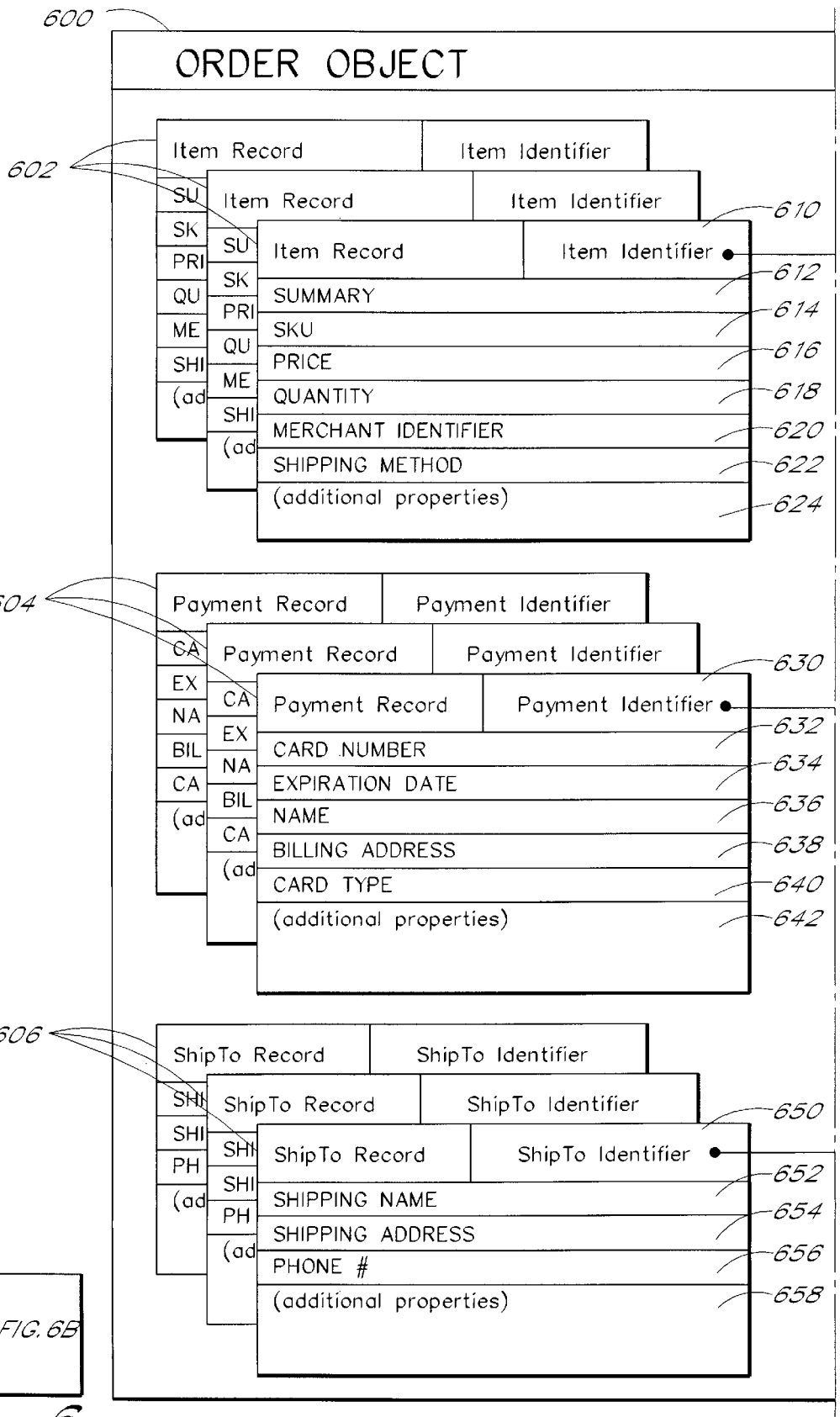
FIGS. 6A and 6B illustrate a block diagram of a preferred data structure created by the consumer processing modules of the present invention.
Figure 6B:
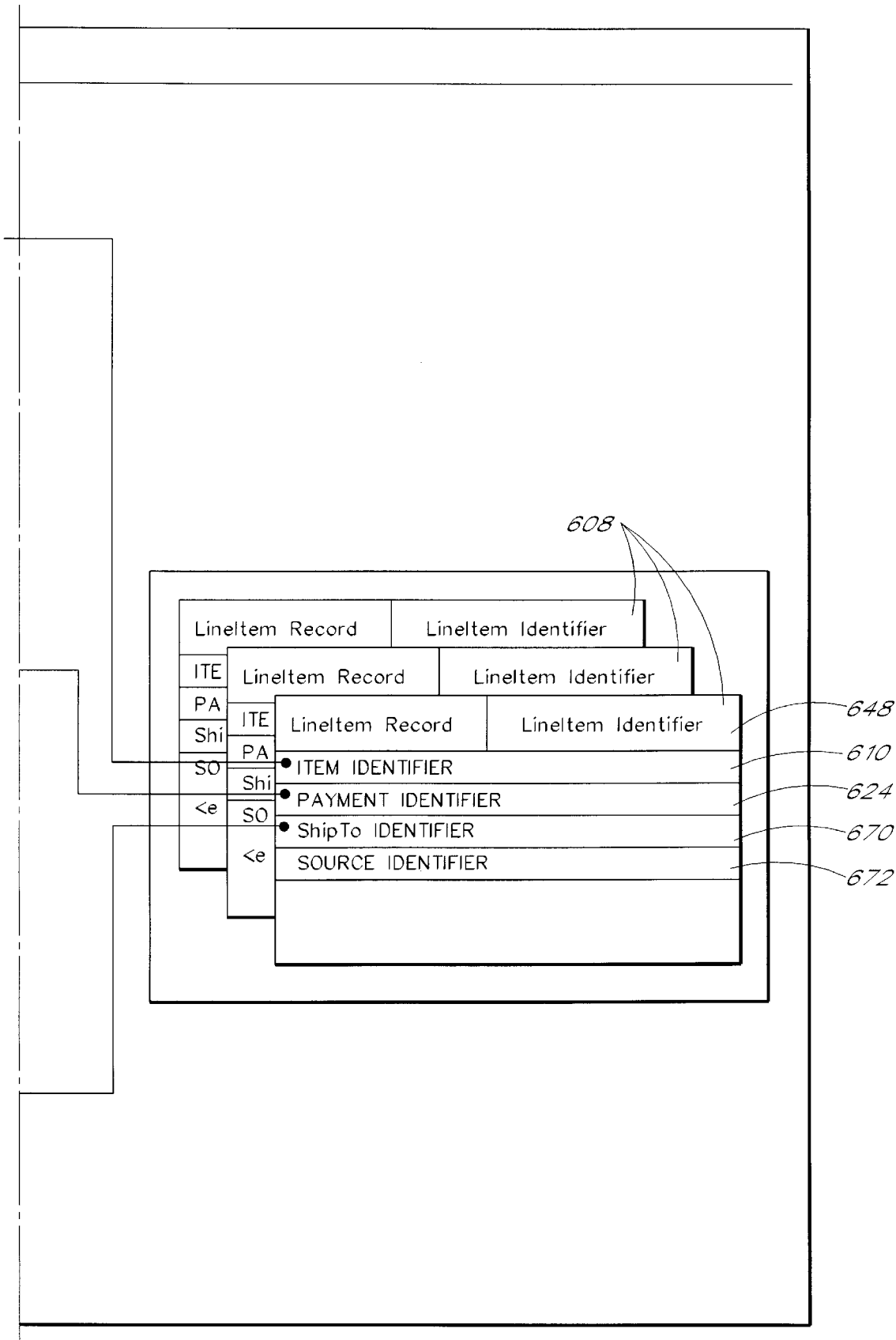

The data structure utilized by the preferred embodiment during the creation of the secure purchase order message 102 is shown in FIGS. 6A and 6B. As explained in more detail below, when an end-user initiates a commercial transaction, the order manager 302 instantiates an order object 600. The instantiation of the order object 600 includes the creation of the order object 600 and the allocation of memory to hold the order object 600. Object instantiation is well known in the art and is further described in OLE 2 *Programmer's Reference Vols. I and II*, Microsoft Press, 1993, and Brockschmidt, *Inside OLE* 2 Microsoft Press, 1994.

The unique structure of the order object 600 in the preferred embodiment, allows a secured purchase order message 102 to contain multiple items, multiple payment instructions, multiple shipping methods and multiple merchants. Thus the order object 600 behaves much like a relational database. The order object 600, however, is specifically is designed to optimize the storage of complex commercial transactions.

In the preferred embodiment, the order object 600 stores item records 602, payment records 604, shipto records 606 and lineitem records 608. The item records 602 contain summaries about purchased items. The payment records 604 contain payment summaries such as credit payment instructions, while the shipto records 606 contain shipping instructions which summarize how to ship particular items.

Each lineitem record 608 is analogous to a sales order for a specific item. Thus, multiple lineitem records 608 are analogous to multiple sales records which contain shipping and purchase data about different items. In the preferred embodiment, each lineitem record 608 references one of the item records 602, one of the payment records 604 and one of the shipto records 606. For example, in the preferred embodiment, an end-user may view a consumer application 300 such as an electronic catalog which displays products offered by different manufacturers. While viewing the consumer application 300, the end-user may desire to purchase a particular jacket. As discussed in more detail below, when the end-user selects the jacket, the preferred embodiment creates an item record 602 containing information about the jacket and information about the merchant selling the jacket.

In this example, the consumer application 300 prompts the end-user for his credit card information. Upon entering the credit card information, the preferred embodiment creates a first payment record 604 containing information about the end-user's credit card. In addition, the consumer application 300 prompts the end-user for a shipping address. If the end-user enters his home address, the preferred embodiment creates a first shipto record 606 containing information about the end-user's home address. Because the end-user wishes to purchase the jacket with his credit card, and have the jacket delivered to his home address, the preferred embodiment creates a first lineitem record 606 which references the first item record 602, the first payment record 604 and the first shipto record.

While the end-user continues to view the electronic catalog, the end-user may also purchase another item. In this example, the end-user selects a necklace offered by a second manufacturer. In addition, the end-user desires to use a second credit card to purchase the necklace and desires to have the necklace delivered as a gift to a friend. Once the end-user selects the necklace, the preferred embodiment creates a second item record 602 containing information about the necklace and the second manufacturer. Once the end-user enters information about his second credit card, the preferred embodiment creates a second payment record 604. Furthermore, once the end-user enters the address of the end-user's friend, the preferred embodiment creates a second shipto record 606 containing the friend's address.

After the end-user enters all the necessary information, the preferred embodiment creates a second lineitem record 608 which references the second item record 602, the second payment record 604 and the second shipto record 606. Thus, with the unique order object 600 of the present invention, a single order object 600 can contain multiple lineitem records 608, each of which specify different items, different merchants, different credit cards and different shipping instructions.

Furthermore, multiple lineitem records 608 can reference the same item records 602, payment records 604 or shipto records 606. For example, if the end-user of the above example purchases earrings for his friend from a third manufacturer, the preferred embodiment creates a third item record 602 for storing information about the earrings. In this example, the end-user desires to charge the earrings on his first credit card and ship the earrings to address of the end-user's friend. Thus, the third lineitem record 608 is configured to reference the third item record 602 containing information about the earrings, the first payment record 604 containing information about the end-user's first credit card and the second shipto record 606 containing the friend's address.

The ability of multiple lineitem records 608 to reference the same item records 602, payment records 604 and shipto records 606 reduces the amount of data stored in the order object 600. This reduces memory requirements and provides flexibility. Furthermore, the structure of the order object 600 allows the end-user to select items from a wide variety of merchants, specify a wide variety of credit options and enter a wide variety of shipping instructions.

The item record 602 of the preferred embodiment contains an item identifier 610, an item description or summary 612, a stock keeping unit (sku) 614, a price 616, a quantity value 618, a merchant identifier 620, a shipment method 622 and additional item properties 624 which may be added in by different embodiments. In the preferred embodiment, the item identifier is a 16-bit value which uniquely identifies each item record 602. The summary 612 contains a description of the item and is a variable length string. The stock keeping unit (sku) 614 contains item identification information and is a variable length string. The price 616 contains the cost of an item and specifies different currencies. The quantity value 618 is a 32-bit value which contains the number of items. As described in more detail below, the merchant identifier 620 is a 128-bit globally unique identifier which identifies each merchant registered to transact electronic commerce. In the preferred embodiment, the merchant identifier 620 is used to route secure messages to their proper destination. The shipment method 622 is a 32-bit value wherein different ship method values describe the mode of shipment such as American Express, first class United States mail, UPS, etc.

The payment record 604 of the preferred embodiment contains a payment identifier 630, a credit card number 632, an expiration date 634, an issuing bank name 636, a billing address 638, a card type 640 and additional payment properties 642 which may be added in different embodiments. The payment identifier 630 is a 16-bit value which uniquely identifies each payment record 604. The credit card number is a twenty character fixed-length string. The expiration date 634 is an eight character fixed-length string. The issuing bank name 636 is a 64 character fixed-length string which contains the name of the bank which issued the credit card. The billing address 638 is four 64 character fixed-length strings which contain the billing address. The card type 640 is a 16 character fixed-length string containing the card provider such as Visa, MasterCard, American Express, etc.

The shipto record 606 of the preferred embodiment contains a shipto identifier 650, a shipping name 652, shipping address 654, phone numbers 656, and additional shipping properties 658 which may be added by other embodiments. The shipto identifier 650 is a 16-bit value which uniquely identifies each shipto record 606. The shipping name 652 is a 64 character string which specifies the name of the recipient. The shipping address 654 is four 64 character fixed-length strings which specify the address of the recipient. The phone number 656 contains two 64 character fixed-length strings which specify the voice and modem numbers of the customer.

Each lineitem record 608 contains the lineitem identifier 670, the item identifier 610, the payment identifier 630, the shipto identifier 650 and the source identifier 672. The lineitem identifier 670 is a 16-bit value which uniquely identifies each lineitem record 608. The source identifier 672 is optional and is a 16-bit value which identifies the source of the commercial transaction.

Figure 7:
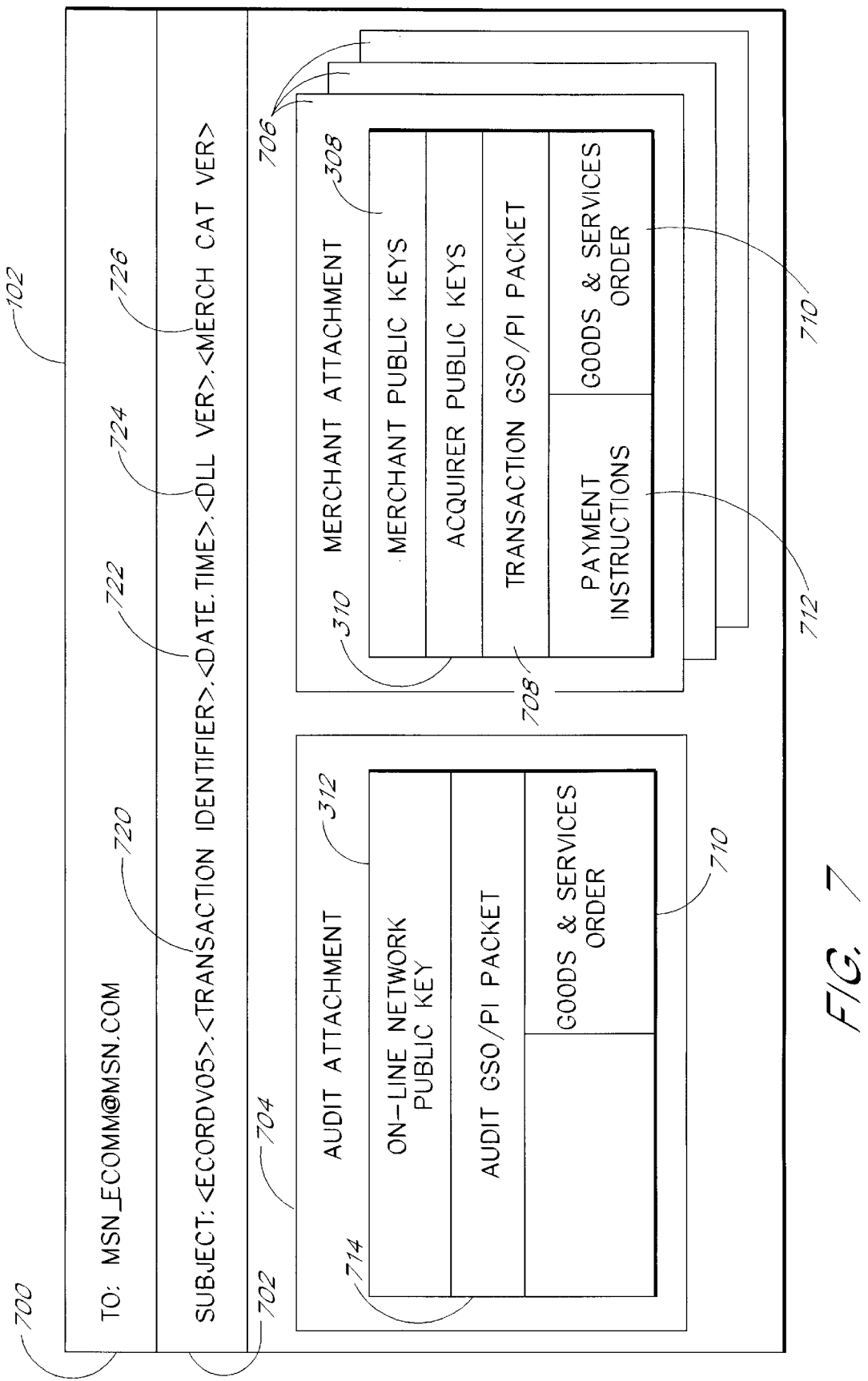
FIG. 7 illustrates the format of a purchase order message in the preferred embodiment of the present invention.

The format of the secure purchase order message 102 generated by the order manager 302 is illustrated in FIG. 7. In the preferred embodiment the secure purchase order message 102 is an electronic mail message which contains a destination 700, a subject field 702, an audit attachment 704 and one or more merchant attachments 706. The destination 700 specifies the electronic commerce service 104 in the on-line network 106 which in the preferred embodiment is MSN_ECONN@MSN.COM. The MSN_ECONN acronym identifies the electronic commerce service 104 and the MSN.COM acronym identifies the electronic address of the Microsoft Network.

The subject field 702 contains the version of the order manager 302 which in the preferred embodiment is ECORDV05. The ECORDV05 acronym stands for the electronic commerce order manager version 0.5. In addition, the subject field 702 contains the transaction identifier 720, the date and time of the transaction 722, the dynamic link library version 724 and a catalog version 726. As discussed in more detail below, whenever the order manager 302 generates the secure purchase order message 102, the order manager 302 also generates the transaction identifier 720 which identifies each secure purchase order message 102. The transaction identifier 720 is a 128-bit globally unique identifier which is created with the OLE DEFINE_GUID routine. The OLE DEFINE_GUID routine is well known and is further described in OLE 2 *Programmer's Reference Vols. I and II,* Microsoft Press, 1993 and Brockschmidt, *Inside OLE* 2 Microsoft Press, 1994.

The date and time value defines the date and time the order manager 302 created the secure purchase order message 102. The dynamic link library version 724 defines the version number of the order manager dynamic link library, while the catalog version identifies the version number of the consumer application 300.

A. The Secure Technology Keys

The present invention uses a wide variety of different encryption schemes, different encryption and decryption keys and different public key/private key pairs. In the preferred embodiment, the public key/private key pairs are based on well known and patented RSA encryption standards where were developed by the Massachusetts Institute of Technology and RSA Data Security, Inc.

Preferably, the secured technology modules 304 in the consumer computers 100, the merchant computers 108, the acquirer computers 112, the issuing bank computers 118 and the on-line network 106 rely on the following public key/private key pairs: the on-line network public key 312, the on-line network private key 408, the merchant public key 308, the merchant private key 504, the acquirer public key 310, and the acquirer private key 506. The on-line network public key 312 is a 768-bit value. The on-line network private key 408 is a 768-bit value. The merchant public key 308 is a 768-bit value. The merchant private key 504 is a 768-bit value. The acquirer public key 310 is a 1024-bit value. The acquirer private key 506 is a 1024-bit value.

Besides the public key/private key pairs, as is discussed in more detail below, the secured technology modules 304 also utilize RC4 encryption keys (not shown) and DES encryption keys (not shown). In the preferred embodiment, the secured technology module 304 utilize RC4 encryption keys to encrypt the goods and service orders and the audit information 406. The secured technology module 304 utilizes the DES encryption keys to encrypt the payment instructions.

The RC4 acronym stands for Ron Rivest's Cypher 4 and is well known by those of ordinary skill in the art. The RC4 encryption key of the preferred embodiment utilizes a 40-bit encryption value and a 16-bit supplemental encryption value to create a 56-bit RC4 encryption key. The DES acronym stands for the United States Data Encryption Standard. The implementation of the DES standard is well known to those of ordinary skill in the art. Preferably, the DES encryption keys are 56-bit values.

B. The Merchant Attachment

Figures 8, 8A:
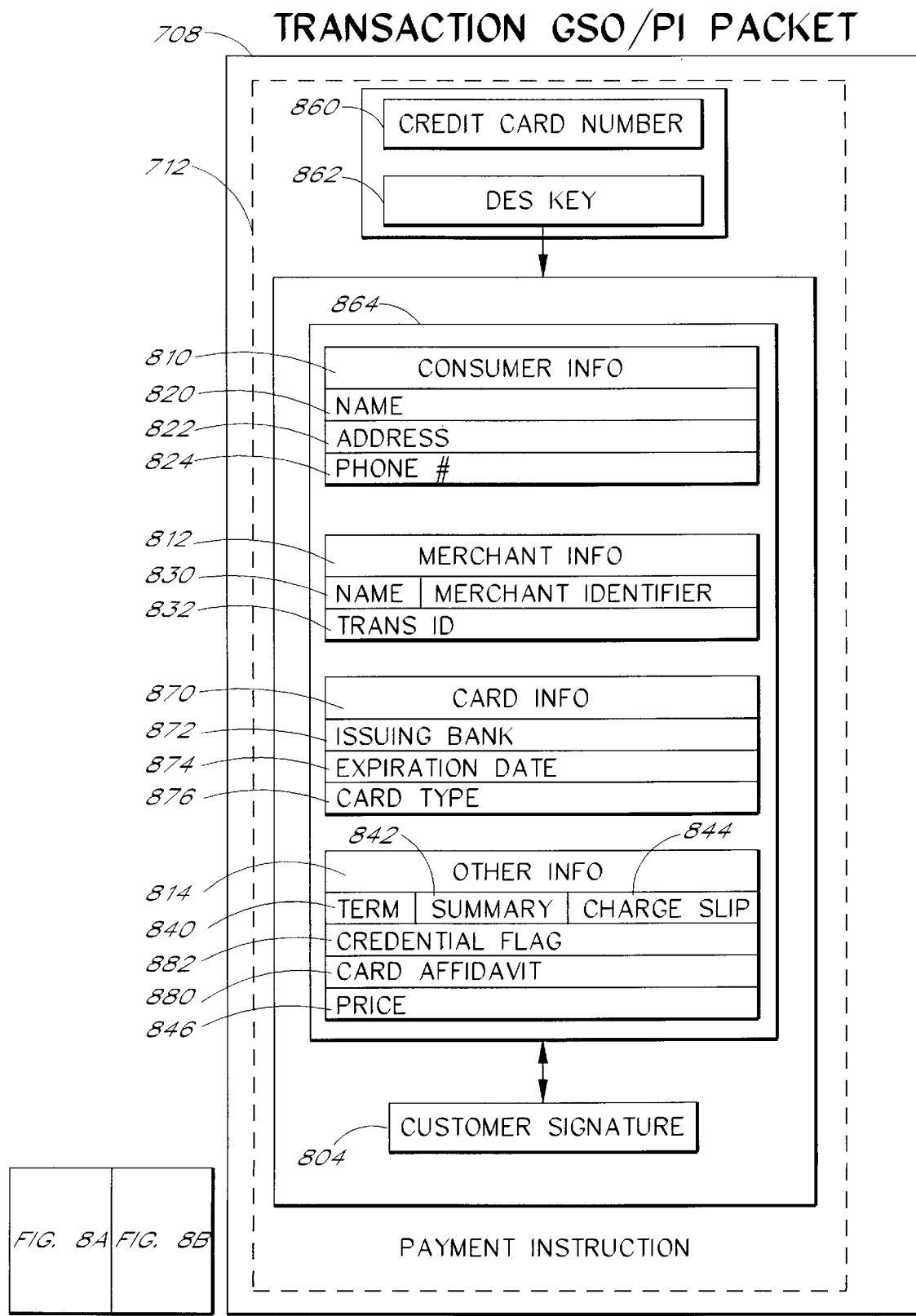
FIGS. 8A and 8B illustrate the format of a transaction goods and services order/payment instruction packet (transaction GSO/PI packet) in the preferred embodiment of the present invention.
Figure 8B:
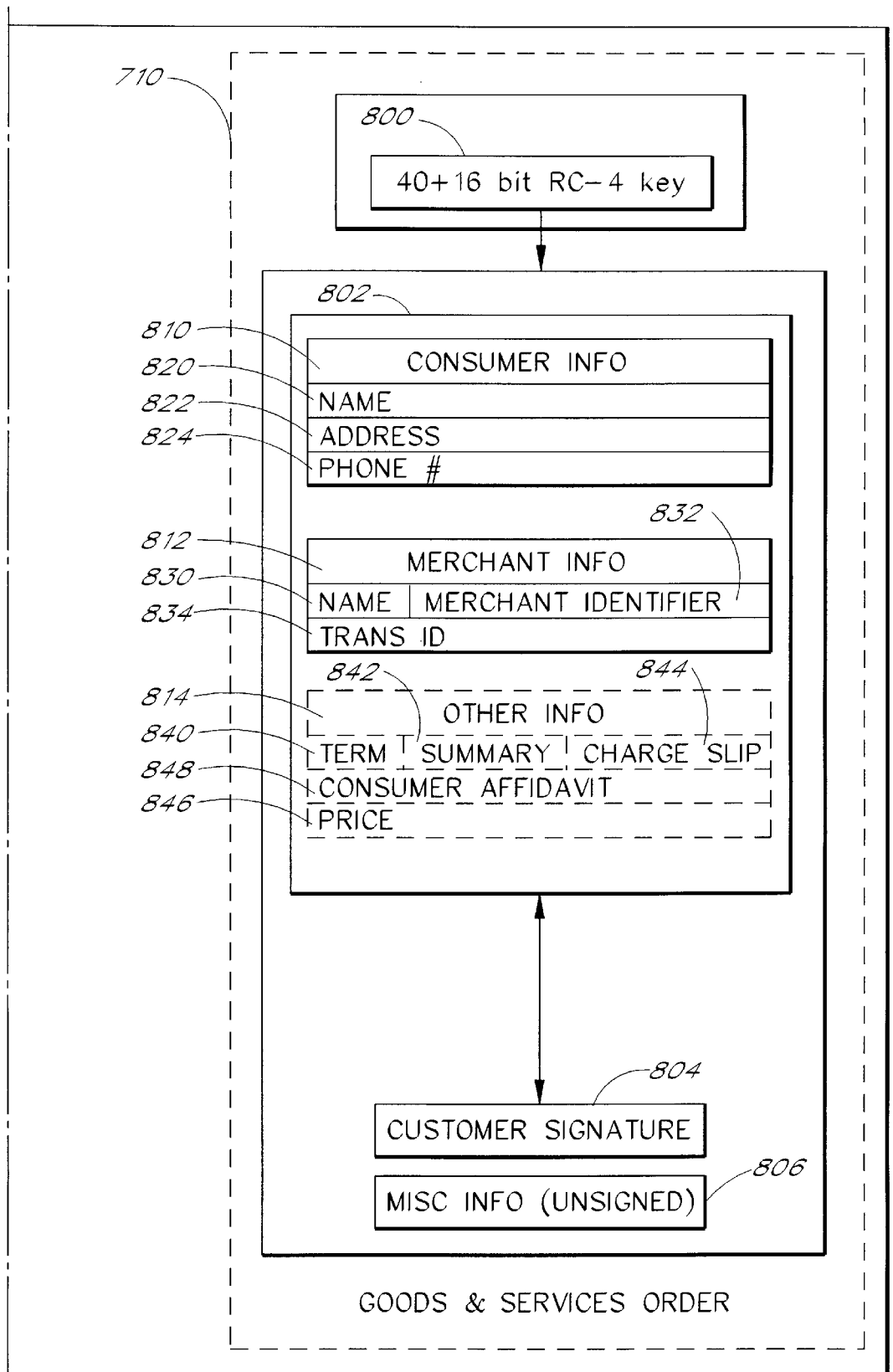

The merchant attachment 706 contains the merchant public keys 308, the acquirer public keys 310 and a transaction GSO/PI packet 708. The GSO/PI acronym stands for the combination of a goods and services order (GSO) and a payment instruction (PI). Referring now to FIGS. 8A and 8B, a block diagram of the preferred transaction GSO/PI packet 708 is shown. In the preferred embodiment, the transaction GSO/PI packet 708 contains a goods and services order 710 and a payment instruction 712.

The goods and service order 710 contains a RC4 encryption key 800, a signed merchant data packet 802, a optional consumer digital signature field 804 and a miscellaneous information field 806. The preferred embodiment creates a different RC4 encryption key 800 for each goods and services order 710. As discussed in more detail below, the preferred embodiment then encrypts the RC4 encryption key 800 with the 768-bit merchant public key 308. Thus, only the merchant computer 108 can obtain the RC4 encryption key 800 with the merchant private key 504.

The signed merchant data packet 802 contains a consumer information segment 810, merchant information segment 812 and an other information segment 814. The consumer information segment 810 includes the customer name field 820, the customer address field 822 and the customer phone number field 824. The customer name field 820 is a 64 character fixed-length string. The customer address field 822 comprises two sets of four 64 character fixed-length strings. One set of strings provides a shipping address and the other set of strings provides a billing address. The customer phone number field contains two 64 character fixed-length strings which contain the voice and modem phone numbers of the end-user.

The merchant information segment 812 contains a merchant name field 830, a merchant identifier field 832, and a transaction identifier field 834. The merchant name field 830 is a 64 character fixed-length string. The merchant identifier field 832 is a 128-bit fixed-length string. As explained in more detail below, the merchant identifier 620 is assigned by the on-line network 106 during the registration process. The transaction identifier field 834 is a 128-bit fixed-length string which contains the transaction identifier 720 and a concatenated non-decreasing serial number. The preferred embodiment increases the serial number every time it creates a purchase order message 102.

The other information segment 814 contains a term field 840, a summary field 842, a charge slip field 844, a price field 846, and an optional consumer key exchange affidavit field 848 (hereinafter referred to as the consumer affidavit field 848). The term field 840 is a 16-bit number that identifies the number of items. The summary field 842 is a variable-length string that represents the summary of the order which appears on a credit card bill. The charge slip field 844 is a variable-length string which contains the order displayed to the end-user. The price field 846 is a 64 character fixed-length field which contains the amount of the transaction. The consumer affidavit field 848 is not used in the preferred embodiment, but can comprise a fixed-length field which contains the consumer affidavit (the digitally signed consumer public key.) The consumer digital signature field 804 is not used in the preferred embodiment, but can be a fixed-length field containing data encrypted with the consumer private key.

The miscellaneous information field 806 contains variable-length strings which further describe details about the transaction. The preferred embodiment encrypts the signed merchant data packet 802, the optional consumer digital signature field 804 and the miscellaneous information field 806 with the RC4 encryption key 800.

Focusing now on the payment instruction 712, the payment instruction 712 contains a credit card number field 860, a DES encryption key 862, a signed acquirer data packet 864, and a copy of the consumer digital signature field 804. The credit card number field is a 20 character fixed-length string which contains a credit card number. The DES encryption key 862 is a 56-bit value which is randomly generated and which complies with the Data Encryption Standard (DES) encryption scheme described above. The preferred embodiment uses the 56-bit DES encryption key 862 to encrypt the signed acquirer data packet 864 and the consumer digital signature field 804. The preferred embodiment then encrypts the credit card number field 860 and the DES encryption key 862 with the 1024-bit acquirer public key 310. Thus, only the acquirer private key 506 can decrypt the credit card number field 860 and the DES encryption key 862.

The signed acquirer data packet 864 contains the consumer information segment 810, the merchant information segment 812, a credit card information segment 870 and the other information segment 814. The consumer information segment 810 contains a copy of the consumer name field 820, the customer address field 822 and the customer phone number field 824. The merchant information segment 812 contains a copy of the merchant name field 830, the merchant identifier field 832 and the transaction identifier field 834.

The credit card information segment 870 contains an issuing bank field 872, an expiration date field 874 and a card type field 876. The issuing bank field 872 is a 64 character fixed-length field which contains the name of the bank appearing on the consumer's credit card. The expiration date field 874 is an eight character fixed-length field which contains the expiration date of the consumer's credit card. The card type field 876 is a 16 character field which contains the card type such as, for example, Visa, Mastercard, American Express, etc.

The other information segment 814 contains a copy of the term field 840, the summary field 842, the charge slip field 844 and the price field 846. In addition, the other information segment 814 contains an optional card key exchange affidavit field 880 and an optional credential flag 882.

C. The Audit Attachment

Figure 9:
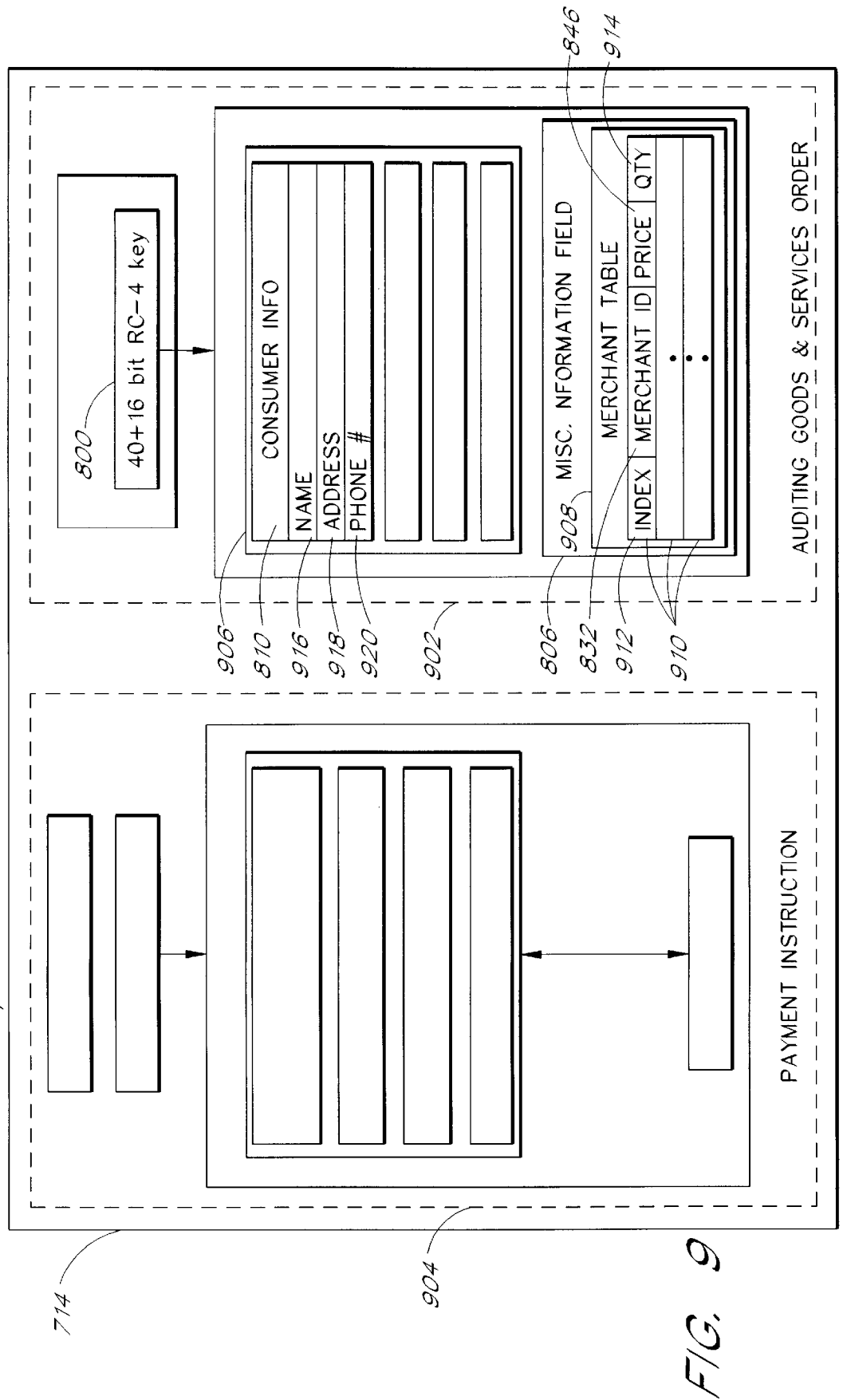
FIG. 9 illustrates the format of an auditing goods and services order/payment instruction packet (auditing GSO/PI packet) in the preferred embodiment of the present invention.

Referring now to FIG. 9, a block diagram of the preferred audit attachment 704 is shown. In the preferred embodiment, the audit attachment 704 comprises a uniquely formatted audit GSO/PI packet 714. The audit GSO/PI packet 714 contains an audit goods and services order 902 and an empty payment instruction 904.

The audit goods and services order 902 includes an RC4 encryption key 800, an auditing data packet 906, and the miscellaneous information field 806. The RC4 encryption key 800 is a 56-bit value based on the RC4 encryption scheme described above. The preferred embodiment encrypts the signed auditing data packet 906 and the miscellaneous information field 806 with the RC4 encryption key 800. The preferred embodiment then uses encrypts the RC4 encryption key 800 with the 768-bit on-line network public key 312. Thus, only the on-line network private key 408 can decrypt the auditing goods and services order.

The signed auditing data packet 906 contains a copy of the consumer information segment 810. The copy includes an auditing name field 916, an auditing address field 918 and an auditing phone number field 920. The miscellaneous information field 806 contains a merchant table 908. In the preferred embodiment, the merchant table 908 contains one or more rows 910. The number of rows 910 in the merchant table 910 correspond to the number of merchant attachments in the secure purchase order message 102.

Preferably, each row in the merchant table 910 contains an index value 912, the merchant identifier field 832, the price field 846 and a quantity value 914. The index value 912 is a 16-bit value which identifies the row's corresponding merchant attachment. The quantity value 914 is a 32-bit value which contains the quantity of items purchased in the secure purchase order message 102. The price field 846 is a 64 character value which contains the total purchase price of the items in the secure purchase order message 102. The merchant identifier field 832 is a 128-bit value which contains the merchant identifier 620.

V. Registration

Figure 10:
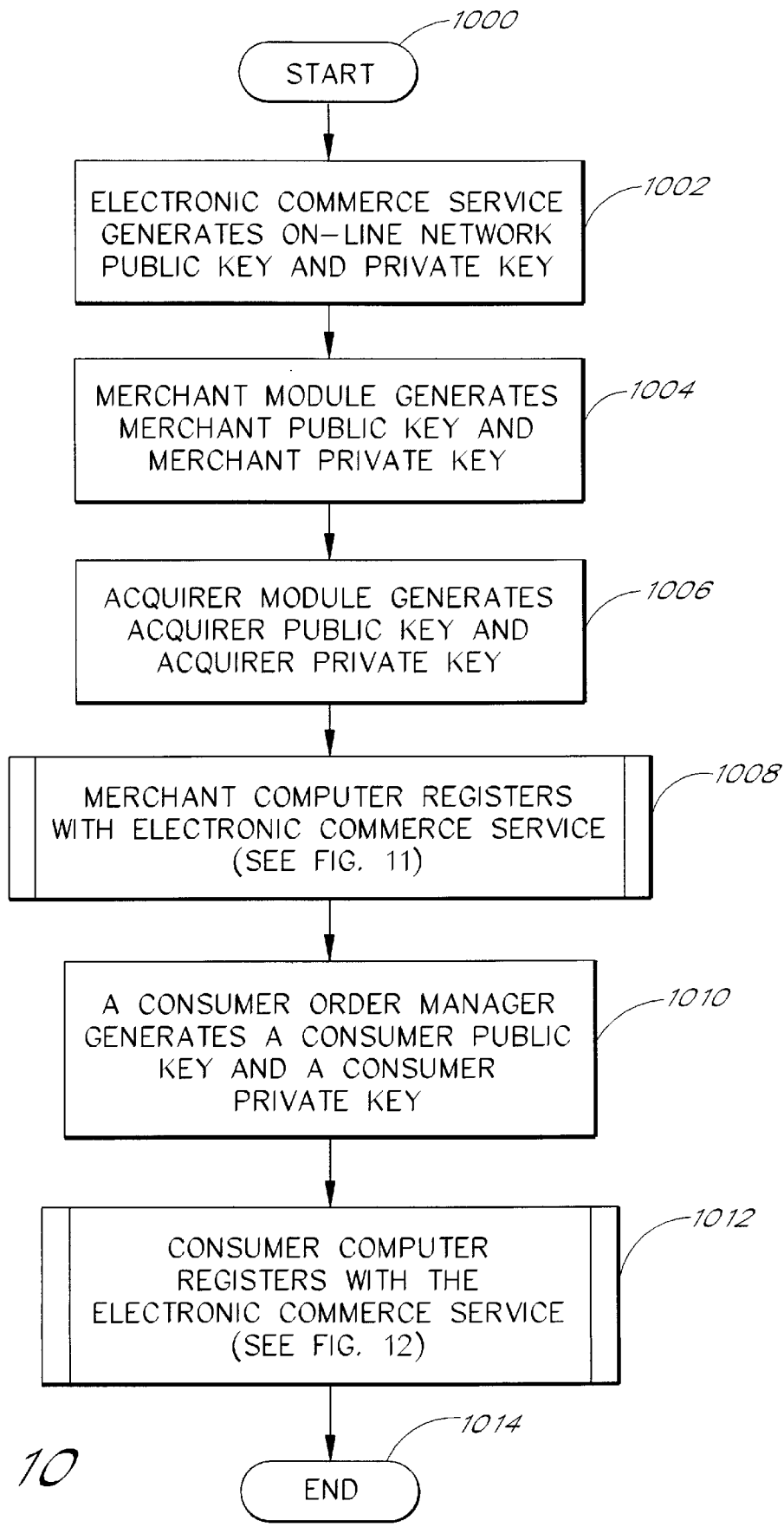
FIG. 10 illustrates a flow chart of one embodiment of the registration process.

FIG. 10 illustrates a high level flow chart of the sequence of states which occur during the registration process. Beginning in a start state 1000, a preferred embodiment of the present invention proceeds to state 1002. In state 1002, the electronic commerce service 104 generates the on-line network public key 312 and the on-line network private key 408. As discussed above, the generation of public key/private key pairs is well known in the art.

After generation of the on-line network public key 312 and the on-line network private key 408, the electronic commerce service 104 makes the on-line network public key 312 publicly available, and keeps the on-line network private key 408 private. In the preferred embodiment, software developers typically incorporate the on-line network public key 312 into the consumer applications 300, the order managers 302, the merchant modules 500 and the acquirer modules 502. In other embodiments, the software developers design the consumer applications 300, the order managers 302, the merchant modules 500 and the acquirer modules 502 to access the on-line network 106 so as to obtain the on-line network public key 312.

A. Merchant/Acquirer Registration

Proceeding to state 1004, the merchant module 500 of the preferred embodiment generates the merchant public key 308 and the merchant private key 504. In state 1006, the acquirer module 502 generates a acquirer public key 310 and an acquirer private key 506. As explained above, the merchant public key 308, the merchant private key 504, the acquirer public key 310 and the acquirer private key 506 are created with secure techniques known to one of ordinary skill in the art.

Figure 11:
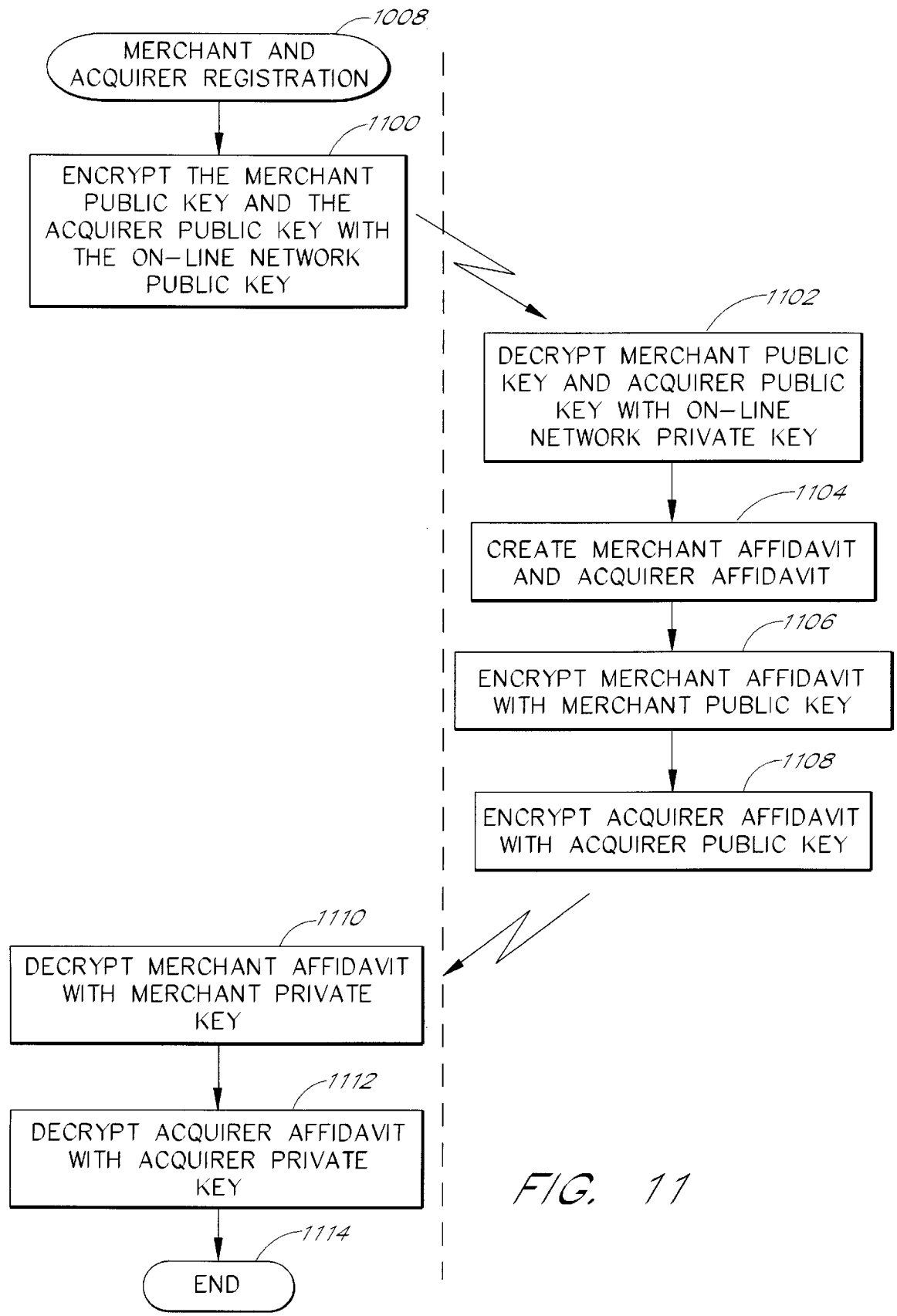
FIG. 11 illustrates a flow chart of one embodiment of the merchant registration process.

Proceeding to state 1008, the merchant computer 108 registers the merchant public key 308 and the acquirer public key 310 with the electronic commerce service 104. Referring now to FIG. 11, a detailed flow chart further illustrates the registration process of state 1008. Beginning in a start state 1008, the merchant computer 108 proceeds to state 1100 where the secured technology module 304 encrypts the merchant public key 308 and the acquirer public key 310 with the on-line network public key 312.

The electronic mail module 306 then sends the encrypted merchant public key 308 and the encrypted acquirer public key 310 to the bindery module 402 in the electronic commerce service 104. The preferred embodiment uses the on-line network public key 408 to encrypt the merchant public key 308 and the acquirer public key 310. Thus, only the bindery module 402 can decrypt the encrypted merchant public key 308 and the encrypted acquirer public key 310 with the on-line network private key 408. This prevents others from fraudulently acting as the bindery module 402.

Proceeding to state 1102, the bindery module 402 directs the secured technology module 304 in the electronic commerce service 104 to decrypt the merchant public key 308 with the on-line network private key 408. In addition, the bindery module 402 directs the secured technology module 304 to decrypt the acquirer public key 310 with the on-line network private key 408. The bindery module 402 then stores the decrypted merchant public key 308 and the decrypted acquirer public key 310 in the electronic commerce database 404.

Proceeding to state 1104, the secured technology module 304 digitally signs the merchant public key 308. In the preferred embodiment, the secured technology module 304 creates the digital signature by encrypting a data segment with the on-line network private key 408. The digital signature is then appended to the merchant public key 308. In the preferred embodiment, the digitally signed merchant public key 308 is called the merchant affidavit 410. In like manner, the secured technology module 304 also digitally signs the acquirer public key 310 to create the acquirer affidavit 412.

Proceeding to state 1106, the secured technology module 304 encrypts the merchant affidavit 410 with the merchant public key 308. Encrypting the merchant affidavit 410 with the merchant public key 308 ensures that only the merchant module 500 can view the merchant affidavit 410. In state 1108, the secured technology module 304 encrypts the acquirer affidavit 412 with the acquirer public key 310. Encrypting the acquirer affidavit 412 with the acquirer public key 310 ensures that only the acquirer module 502 can view the acquirer affidavit 412. During state 1108, the secured technology module 304 routes the encrypted merchant affidavit 410 and the encrypted acquirer affidavit 412 back to the merchant computer 108 via the electronic mail service 214.

Proceeding to state 1110, the merchant module 500 directs the secured technology module 304 to decrypt the encrypted merchant affidavit 410 with the merchant private key 504. Proceeding to state 1112, the acquirer module 502 directs the secured technology module 304 to decrypt the encrypted acquirer affidavit 412 with the acquirer private key 506. Once the secured technology module 304 decrypts the merchant affidavit 410 and the acquirer affidavit 412 in end state 1114, the merchant can publicly distribute the merchant affidavit 410 and the acquirer affidavit 412.

For example, the merchant could distribute a list of goods for sale, the merchant affidavit 410 and the acquirer affidavit 412 to a developer of a consumer application 300. The developer can then create a consumer application 300 such as a sales catalog which contains the items for sale, the merchant affidavit 410 and the acquirer affidavit 412. As explained in more detail below, when a user of the consumer application 300 purchases one of the items, the consumer computer 100 uses the information in the merchant affidavit 410 and the acquirer affidavit 412 to create a secured purchase order message 102.

B. Consumer Registration

In the preferred embodiment, the consumers do not register with the bindery. However, in other embodiments, the consumers may separately generate their own consumer public key and consumer private key. Referring now to FIG. 10, in these other embodiments, the order manager 302 in the consumer computer 100 continues the registration process in state 1010. In state 1010, other embodiments generate a consumer public key and a consumer private key. Proceeding to state 1012, the consumer computer 100 registers the consumer public key with the electronic commerce service 104 and keeps the consumer private key private.

Figure 12:
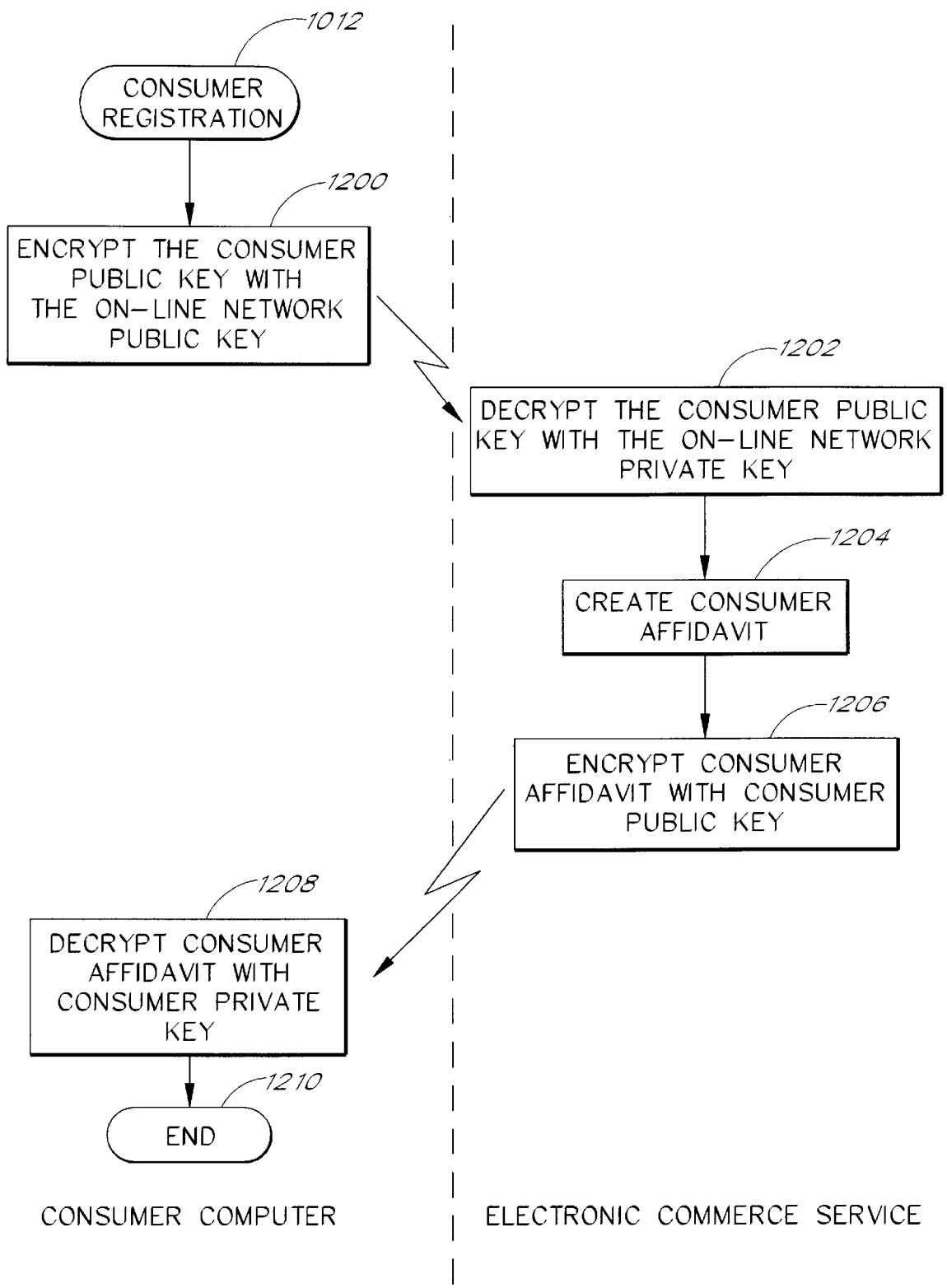
FIG. 12 illustrates a flow chart of one embodiment of the consumer registration process.

Referring now to FIG. 12, a detailed flow chart illustrates the consumer registration process of state 1012. Beginning in start state 1012, the secured technology module 304 proceeds to state 1200 and encrypts the consumer public key with the on-line network public key 312. Encrypting the consumer public key with the on-line network public key ensures that only the electronic commerce service 104 can view the consumer public key. During state 1012, the electronic mail module 306 sends an electronic message containing the encrypted consumer public key to the bindery module 402 in the electronic commerce service 104.

Proceeding to state 1202, the bindery module 402 directs the secured technology module 304 in the electronic commerce service 104 to decrypt the consumer public key with the on-line network private key 408. The bindery module 402 then stores the consumer public key in the electronic commerce database 404. Proceeding to state 1204, the secured technology module 304 digitally signs the consumer public key with the on-line network private key 408. In this embodiment, the digitally signed consumer public key is called the consumer affidavit.

Proceeding to state 1206, the secured technology module 304 encrypts the consumer affidavit with the consumer public key. Encrypting the consumer affidavit with the consumer public key ensures that only the order manager 302 can view the consumer affidavit. The bindery module 402 then creates an electronic mail message which contains the encrypted consumer affidavit. The electronic mail message is then routed back to the consumer computer 100 via the electronic mail service 214.

Proceeding to state 1208, the electronic mail module 306 in the consumer computer 100 receives the encrypted consumer affidavit and forwards it to the order manager 302. The order manager 302 then directs the secured technology module 304 to decrypt the consumer affidavit with the consumer private key and proceeds to end state 1210. Returning now to FIG. 10, the order manager 302 then proceeds to end state 1012. When a user of the consumer computer 100 purchases an item, this embodiment of the present invention includes the consumer affidavit in the secure purchase order message 102.

VI. Secured Transaction Processing

Figure 13B:
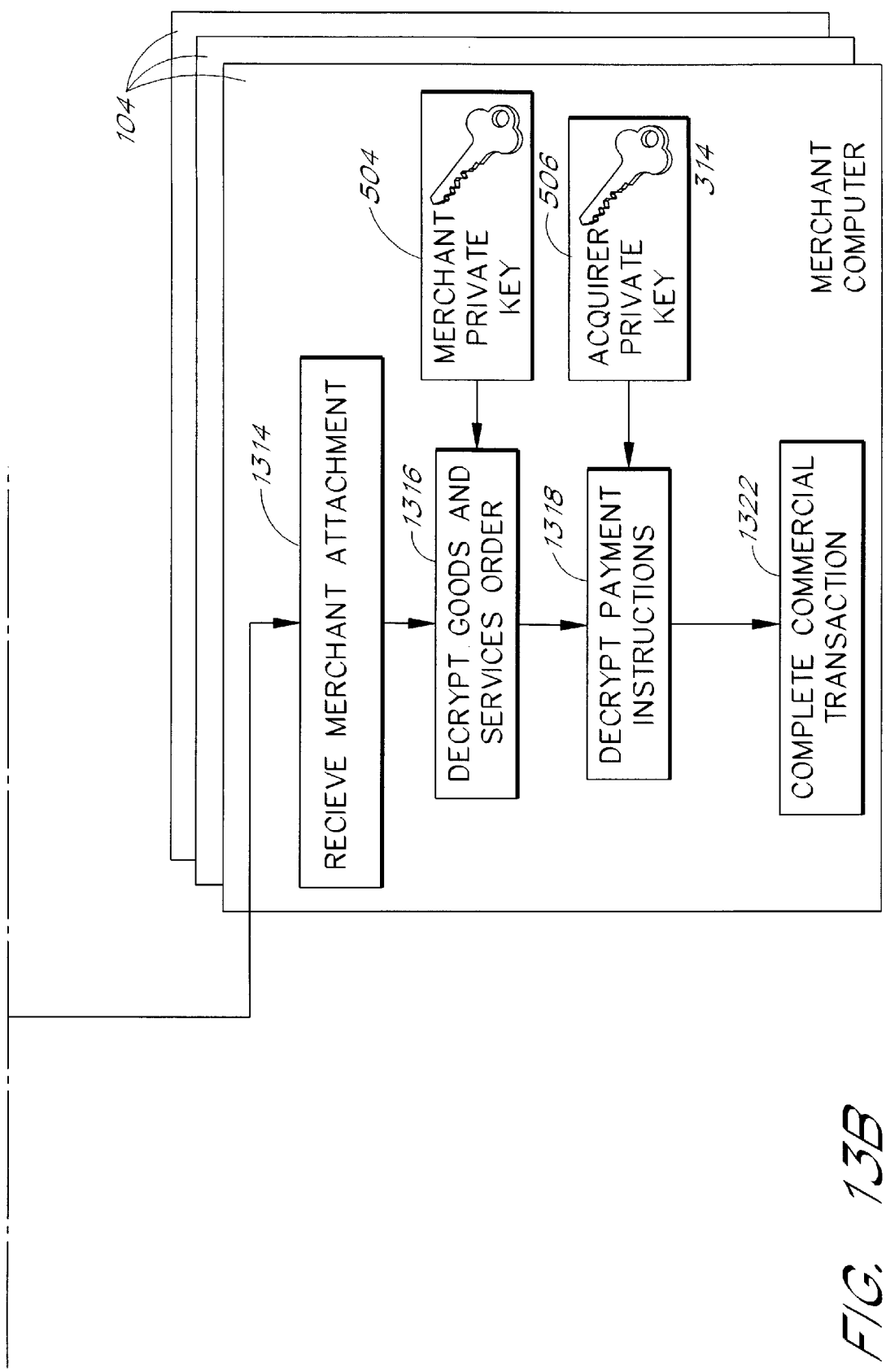

FIGS. 13A and 13B illustrate a data flow diagram of the sequence of states which occur during the commercial transaction process. The states illustrate the process of generating a purchase order message 102 which is electronically mailed to the electronic commerce service 104 in the on-line network 106. The electronic commerce service 104 extracts the audit attachment 704, makes backup copies, and routes the merchant attachments 706 to the proper merchant computers 108. The merchant computers 108 then process the merchant attachments 706.

A. Generating the Purchase Order Message

Beginning in a start state 1300, the end-user of the consumer computer 100 initiates a consumer application 300. For example, in state 1300, an end-user can initiate the consumer application 300 by selecting a menu option, selecting an icon, entering keyboard commands, mouse commands, voice commands and the like. Proceeding to state 1302, the end-user views the goods and services offered in the consumer application 300 and selects an item for purchase. For example, the consumer application 300 could display the image of a jacket which the end-user desires to purchase. The end-user then selects the jacket by manipulating an input device such as a keyboard, mouse, joystick, remote control, or voice processing unit.

Proceeding to state 1304, the consumer application 300 communicates with the order manager 302 to generate a secure purchase order message 102. In processing state 1304, the consumer application 300 communicates with the order manager 302 by calling the order manager application programming interfaces or functions. Typically, a software developer adds software instructions to the consumer application 300 which call the application programming interfaces in the order manager 302. Alternatively, as described above, a software developer can create software instructions which instantiate the OLE server which in turn calls the application programming interfaces in the order manager 302.

1. Creation Of The Order Object

In state 1304, the consumer application 300 of the preferred embodiment initiates the purchase order process by calling the BeginOrder function 320 (hereinafter referred to as the BeginOrder function 320). The BeginOrder function 320 uses well known object-oriented techniques to instantiate the order object 600. For example, if the end-user desires to purchase a shirt displayed by the consumer application 300, the end-user selects the shirt and the consumer application 300 calls the BeginOrder function 320 which instantiates the order object 600.

Figure 14:
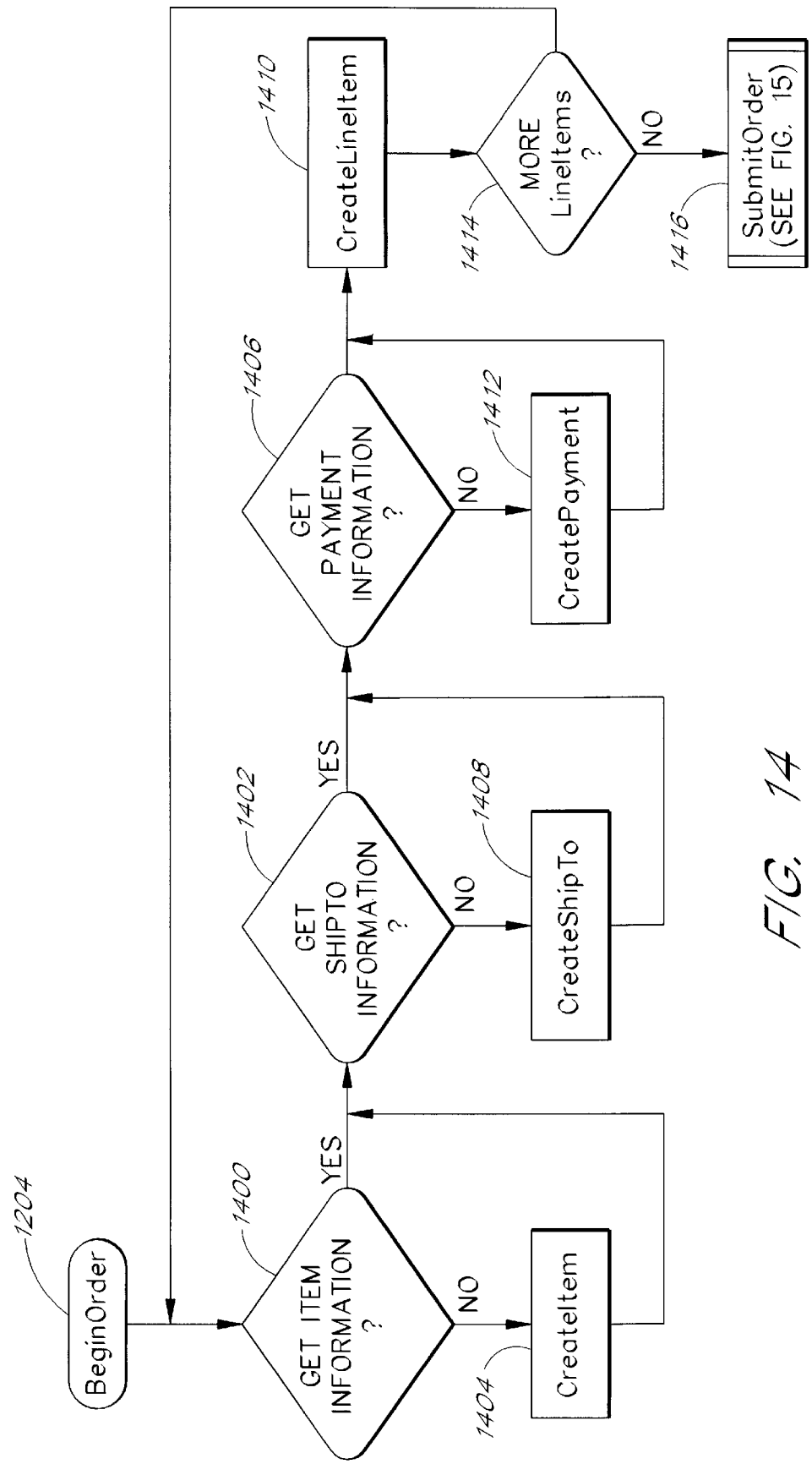
FIG. 14 illustrates a flow chart of one embodiment of the secured consumer transaction process in the consumer computer.

Referring now to FIG. 14, a detailed block diagram of the purchase order process is shown. After calling the BeginOrder function 320 in state 1304, the consumer application 300 proceeds to state 1400 where it determines whether it needs to create an item record 602 in the order object 600. For each item the end-user selects, the consumer application 300 determines whether a new item record 602 needs to be added to the order object 600. For example, if the item record 602 about the selected shirt has already exists in the order object 600, the consumer application 300 proceeds to state 1402. If, however, such an item record 692 does not exist in the order object 600, the consumer application 300 proceeds to state 1404.

In state 1404, the consumer application 300 calls the CreateItem function 322. When calling the CreateItem function 322, the consumer application 300 passes the summary 612, the price 616, the quantity value 618, the merchant identifier 620 and the shipment method 622 to the CreateItem function 322. The CreateItem function 322 uses well known object-oriented techniques to create the item record 602 and the item identifier 610. In addition, the CreateItem function 322 stores the summary 612, the price 616, the quantity value 618, the merchant identifier 620 and the shipment method 622 in the newly created item record 602.

For example, the first time an end-user selects a shirt, the consumer application 300 calls the CreateItem function 322 and passes a summary 612 of the shirt, the price 616 of the shirt, the quantity 618 of the shirts, the merchant identifier 620 of the merchant selling the shirt and the shipment method 622 to the CreateItem function 322. The CreateItem function 322 then uses known object-oriented techniques to create an item record 602 and an item identifier 610. In this example, the CreateItem function 322 then stores the summary 612 of the shirt, the price 616, the quantity value 618, the merchant identifier 620 and the shipment method 622 in the newly created item record 602.

If the end-user selects another item such as a watch, the consumer application 300 calls the CreateItem function 322 to creates another item record 602. However, if the end-user selects the same shirt a second time, such as when the user wants two of the same shirts, the consumer application 300 does not create a new item record 602. A new item record 602 is unnecessary because an item record 602 which contains information about the shirt already exists in the order object 600.

Proceeding to step 1402, the consumer application 300 determines whether to add any shipping information to the order object 600. For example, the end-user may desire to specify different shipping instructions for different items. If the end-user does not enter additional shipping information, the consumer application 300 proceeds to state 1406. If, however, the end-user enters additional shipping instructions, the consumer application 300 proceeds to state 1408 and calls the CreateShipTo function 324.

When calling the CreateShipTo function 324, the consumer application 300 passes the shipping name 652, the shipping address 654 and the phone numbers 656. The CreateShipTo function 324 then uses well known object-oriented techniques to create the shipto record 606 and the shipto identifier 650. The CreateShipTo function 324 accordingly stores the shipping name 652, the shipping address 654 and the phone numbers 656 in the newly created shipto record 606.

For example, if the end-user desires to have a purchased shirt delivered to the end-user's home, the end-user enters the end-user's name and home address into the consumer application 300. The consumer application 300 then calls the CreateShipTo function 324 and passes the end-user's name and shipping directions. The CreateShipTo function 324 creates the shipto record 606 and the shipto identifier 650 and stores the shipping name 652, the shipping address 654 and the phone numbers 656 in the newly created shipto record 606.

Proceeding to state 1406, the consumer application 300 determines whether any payment information needs to be added to the order object 600. For example, the end-user may desire to specify different payment methods for different items. For example, an end-user might use his Master-Card for one item and his Visa card for another item. If the consumer application 300 does not need to add new payment information, the consumer application 300 proceeds to state 1410. If new payment information needs to be added, the consumer application 300 proceeds to state 1412 and calls the CreatePayment function 326.

When calling the CreatePayment function 326, the consumer application 300 passes the end-user's credit card number 632, the expiration date 634, the issuing bank name 636, the billing address 638 and the card type 640. While in state 1412, the CreatePayment function 326 then uses well known object-oriented techniques to create the payment record 604 and the payment identifier 630. In addition, the CreatePayment function 326 stores the credit card number 632, the expiration date 634, the issuing bank name 636, the billing address 638 and the card type 640 in the newly created payment record 604.

For example, if the end-user desires to pay for an item with his Visa credit card, the end-user enters the Visa credit card information into the consumer application 300. When calling the CreatePayment function 326, the consumer application 300 then passes the end-user's Visa credit card number 632, the credit card expiration date 634, the issuing bank name 636, the end-user's billing address 638 and the card type 640. The CreatePayment function 326 then creates the payment record 604 and the payment identifier 630 and stores the Visa credit card information in the newly created payment record 604.

Proceeding to state 1410, the consumer application 300 creates the lineitem records 608. The use of different lineitem records 608 allows the creation of multi-item, multi-merchant purchase order messages 102 with independent item information, payment instructions and shipping information. In the preferred embodiment, the consumer application 300 calls the CreateLineItem function 328.

When calling the CreateLineItem function 328, the consumer application 300 passes the desired item identifier 610, the payment identifier 630 and the shipto identifier 650 to the CreateLineItem function 328. Using techniques known to one of ordinary skill in the art, the CreateLineItem function 328 creates a lineitem record 608, a lineitem identifier 670 and a source identifier 672. In addition, the CreateLineItem function 328 stores the passed item identifier 610, the payment identifier 630 and the shipto identifier 650 in the lineitem record 608. For example, if the end-user desires to purchase a shirt with his Visa credit card and have the shirt delivered to his home, the consumer application 300 passes the item identifier 610 which identifies the item record 602 containing information about the selected shirt, the payment identifier 630 which identifies the payment record 604 containing the Visa credit card information, and the shipto identifier 650 which identifies the shipto record 606 containing the end-user's home shipping address.

Proceeding to state 1414, the consumer application 300 determines whether to create any other lineitem records 608.

For example, if the end-user desires to purchase another item, the consumer application 300 proceeds to step 1400 and begins the process of creating another lineitem record 608. If, however, in state 1414, the end-user no longer desires to purchase additional items, the consumer application 300 proceeds to state 1416 and calls the SubmitOrder function 330.

2. Creation of the Transaction GSO/PI packet

Figure 15:
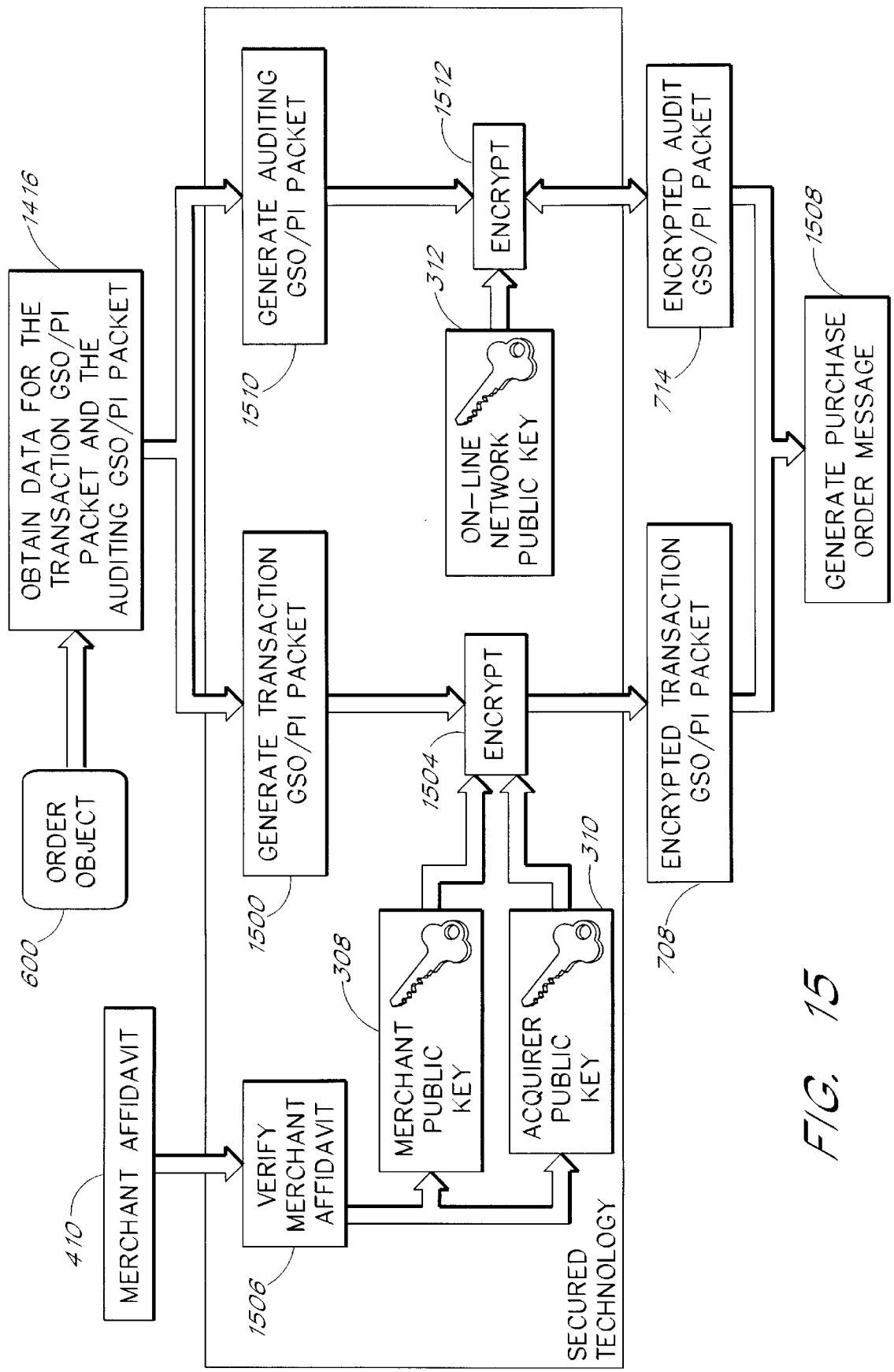
FIG. 15 illustrates a data flow diagram of one embodiment of the secured consumer transaction process in the consumer computer.

Referring now to FIG. 15, a data flow diagram of the SubmitOrder function 330 is shown. Beginning in state 1416, the SubmitOrder function 330 generates a transaction identifier 720 and a concatenated non-decreasing serial number. The SubmitOrder function 330 increases the serial number every time it creates a purchase order message 102. In state 1416, the SubmitOrder function 330 also obtains the transaction information from the order object 600. Furthermore, the SubmitOrder function 330 accesses the lineitem records 608 in the order object 600.

For each lineitem record 608 in the order object 600, the SubmitOrder function 330 creates an unencrypted transaction GSO/PI packet 708. Within the transaction GSO/PI packet 708, the SubmitOrder function 330 stores the transaction identifier 720 in the transaction identifier field 834. From the item record 602, the SubmitOrder function 330 stores the item summary 612 in the miscellaneous information field 806, stores the price 616 in the price field 846, stores the merchant identifier 620 in the merchant identifier field 832, and stores the shipping method 622 it in the miscellaneous information field 806.

During state 1416, the SubmitOrder function 330 also accesses the lineitem record 608 to obtain the payment identifier 630. Using the payment identifier 630, the SubmitOrder function accesses the payment information in the identified payment record 604 and stores the payment information in the transaction GSO/PI packet 708. In particular, the SubmitOrder function 330 stores the credit card number 632 in the credit card number field 860, stores the expiration date 634 it in the expiration date field 874, stores the issuing bank name 636 in the issuing bank field 872, stores the billing address 638 in the customer address field 822 and stores the card type 640 in the card type field 876.

During state 1416, the SubmitOrder function 330 also accesses the lineitem record 608 to obtain the shipto identifier 650. Using the shipto identifier 650, the order manager 302 accesses the shipping information in the identified shipto record 606 and stores the shipping information in the transaction GSO/PI packet 708. In particular, the SubmitOrder function 330 stores the customer's shipping name 652 in the customer name field 820, stores the customer's shipping address 654 in the customer address field 822, and stores the customer's phone number 656 in the customer phone number field 824.

During state 1416, the SubmitOrder function 330 accesses each lineitem record 608 in a similar manner. For example, if a commercial transaction contains more than one item, more than one merchant, more than one credit card account, or different shipping instructions, multiple lineitem records 608 will exist in the order object 600. Thus, the SubmitOrder function 330 will create separate transaction GSO/PI packets 708 for each lineitem record 608.

3. Creation Of The Auditing GSO/PI Packet

In state 1416, the order manager 302 also creates an unencrypted auditing GSO/PI packet 714 and accesses the lineitem records 608 to obtain the audit information. In the preferred embodiment, the SubmitOrder function stores the customer's shipping name 652 in the auditing name field 916, stores the customer's shipping address 654 in the auditing address field 918, and stores the customer's phone number 656 in the auditing phone number field 920.

For each lineitem record 608, the SubmitOrder function 330 also creates a new row 910 in the merchant table 908 and a new index value 912 which identifies the new row 910. Within each row, the SubmitOrder function 330 stores the price 616 in the price field 846, stores the quantity value 618 in the quantity field 914, and stores the merchant identifier 620 in the merchant identifier field 832.

For example, after an end-user has selected a shirt and a tie, two lineitem records 608 exist in the order object 600. The consumer application 300 then calls the SubmitOrder function 330 which creates the unencrypted auditing GSO/PI packet 704 and the merchant table 908. For each of the lineitem records 608, the SubmitOrder function 330 adds a row 910 of audit information 406 to the merchant table 908.

4. Encryption Of The Transaction GSO/PI Packet And The Auditing GSO/PI Packet

Proceeding to state 1500, the order manager 302 directs the secured technology module 304 to generate the secure transaction GSO/PI packet 708. As explained above, the secured technology uses Microsoft's Secured Transaction Technology, however, one of ordinary skill in the art will appreciate that a wide range of secure techniques could be used.

Proceeding to state 1504, the secure technology module 304 generates the RC4 encryption key 800. With the RC4 encryption key, the secured technology module 304 encrypts the signed merchant data packet 802, the consumer signature field 804 and the miscellaneous information field 806. The secured technology module 304 then encrypts the RC4 encryption key 800 with the merchant public key 308. This ensures that only the merchant computer 108 can decrypt the goods and service order 710.

In the preferred embodiment, the merchant public key 308 is obtained from the merchant affidavit 410. As explained above, the electronic commerce service 104 creates the merchant affidavit 410 when the merchant computer 108 registers the merchant public key 308. In the preferred embodiment, the merchant affidavit 410 contains the merchant public key 308, the acquirer public key 310 and the electronic commerce digital signature.

Focusing now on state 1506, the secured technology module 304 obtains the merchant affidavit 410 from the consumer application 300. During state 1506, the secured technology module 304 uses well known techniques to verify the merchant affidavit 410. In the preferred embodiment, the secured technology module 304 compares the electronic commerce digital signature with the on-line network public key 312 in order to determine if the appropriate relationship exists. If so, the secured technology module 304 uses the merchant public key 308 and the acquirer public key 310.

Returning to state 1504, the secured technology module 304 also generates the DES encryption key 862 and uses the DES encryption key 862 to encrypt the signed acquirer data packet 864 and the consumer digital signature field 804. The secured technology module 304 then encrypts the credit card number field 860 and the DES encryption key 862 with the acquirer public key 310. This ensures that only the acquirer can decrypt the payment instructions 712.

Proceeding to state 1508, the secured technology module 304 stores the encrypted transaction GSO/PI packets 708 in the merchant attachments 706. In addition, the secured technology module 304 stores the merchant public key 308 and the acquirer public key 310 in the merchant attachment 706. In the preferred embodiment, the secured technology module 304 creates a merchant attachment 706 for each lineitem record 608.

Focusing now on the encryption of the auditing GSO/PI packet 714, the secured technology module 304 proceeds to state 1510. In state 1510, the secured technology module 304 generates an auditing RC4 encryption key 800 and encrypts the auditing GSO/PI packet 714 with the auditing RC4 encryption key 800. The secured technology module 304 then encrypts the auditing RC4 encryption key 800 with the on-line network public key 312. This ensures that only the electronic commerce service 104 can decrypt the auditing goods and services order 902. In the preferred embodiment, the auditing payment instruction 904 is left empty. Proceeding to state 1508, the secured technology stores the encrypted auditing GSO/PI packet 704 in the audit attachment 704.

5. Creation Of The Secure Purchase Order Message

After creating the merchant attachments 706 and the audit attachment 704 in state 1508, the order manager 302 communicates with the electronic mail module 306 to create the secure purchase order message 102. In the preferred embodiment, the order manager 302 sends the merchant attachments 706, the audit attachment 704, the electronic commerce service destination 700, the transaction identifier 720, the date and time information 722, the order manager's dynamic link version 724 and the consumer application version 726 to the electronic mail module 306.

The electronic mail module 306 uses well known techniques to create the secure purchase order message 102. The electronic mail module 306 stores the address of the electronic commerce service 104 in the destination 700. In the subject field 702, the electronic mail module 306 stores the transaction identifier 720, the date and time information 722, the order manager dynamic link version 724 and the consumer application version 726. The electronic mail module 306 attaches the encrypted audit attachment 704 and the encrypted merchant attachment 706. The electronic mail module 306 then sends the secure purchase message 102 to the electronic commerce service 104.

B. Processing The Audit Attachment

Referring now to FIGS. 13A and 13B, the execution states associated with the electronic commerce service 104 are shown. In state 1306, the electronic mail service 214 receives the secure purchase order message 102 from the consumer computer 100. While in state 1306, the electronic mail service 214 forwards the secure purchase order message 102 to the electronic commerce service 104.

Proceeding to state 1308, the decryption module 400 obtains the audit attachment 704 from the secure purchase order message 102. The decryption module 400 then directs the secured technology module 304 in the electronic commerce service 104 to decrypt the audit attachment 704. In the preferred embodiment, the secured technology module 304 uses the on-line network private key 408 to decrypt the RC4 encryption key 800 in the auditing goods and services order 902. With the RC4 encryption key 800, the secured technology module 304 then decrypts the signed auditing data packet 906 and the merchant table 908.

Proceeding to state 1310, the decryption module 400 extracts the audit information 406 from the decrypted audit attachment 704 and stores it in the electronic commerce database 404. In particular, the decryption module 400 stores the data in the consumer information segment 906, the data in the merchant table 908 and copies of the encrypted merchant attachments 706 in the electronic commerce database 404.

Proceeding to state 1312, the decryption module 400 uses the merchant table to route each encrypted merchant attachment 706 to the proper merchant computer 108. In the preferred embodiment, each row in the merchant table corresponds to one of the merchant attachments 706. Beginning with the first row, the decryption module 400 obtains the merchant identifier 620 from the merchant identifier field 832. The decryption module 400 then uses the merchant identifier 620 to locate the merchant's electronic mail address in the electronic commerce database 404. Thus, the electronic commerce service 104 uses the merchant identifiers 620 identify the destination address of the encrypted merchant attachments 706.

Proceeding to state 1312, the decryption module 400 generates a merchant electronic mail message which contains the merchant's electronic mail address and the encrypted merchant attachment 706. The decryption module 400 then forwards the merchant electronic mail message to the electronic mail service 214 which sends the merchant electronic mail message to the merchant computer 108.

If another row exists in the merchant table, the decryption module 400 prepares an electronic mail message for the next merchant. Thus, during state 1312, the decryption module 400 continues to generate the merchant electronic mail messages until every merchant attachment 706 has been sent to a merchant computer 108.

C. Processing The Merchant Attachments

Referring now to the data flow states in the merchant computers 108, in state 1314 the electronic mail module 306 in the merchant computer 108 receives the electronic mail messages generated by the electronic commerce service 104. In the preferred embodiment, the merchant module 500 executes the GetOrder function 520. The GetOrder function 520 uses known techniques to retrieve the merchant electronic mail message from the electronic mail module 306.

Proceeding to state 1316, the merchant module 500 directs the secured technology module 304 in the merchant computer 108 to decrypt the merchant GSO/PI packet 708. Preferably, the secured technology module 304 uses the merchant private key 504 to decrypt the RC4 encryption key 800 in the merchant goods and services order 710. With the RC4 encryption key 800, the secured technology module 304 encrypts the signed merchant data packet 802, the consumer digital signature field 804 and the miscellaneous information field 806.

In other embodiments, the secured technology module 304 also obtains the consumer public key from the consumer's affidavit field 848. The secured technology module 304 then compares the consumer digital signature field 804 with the consumer public key in order to determine if the appropriate relationship exists. If so, the secured technology module 304 indicates that the data in the merchant signed data packet 802 is authentic.

Proceeding to state 1318, the merchant module 500 sends a credit confirmation 122 to the acquirer module 502. In the preferred embodiment, the merchant module 500 executes the CreateAuthRequest function 522 to generate the credit confirmation 122. In the preferred embodiment, the credit confirmation 122 contains the encrypted payment instructions 712.

In state 1318, the acquirer module 502 receives the payment authorization request 110 and decrypts the payment instruction 712. In the preferred embodiment, the acquirer module 502 directs the secured technology module 304 to decrypt the payment instruction 712. The secured technology module 304 encrypts the DES encryption key 862 and credit card number field 860 with the acquirer private key 506. With the DES encryption key 862, the secured technology module 304 decrypts the signed acquirer data packet 864 and the consumer's digital signature field 804.

After decryption of the payment instructions, the acquirer module 502 uses the data in the credit card number field 860, customer information segment 810, the credit card information segment 870 and the other information segment 814 to determine whether the customer has sufficient funds. In the preferred embodiment, the acquirer module 502 executes the ProcessAuthRequest function 530 to determine whether the customer has sufficient funds. The ProcessAuthRequest function 530 uses techniques which are well known in the art to compare the funds available in a user's credit account with the amount of the purchase.

After processing the credit request 120, the acquirer module 502 sends a payment authorization response 114 back to the merchant module 500. In the preferred embodiment, the acquirer module 502 executes the CreateAuthResponse function 532. The CreateAuthResponse function 532 uses known techniques to generate the payment authorization response 114 and send it back to the merchant module 500.

Upon receiving the payment authorization response 114, the merchant module 500 process the payment authorization response 114 with the ProcessAuthResponse function 524. If the acquirer module 502 denies the credit request, the ProcessAuthResponse function 524 denies the commercial transaction and sends a denial message back to the consumer computer 100. If, however, the acquirer module 502 authorizes the credit request, the ProcessAuthResponse function 524, proceeds to state 1322 and completes the requested commercial transaction.

Proceeding to state 1322, the merchant module 500 delivers the requested goods and services and generates a receipt. In the preferred embodiment, the merchant module 500 creates the receipt with the CreateReceipt function 526. The CreateReceipt function 526 creates a receipt detailing the goods and services the merchant has provided to the end-user. In other embodiments, the CreateReceipt function 526 directs the secured technology to encrypt the receipt with the consumer public key. The encrypted receipt is then electronically mailed to the consumer computer 100 where the receipt is decrypted with the consumer private key.

While the above detailed description has shown, described and pointed out the fundamental novel features of the invention as applied to a preferred embodiment, it will be understood that various omissions and substitutions and changes in the form and details of the illustrated device may be made by those skilled in the art without departing from the spirit of the invention. Consequently, the scope of the invention should not be limited to the foregoing discussion but should be defined by the appended claims.

VII. Appendix

The following Appendix forms part of the specification hereof and contains the "*Secured Transaction Technology Open Specification/Wire Formats and Protocols, version 0.902.*" published by the Microsoft Corporation. While the preferred embodiment uses Microsoft's Secured Transaction Technology, one of ordinary skill in the art will appreciate that a wide range of secure techniques can be used to implement the present invention.

Microsoft Corporation's Secure Transaction Tech~~~gy    ~~~p://www.microsoft.com/windows/ie/stt.htm

STT Wire Formats and Protocols version 0.902

5 Oct 1995

Copyright (c) 1995 Visa International Service Association and Microsoft Corporation. All rights reserved. Permission to copy the material contained herein is granted subject to the conditions that (i) any copy or re-publication must bear this legend in full, and (ii) that none of the copyright holders shall have any responsibility or liability whatsoever to any party arising from the publication of the material contained herein.

Visa and Microsoft hereby grant to any party a royalty-free, worldwide, perpetual license to use the material contained herein to make, use, and sell products and services that conform to the Secure Transaction Technology Specifications contained herein. The authors of this documentation make no representation or warranty regarding whether any particular physical implementation of any part of these Specifications does or does not violate, infringe, or otherwise use the patents, copyrights, trademarks, trade secrets, know-how, and/or intellectual property of third parties, and thus any person who implements any part of these Specifications should consult an intellectual property attorney before any such implementation. The following Specifications include public key encryption technology, which is the subject matter of patents in several countries. Any party seeking to implement these Specifications is solely responsible for determining whether their activities require a license to any patents, including, but not limited to, patents on public key encryption technology. Visa International Service Association and Microsoft Corporation shall not be liable for any party's infringement of any intellectual property right.

1. Introduction

STT (Secure Transaction Technology) is a protocol provided by Microsoft and Visa International to the financial and technical communities for review and comment. Comments on this specification are welcome. Please email comments to STT@microsoft.com STT is desgned to handle secure payment with bank cards over insecure data transaports like the Internet.The protocol requires only reliable message transport, such as TCP. It features strong, export-approved DES encryption of financial information, direct RSA (TM) encryption of bank card account numbers, and mandatory authentication of all participants, including clients, for reduced financial risk. [1]

IMPORTANT NOTE

This document covers the International Version of the STT protocol, which includes DES encryption of all financial data, direct RSA encryption of bank card account numbers, and 40-bit RC4 encryption of the purchasing order form contents and receipt. A US/Canada version of the protocol with triple-DESencryption of the order, receipt, and all financial data and direct RSA encryption of bank card account numbers will be documented and published in the near future.

STT is independent of other authentication and privacy protocols. An implementation of STT is being developed by Microsoft and an authentication trust hierarchy will be operated by VISA. Implementation plans and schedules are not covered in this document. This document is a terse technical companion to a much more thoroughgoing exposition of STTfor general audiences.

This document presents protocols and message formats for version 1.0 of STT. Protocols are the conditions under which messages are sent. Message formats are presented as they appear "on the wire". The purpose of this document is to facilitate implementation of interoperable STT applications. The target audience is software developers. Section 9 presents the protocols and earlier sections cover formats. All formats are little-endian, favoring performance on Intel X86 and compatible platforms, which make up the majority of the installed base of personal computers. All objects are byte-packed: pad bytes are explicitly denoted.

Microsoft Corporation's Secure Transaction Tech___gy       ___://www.microsoft.com/windows/ie/stt.htm Encrypted messages are shown in their plaintext forms. A separate section explains STT's use of bulk data symmetric-key cryptography. STT uses RSA public-key cryptography (PKC) to protect bank card numbers and bulk data encryption keys and for digital signatures. Message-creating software should construct plaintext messages, then sign and encrypt them, in that order, as described in detail below. Message-reading software should decrypt, verify signatures, then parse plaintext.

STT Version 1 character string data is ANSI. STT may support UNICODE or other multibyte character sets in future versions.

Note on Randomness

STT uses cryptographic algorithms and globally unique IDs (GUIDs) that require truly random information, as opposed to mere pseudorandom information. STT-compliant implementations shall take advantage of as much physically random information as is available on their platforms. Truly random information must be noise from the world external to the strictly deterministic parts of the machine. The best source of such noise is direct human interaction with the machine. Some information may be collected in real time by asking the user, for example, to type for a while or move the cursor around randomly. This is the preferred method for implementations of STT, though it is recognized that it trades off against user interface concerns. Other information may have accumulated over the lifetime of the machine as users create and delete files, processes, install and remove software, and so on. The following list is a small fraction of the amount of random information that systems programmers can access. The "true entropy" of these sources ranges from high, for those sources that change rapidly in time, to low, for those sources that do not or are likely to be the same from one machine to the next.

- the number of files on any mounted hard disks
- the numbers of files in each directory, recursively
- the amount of free space on each disk
- the amount of free space in each free block in every file system free chain
- the system time
- high-precision clocks on the system board and peripherals
- the cursor or mouse pointer location
- accumulated physical state information in keyboard input buffers, i/o service queues, video drivers
- any performance measurement instrumentation, such as cache miss counts and rates, processor utilization statistics, memory statistics, scheduler statistics, file system statistics, etc.
- the state of main memory and peripheral memory on the bus, such as video cards, including such information as the number of heaps, the number of free blocks in each heap, the addresses and sizes of each free block, selected data bits in various memory buffers, the number of items on the clipboard, and so on
- the number of tasks in the OS scheduling queue, their task ids, their code base addresses and sizes
- customization information, such as the current screen saver name, color specifications for windows, environment variables, lists of installed software, initialization scripts (like autoexec.bat, win.ini, system.ini, etc., on Microsoft Windows platforms)
- screen state information, such as the sizes and locations of all windows, the sizes of overlapping and obscured regions All such data should be melded through a mixing and compression function, such as MD5 or SHA, so that correlations from run to run or boot to boot will be destroyed. XOR is not an adequate mixing function, since it allows reversal of the addition of noise. STT-compliant software shall seed pseudorandom number generators with physically random information and shall frequently update the seed with physically random information. STT-compliant software shall also use seeds of at least 160 bits. See Internet RFC 1750 for general information on randomness.

2. Type Hierarchy and Notation

STT messages are made up of data objects, or just objects. Data objects are instances of data types. Data types include Atoms and Low-Level Composites. A meta-data type callled a TLV serves both as a grouping construct and to define higher-level types.

Objects are written in Cambridge Prefix Notation with the type first, followed by an optional literal value and an optional symbolic name that might be used in expository text or later definitions to refer to the object. So, for example, a Byte called bFoo is written as follows:

(BYTE bFoo)

A BYTE object not needing a name would be written

-50-

Microsoft Corporation's Secure Transaction Tec'  ·gy                                    ɔ://www.microsoft.com/windows/ie/stt.htm

```
(BYTE)
``` or, where unambiguous, as

```
BYTE
```

Cambridge Prefix Notation also denotes ordered collections or sequences of objects. On the wire, these objects appear in time order; in memory, they appear as byte-packed concatenations. So, for example, A BYTE called bFoo followed by a CString called customerName and DWORD called dwCount is written as follows:

```
((BYTE     bFoo)
 (CString  customerName)
 (DWORD    dwCount))
```

If these objects did not need names, the same sequence would be written

```
((BYTE) (CString) (DWORD))
```

A fixed-length array or stream of N objects of type X has type X[N], a pseudo-C notation. So, for example, the type of an array of BYTEs of length cb is written

```
BYTE[cb]
```

The optional value field is written as a numeric or string constant, as in

```
(WORD 0x1234)
``` or

```
(BYTE[4] "RSA1")
``` denoting a BYTE array holding a character string, or in

```
(BYTE[4] 0x23 rgbFoo)
``` denoting a BYTE array named rgbFoo and filled with repititions of 0x23.

Complexity is built by defining new types. So, for example, the expression

```
(define-type BOGEY
  ((BYTE     bFoo)
   (CString  customerName)
   (DWORD    dwCount)))
``` gives the name BOGEY to the sequence shown. In later expressions, BOGEY may be used as a stand-in expression for the sequence, shortening the notation and removing redundancy with its concomitant possibility for error. Define-type also admits some automated consistency checks on the notation.

Comments inline to the Cambridge Notation are preceded by semicolons.

3. Atoms

The following are the plaintext formats of STT's data atomic data types.

```
BYTE: 8-bit unsigned integer.

WORD: 16-bit unsigned integer, low-order byte first on the wire
    (or, in memory, at lower byte address).  STT writes the number
    of bytes in a WORD as the symbolic constant cbW, which equals 2.

DWORD: 32-bit unsigned integer, low-order WORD first.  STT writes
    the number of bytes in a DWORD as the symbolic constant cbDW,
    which equals 4.

QWORD: 64-bit unsigned integer, low DWORD followed by high DWORD.

DECFLOAT: decimal floating point.  This atom type is reserved for
    future versions of STT.

RSA1KE: RSA encryption of a 128-byte quantity under a 1024-bit
    modulus.

RSA.75KE: RSA encryption of a 96-byte quantity under a 768-bit
    modulus.
```

-51-

Microsoft Corporation's Secure Transaction Tec[...]gy     [...]://www.microsoft.com/windows/ie/stt.htm

```
RSA.5KE: RSA encryption of a 64-byte quantity under a 512-bit
   modulus.
CString: character count followed by string data (ANSI chars).
   Character count is contained in either a byte, 3 bytes, or 7
   bytes, as follows:
   1. If the first byte is between 0 and 0xFE, inclusive, this is
      the character count.

2. If the first byte is 0xFF and the next word is between 0 and
      0xFFFD, inclusive, then the WORD contains the character
      count.

3. Finally, if the first byte is 0xFF and the next word is
      0xFFFF, then the following DWORD contains the character
      count.

4. RESERVATION: in the future, STT may support UNICODE
      CStrings. These are denoted by (BYTE 0xFF), followed by
      (WORD 0xFFFE), followed by a UNICODE character count -- not
      a byte count -- as encoded in 1, 2, and 3. above.
```

4. Low-level Composites

4A. GUID

OSF/DCE Globally Unique ID. GUIDs are also known as UUIDs in the network literature. There is an ISO standard for their format and generation. They must be guaranteed to be unique across space and time. They are a standard part of the Open Software Foundation's (OSF) Distributed Computing Environment (DCE). They are necessary for the correct operation of many network protocols, such as Kerberos. It is very unlikely that an STT developer will be working on a platform that does not support validated GUID-generating software.

The following is a brief synopsis of one GUID-generating algorithm. More details may be found in the citations below.

If your machine contains a network card with a 48-bit IEEE network card hardware address, this globally unique address will be incorporated into the GUID. Otherwise a random pseudo-address is created from machine state information that is extremely likely to have been affected by truly random events, especially human interaction with devices and the file system. See the Note on Randomness in the Introduction for more.

The following excerpts on net hardware addresses are taken from

```
      Project 802: Local and Metropolitan Area Network Standard
      Draft Standard P802.1A/D10 1 April 1990
      Prepared by the IEEE 802.1

--- begin quote ------------------------------------------------

Page 18: "5. Universal Addresses and Protocol Identifiers

The IEEE makes it possible for organizations to employ unique
individual LAN MAC addresses, group addresses, and protocol
identifiers. It does so by assigning organizationally unique
identifiers, which are 24 bits in length. [...] Though the
organizationally unique identifiers are 24 bits in length, their
true address space is 22 bits. The first bit can be set to 1 or
0 depending on the application. The second bit for all
assignments is zero. The remaining 22 bits [...] result in
2**22 (approximately 4 million identifiers).

[...] The multicast bit is the least significant bit of the
first octet, A.

[...] 5.1 Organizationally Unique Identifier

[...] The organizationally unique identifier is 24 bits in
length and its bit pattern is shown below. Organizationally
unique identifiers are assigned as 24 bit values with both
values (0,1) being assigned to the first bit and the second bit
being set to 0 indicates that the assignment is universal.
Organizationally unique identifiers with the second bit set to 1
are locally assigned and have no relationship to the
IEEE-assigned values (as described herein).

The organizationally unique identifier is defined to be:

1st bit                    24th bit
```

-52-

Microsoft Corporation's Secure Transaction Tech... gy     ...p://www.microsoft.com/windows/ie/stt.htm

```
      |                   |
      a  b  c  d  e ....... x  y
      |  |
      |  Always set to zero
      Bit can be set to 0 or 1 depending on application
```

[...] 5.2 48-Bit Universal LAN Mac Addresses

```
[...] A 48 bit universal address consists of two parts.  The
first 24 bits correspond to the organizationally unique
identifier as assigned by the IEEE except that the assignee may
set the first bit to 1 for group addresses or set it to 0 for
individual addresses.  The second part, comprising the remaining
24 bits, is administered locally by the assignee.
[...]

octet:
     0         1         2         3         4         5
  0011 0101 0111 1011 0001 0010 0000 0000 0000 0000 0000 0001
  |
  First bit transmitted on the LAN medium.  (Also the
  Individual/Group Address Bit.)  The hexadecimal representation
  is: AC-DE-48-00-00-80

The Individual/Group (I/G) Address Bit (1st bit of octet 0) is
used to identify the destination address either as an individual
or as a group address.  If the Individual/Group Address Bit is
0, it indicates that the address field contains an individual
address.  If this bit is 1, the address field contains a group
address that identifies one or more (or all) stations connected
to the LAN.  The all-stations broadcast address is a special,
pre-defined group address of all 1's.

The Universally or Locally Administered Address Bit (2nd bit of
octet 0) is the bit directly following the I/G bit.  This bit
indicates whether the address has been assigned by a local or
universal administrator.  Universally administered addresses
have this bit set to 0.  If this bit is set to 1, the entire
address (i.e.: 48 bits) has been locally administered."

--- end quote -------------------------------------------------
```

Also, see the following

> DEC / HP, Network Computing Architecture Remote Procedure Call Run Time Extensions Specification Version OSF TX1.0.11 Steven Miller July 23, 1992 (Chapter 10 describes UUID allocation)

A GUID has the following wire format:

```
(define-type GUID
   ((DWORD    data1)
    (WORD     data2)
    (WORD     data3)
    (BYTE[8]  data4)))
```

4B. XID

Each entity, e.g., cardholder, merchant, bank, in STT has a GUID. In the Microsoft implementation, the lifetime of this GUID is the lifetime of the installation of the STT software. It is possible for the same entity to have many GUIDs: typically one for every time STT software has been installed.

Transaction-initiating messages sent by an entity are stamped with its current GUID preceded by a QWORD containing a non-decreasing serial number. The composite of a GUID and a qwSerial is called an XID, for transaction ID. Responses to the transaction-initiating message contain the XID of the corresponding initiating message.

STT-compliant applications must guarantee that the serial number never decrease for a given GUID, and that the GUID is generated by validated software when STT software is installed on a machine. Implementations must guarantee that the serial number is non-decreasing for each GUID, and, thus, that no two transactions have the same XID.

STT-compliant applications shall guarantee idempotency of the protocol by examining XIDs. For example, a payment server will reject attempts to replay payment requests from merchants. It will detect these attempts by examining the XID of the payment request and XID of the embedded payment instruction, separately signed and encrypted by the cardholder.

Microsoft Corporation's Secure Transaction Technology     http://www.microsoft.com/windows/ie/stt.htm An XID has the following wire format:

```
(define-type XID
    ((QWORD  SerialNumber)       ;Per-Guid, non-decreasing
     (GUID   InstallationGuid)))
```

4C. CMoney

All amounts in STT are contained in CMoneys, which appear as follows:

```
(define-type CMoney
    ((WORD   CountryCode)   ;ISO 4217 Country Code.
     (QWORD  Amount)))      ;fixed-point with four decimals
```

4D. DATE

A QWORD representing the number of 100-nanosecond intervals since midnight UTC at the beginning of 1 Jan 1601.

```
(define-type DATE
    (QWORD))
```

4E. TLV (Tag, Length, Value) A TLV is a metadata format for generic, self-describing, byte-packed, streamed, aggregate data objects.

Messages are composed of TLVs to support forward and backward compatibility. Old software will be able to read new messages because it will tags it does not recognize. New software will continue to read old messages since tags are never removed from the TLV tag space documented below.

The full notation for a TLV is

```
(<Tag> <Length> <Value>)
``` where <Tag> is replaced with a member of the Tag Space documented below, <Length> is a byte count for the <Value>, <Value> is replaced with actual notations of the kind shown so far and to follow. This denotes a TLV with the indicated Tag, Length, and Value. There are many cases where the Length equals the sum of the lengths of a set of nested data objects, and the Value equals a concatenation of the nested objects. The shorthand

```
(<Tag> <Value>)
``` denotes this case. Since TLV notations tend to become deeply nested, it is sometimes convenient to give the value field a symbolic name for documentation purposes. The name is written in a comment on the same line as the tag:

```
(<Tag>      ;My Value's name is "Foo"
 <Value>)   ;This is the definition of "Foo"
```

Note this differs from the notation for Atoms and Composites, where a symbolic name is enclosed with the type in parentheses. In all these cases, a description of the Value contents is carried out in embedded Cambridge Notation.

In some cases, the Value is an undifferentiated byte stream. The notation may be further streamlined in these cases by omitting the Value altogether, resulting in merely

```
(<Tag>)
```

On the wire, all TLVs appear as follows:

```
((DWORD            dwTag)
 (DWORD            dwLength)
 (BYTE[dwLength]   rgbValue))
```

4F. TV (Tag, Value) A TV is an optimized metadata format similar to TLVs except that the length of a TV is either statically known or can be determined by another method, as with CStrings, and therefore the Length field of a TLV is unecessary.

The notation

-54-

Microsoft Corporation's Secure Transaction Technology     http://www.microsoft.com/windows/ie/stt.htm

```
(<Tag> <Value>)
``` suffices for TVs, with a possible name as a comment.

On the wire, TVs appear as follows:

```
((DWORD             dwTag)
 (BYTE[knownLength] rgbValue))
```

4G. RSAKey

This is the type of RSA Encryption and Signature Keys. STT RSA moduli have the followinglengths:

```
* Root signature key:                  2048 bits (256 bytes)
* All other signature keys:            1024 bits (128 bytes)
* Issuer & Acquirer key-exchange keys: 1024 bits (128 bytes)
* Merchant key-exchange key:            768 bits ( 96 bytes)
* Client key-exchange key:              512 bits ( 64 bytes)
```

Thus, there are four key formats, distinguished by key size. On the wire, RSA keys appear as follows:

```
((BYTE[4]               "RSA1")
 (DWORD                 cbitsMod)    ;bit length of modulus
 (DWORD                 publicexp)   ;public exponent
 (BYTE[cbitsMod/8]      modulus))    ;modulus data, little-endian.
```

The complete RSA Key block typess have the following symbolic names (which are used frequently in the rest of this document) and sizes, including the 12 bytes of overhead documented above:

```
* RSA2K:   268 B (cbitsMod = 2048)
* RSA1K:   140 B (cbitsMod = 1024)
* RSA.75K: 108 B (cbitsMod =  768)
* RSA.5K:   76 B (cbitsMod =  512)
```

It is therefore useful to add the following composites to the type system:

```
(define-type RSA-common
    ((BYTE[4]  "RSA1")
     (DWORD    cbitsMod)
     (DWORD    publicExp)))

(define-type RSA2K    (RSA-common (BYTE[256] modulus)))
(define-type RSA1K    (RSA-common (BYTE[128] modulus)))
(define-type RSA.75K  (RSA-common (BYTE  [96] modulus)))
(define-type RSA.5K   (RSA-common (BYTE  [64] modulus)))
```

4H. DESKey

This is the RSA Envelope for DES keys and bank card Account Numbers. DESKeys are used to hide DES keys and account numbers from adversaries. The DES keys are generated randomly and used to encrypt bulk financial data.

There is some similarity to RC4Keys, documented further below. It would be possible to document a common abstraction, but it was deemed less confusing to document DESKeys and RC4Keys separately, despite the common elements.

The first 12 bytes are header data in the clear. Following the header data is a 128-byte, RSA-encrypted DEKB, and then an 8 byte initialization vector. A DEKB is a DESK diffused with Optimal Asymmetric Encryption Padding (OAEP), a method first described by Bellare and Rogaway[2] for diffusing the contents of RSA envelopes to forestall information-theoretic attacks.

All DESKeys are the same length since they are all encrypted with RSA1K keys. All DESKeys are 12+128+8=148 bytes long, with 12 bytes of fixed overhead, 128 bytes of RSA-encrypted DEKB, and 8 bytes containing an initialization vector.

First, we describe DESK, then DEKB, and finally DESKey

DESK

A DESK is a plaintext DES key concatenated with a Bank Card Account Number of at most 32 bytes. Its format is:

Microsoft Corporation's Secure Transaction Tec[...]gy         [...]p://www.microsoft.com/windows/ie/stt.htm

```
(define-type DESK                          ;total length = 119
    ((DWORD          8  cbKeyProper)
     (BYTE[8]           rgbKey)            ;the DES key proper
     (DWORD         32  cbBankCardNumber)  ;actually, up to 32 bytes
     (BYTE[32]          BCN)               ;bank card number
     (BYTE[71]       0  padding)))
```

Every DESK is 119 bytes long because the RSA modulus for encrypting DES keys in STT is always 128 bytes = 1024 bits and nine bytes are needed for OAEP and overflow protection.

Each byte of rgbKey contains 7 bits of key data + 1 check bit in position 0, as specified in FIPS 81.

The byte length of the bank card number data must be less than or equal to 32. The data format is application-dependent.

DEKB

To diffuse a DESK and, thereby, to create a DEKB:

1. Generate a fresh, 8-byte, random RC4 key -- the OAEP key
2. Generate 119 bytes from RC4 using the OAEP key
3. XOR these bytes into DESK, resulting in DiffusedDESK
4. Hash DiffusedDESK with SHA
5. XOR the OAEP key with the hash, resulting in rgbHx
6. Concatenate rgbHx and a byte of overflow space to DiffusedDESK, resulting in DEKB The plaintext of a DEKB, then, is the following:

```
(define-type DEKB
    ((BYTE[119]      DiffusedDESK)
     (BYTE[8]        rgbHx)
     (BYTE        0  padding)))   ;prevents overflow when
                                  ;exponentiating
```

To reverse the process, recovering a DESK from a DEKB, do the following:

1. Hash DiffusedDESK with SHA
2. XOR rgbHx with the hash, resulting in the OAEP key
3. Generate 119 bytes from RC4 using the OAEP key
4. XOR these bytes into DiffusedDESK, resulting in DESK The DESK, finally, may be used to decrypt other, DES-encrypted data outside the RSA envelope.

Finally, the entire DESKey format can be desribed:

```
(define-type DESKey
    ((BYTE                   1  keyBlockType)
     (BYTE                   2  keyVersion)
     (WORD                 334  reservedWord)
     (DWORD         0x0000CC01  algorithmIdentifier)
     (DWORD         0x00014800  keyExchAlgIdOfRSA)
     (RSA1KE                    DEKB)           ;RSA-encrypted DEKB
     (BYTE[8]                   InitVector)))   ;DES IV, as in FIPS 81
```

The notation (RSA1KE DEKB) refers to the RSA encryption of a DEKB. That is, a DEKB raised to the power of the public key modulo the RSA modulus found in an instance of RSA1K (all DESKeys are encrypted with RSA1Ks). To recover DEKB, one must know the modulus and the secret, RSA private key. Given DEKB, one must further undo OAEP as described to recover a DESK.

4I. RC4Key

This is the RSA Envelope for protecting RC4 keys. These keys are used in the International version of STT for bulk encryption of receipts, the GSO, authorization responses, and credential responses.

There is some similarity to the RSA Envelope format for DES keys and bank card account numbers, documented above. The first 12 bytes of an RC4Key are header data in the clear. Following the header data is an RSA-encrypted REKB and three bytes of salt. A REKB, in the RC4 context, contains a diffused RC4K, via OAEP, exactly as with DESKeys. An RC4K is an RC4 Plaintext Key Block. REKBs come in three lengths: 128, 96, and 64 bytes, equaling the size of the corresponding RSA modulus. Since nine bytes of the REKB are needed for OAEP and overflow protection, just as with DESKeys, RC4Ks come in the following sizes: 119, 87, and 55. Including the 12 bytes of overhead preceding and the three bytes of salt following the REKB, the total lengths of RC4 Keys are 143, 111, or 79 bytes. The size of an RC4Key is known implicitly, by the context of the allowed RSA key length used for its final encryption. First, types for the three kinds of RC4Ks and REKBs are defined, then the types of the three lengths of RC4Keys are defined.

RC4K

There are three different RC4Ks, corresponding to the three RSA modulus sizes for encrypting RC4 keys.

```
(define-type LengthAndKey
    ((DWORD         5)    ;STT RC4 keys are always 5 bytes long
     (BYTE[5] rgbKeyProper)))

(define-type RC4K1K   (LengthAndKey (BYTE[110] 0 padding)))
(define-type RC4K.75K (LengthAndKey (BYTE[78]  0 padding)))
(define-type RC4K.5K  (LengthAndKey (BYTE[46]  0 padding)))
```

REKB

There are three REKB's corresponding to the three RSA modulus sizes:

```
(define-type OAEPkeyPad
    ((BYTE[8]    rgbHx)                ;obscured OAEP key
     (BYTE    0 padding)))             ;RSA overflow protection (define-type REKB1K   ((BYTE[119] DiffusedRC4K) (OAEPkeyPad)))
(define-type REKB.75K ((BYTE[87]  DiffusedRC4K) (OAEPkeyPad)))
(define-type REKB.5K  ((BYTE[55]  DiffusedRC4K) (OAEPkeyPad)))
```

Each of these REKBs contains an rgbEKey and an OAEPkeyPad. The process for creating a REKB from a RC4K is analogous to the process for creating a DEKB from a DESK. The process is 1. Generate a fresh, 8-byte, random RC4 key -- the OAEP key
2. Generate 119 bytes from RC4 using the OAEP key
3. XOR these bytes into an RC4K, resulting in DiffusedRC4K
4. Hash DiffusedRC4K with SHA
5. XOR the OAEP key with the hash, resulting in rgbHx
6. Concatenate rgbHx and a byte of overflow space to DiffusedRC4K, resulting in a REKB To reverse the process, recovering a RC4K from a REKB, do the following:

1. Hash DiffusedRC4K with SHA
2. XOR rgbHx with the hash, resulting in the OAEP key
3. Generate 119 bytes from RC4 using the OAEP key
4. XOR these bytes into DiffusedRC4K, resulting in an RC4K The RC4K, finally, may be used to decrypt other, RC4-encrypted data outside the RSA envelope.

Finally, there are three kinds of RC4Key:

```
(define-type RC4KeyCommon
    ((BYTE              1   keyBlockType)
     (BYTE              2   keyVersion)
     (WORD          16718   reservedWord)
     (DWORD    0x0000D001   algorithmIdentifier)
     (DWORD    0x00014800   keyExchAlgIdOfRSA)))

(define-type RC4Key1K       ;total length = 143
    ((RC4KeyCommon    com)
     (RSA1KE       REKB1K)  ;RSA-encrypted REKB
     (BYTE[3]     rgbSalt))) ;Key salt (define-type RC4Key.75K     ;total length = 111
    ((RC4KeyCommon    com)
     (RSA.75KE   REKB.75K)  ;RSA-encrypted REKB
     (BYTE[3]     rgbSalt))) ;Key salt (define-type RC4Key.5K      ;total length = 79
    ((RC4KeyCommon    com)
     (RSA.5KE     REKB.5K)  ;RSA-encrypted REKB
     (BYTE[3]     rgbSalt))) ;Key salt
```

The notation (RSA... REKB) refers to the RSA encryption of a REKB. That is, a REKB raised to the power of the public key modulo the RSA modulus found in an RSA1K, RSA.75K, or RSA.5K. To recover REKB, one must know the modulus and the secret, RSA private key. Given REKB, one must further undo OAEP as described.

Microsoft Corporation's Secure Transaction Tec'~ `)gy       ~p://www.microsoft.com/windows/ie/stt.htm The final three bytes of any RC4Key are key salt used to complete an 8 byte RC4 key. The salt is in the clear. Its
purpose is to foil quick table lookup attacks that may be feasible with a 40-bit key.

5. TLV/TV Tag Space

This section contains symbolic names and numerical values for TLV and TV tags. STT-compliant software
should not use values that do not appear in this table. A range of keys is set aside for application-dependent use.
No version of STT will ever use these tags.

```
(TLV_NULL                    0x00000000)
(TV_DUALHASH                 0x00000021)   // for dual signature
(TV_HASH                     0x00000022)   // hash value
(TV_ROOTSIGNATURE            0x0000003F)   // root signature
(TV_SIGNATURE                0x00000040)   // signature on Cred
(TLV_SIGNED_DATA             0x00000041)   // signed data
(TLV_DATA                    0x00000042)   // binary data
(TLV_ENCRYPTED_DATA          0x00000043)   // encrypted data
(TLV_DUALSIGNED_DATA         0x00000045)   // dual-signed data
(TLV_KEYBLOCK                0x00000046)   // key exchange block
(TLV_AUTHINFO                0x00000047)   // authorization information
(TLV_CARDINFO                0x00000048)   // bank card info
(TLV_CARD_NONCE              0x0000004A)   // for card no.
(TLV_HASHED_DATA             0x0000004B)   // hashed, unsigned data
(TV_VERSION                  0x0000014C)   // version information
(TLV_DATA_FLAG               0x0000004D)   // message format info
(TV_DATA_FLAG                0x00000102)   // message format flag (TV_CMR_XID                  0x00000103)   // transaction id
(TV_MER_NAME                 0x00000104)   // merchant name
(TV_CMR_AMT                  0x00000105)   // amount req. by cardholder
(TLV_SHIP_INFO               0x00000106)   // shipping information
(TV_CHARGE_SLIP              0x00000107)   // charge slip
(TLV_DETAILS                 0x00000108)   // details
(TV_CARD_NAME                0x00000109)   // name as on card
(TV_EXP_DATE                 0x0000010A)   // card expiration date
(TLV_BILLING_INFO            0x0000010B)   // billing information
(TV_XID                      0x0000010D)   // transaction id
(TV_ISSUER                   0x0000010E)   // issuer name
(TV_RCPT_FLAG                0x0000010F)   // fail flag in receipt
(TV_RCPT_MSG                 0x00000110)   // message in receipt
(TLV_HASH_NONCE              0x00000111)   // for gso hashing
(TV_CRDRSP_CODE              0x00000112)   // cred response fail code
(TV_ATHRSP_CODE              0x00000113)   // auth response fail code
(TV_MER_AMT                  0x00000114)   // amount req. by merchant
(TV_RCPT_AMT                 0x00000115)   // amount chgd by merchant // Tags for credentials (all have the 13th bit set)

(TLV_CRDINFO                 0x00001001)   // Cred common info
(TV_CRDSERIALNUM             0x00001002)   // Cred serial number
(TV_CRDOWNER                 0x00001004)   // Cred owner name
(TV_CRDROOTNAME              0x00001008)   // name of the Cred root
(TV_CRDLEVEL                 0x00001011)   // level in trust hierarchy
(TV_CRDVALIDITY              0x00001012)   // dates of validity
(TV_CRDACCTHASH              0x00001014)   // hash of acct # etc
(TLV_CRDKEY                  0x00001018)   // public key value
(TLV_CRDKEYEX                0x00001020)   // extra public key
(TLV_SIGNERCRD               0x00001021)   // Cred of signer
(TV_CARDTYPE                 0x00001022)   // card type field
(TLV_MERACCTNUM              0x00001023)   // mer acct # with acquirer
(TV_CREATOR                  0x00001024)   // vendor identifier
(TV_ALTERNATE_NAME           0x00001025)   // alternate name
(TV_KEY_ID                   0x00001026)   // public key id
(TV_KEY_IDEX                 0x00001027)   // extra public key id
(TLV_INSTITUTION_ID          0x00001028)   // institution identifier
(TLV_CRD_CARDHOLDERSIG       0x00001802)   // cardholder sig Cred
(TLV_CRD_CARDHOLDEREXCH      0x00001803)   // cardholder key exch Cred
(TLV_CRD_MERCHANTSIG         0x00001804)   // merchant sig Cred
(TLV_CRD_MERCHANTEXCH        0x00001805)   // merchant key exch Cred
(TLV_CRD_ACQUIRERSIG         0x00001808)   // acquirer sig Cred
(TLV_CRD_ACQUIREREXCH        0x00001809)   // acquirer key exch Cred
(TLV_CRD_CAEXCH              0x00001813)   // bindery key exch Cred
(TLV_CRD_CARDISSSIG          0x00001814)   // issuer sig Cred
(TLV_CRD_CARDISSEXCH         0x00001815)   // issuer key exch Cred
(TLV_CRD_BRANDCASIG          0x00001818)   // brand sig Cred
(TLV_CRD_BRANDCAEXCH         0x00001819)   // brand key exch Cred // values for card types in TV_CARDTYPE (VISA                        0x2)
(RESERVED                    0x3)
(RESERVED                    0x4)
```

-58-

Microsoft Corporation's Secure Transaction Tech~~'ogy    ~~tp://www.microsoft.com/windows/ie/stt.htm

```
            (RESERVED              0x5)
            (RESERVED              0x6)

// Tags for credential requests (TLV_SIGKEY            0x00002001)    // sig key in Cred req
            (TLV_EXCHKEY           0x00002002)    // key-exch key in Cred req
            (TLV_SIGKEYEX          0x00002004)    // extra sig key in Cred req
            (TLV_EXCHKEYEX         0x00002008)    // extra key exch key // Tags for message components (TLV_GSO               0x00004001)
            (TLV_PI                0x00004002)
            (TLV_MERCHANT_REQUEST  0x00004004)
            (TLV_CRD_RESPONSE      0x00004080)
            (TLV_EMERGENCY         0x00004100)

// Tags for message types (TLV_CMRCRDREQ         0x00008002)
            (TLV_MERCRDREQ         0x00008003)
            (TLV_CMRCRDRSP         0x00008006)
            (TLV_MERCRDRSP         0x00008007)
            (TLV_PURORD            0x00008009)
            (TLV_ATHREQ            0x0000800A)
            (TLV_ATHRSP            0x0000800B)
            (TLV_RCEIPT            0x0000800C)

// Reserved Range; width = 4096

(MSAPP_RESERVED_FIRST  0x0000A000)
            (MSAPP_RESERVED_LAST   0x0000AFFF)

// Tag range reserved for VISA (TLV_VISA_FIRST        0x00020000)
            (TLV_VISA_LAST         0x0002FFFF)

// User-Defined Tag range -- not used by STT (TLV_USER_FIRST        0x00800000)
            (TLV_USER_LAST         0x008FFFFF)

// mask for extended TAGS for the future (TLV_EXTENDED          0x80000000)
```

6. Credentials

STT messages often contain credentials, also called just creds hereafter. An STT Credential is a binding between a banking account number, such as a cardholder bank card number or a merchant BIN number, and an RSA key-exchange key or RSA signature key. There is an analogy to certificates in other public-key systems. However, credentials are specialized to STT, they do not affirm general identity, and must not be mistaken for certificates.

Authentication policy is out-of-band for STT. In other words, it is completely up to banks and higher authorities in the trust tree to decide whether to issue credentials. When an acquiring bank receives a credential request from a merchant, the bank must satisfy itself that the merchant is in good standing before issuing an STT credential. Options for so doing include visiting the merchant face-to-face, checking credential request fields via telephone, fax, or email, and so on. Similarly, issuers must satisfy themselves that cardholder credential requests are valid. Options include a phone call and "mother's maiden name" questions, a separate paper mailer to an address on file containing the credential on diskette, or simply checking that the card is not reported lost or stolen. Since STT is transport-independent, it is important for applications to ensure that the credential is delivered to the party who requests it. STT addresses this requirement by packaging new credentials in credential response messages encrypted under the key-exchange key of the requestor. However, this alone does not prevent the requestor from being an impostor.

To reduce sizes of messages that do not need both kinds, key-exchange credentials and signature credentials are separate. A signature credential binds a signature key with an account number and places the pair in the trust hierarchy for an explicit time. A key-exchange credential binds a key-exchange key to an account number and allows others to encrypt data to the owner of the account with some assurance that the owner can be trusted with encrypted data. There are several different kinds of credentials. The Common Fields appear in all credentials. Other fields only appear in certain kinds of credentials. A credential is a TLV. Its detailed format follows:

CRD

-59-

Microsoft Corporation's Secure Transaction Technology      http://www.microsoft.com/windows/ie/stt.htm

```
(TLV_CRDTAG*                           ;see explanation below
  (TLV_DATA                            ;just a container
    (TV_CRDLEVEL  WORD)                ;see explanation below
    (TV_VERSION   (DWORD 0x00000110))
    (TV_CREATOR
      ((WORD   wReserved)  ;vendor # assigned by card brand, MS is 1
       (DWORD  dwAbilities)))          ;reserved for vendor
    (TV_CRDSERIALNUM   BYTE[16])       ;assigned by Cred creator
    (TV_CRDOWNER       Cstring)        ;"subject name"
    (TV_ALTERNATE_NAME CString)
    (TV_CRDVALIDITY
       ((DATE GoodFrom)
        (DATE GoodThru))))

CDF                                  ;CredType-dependent Fields
  SignatureSection)                    ;see explanations below
```

In this (somewhat abstracted, and therefore impure) notation, TLV_CRDTAG* refers to one of the following:

```
TLV_CRD_CARDHOLDERSIG   0x00001802   sig Cred for cardholder
TLV_CRD_CARDHOLDEREXCH  0x00001803   key exch Cred for cardholder
TLV_CRD_MERCHANTSIG     0x00001804   sig Cred for merchant
TLV_CRD_MERCHANTEXCH    0x00001805   key exch Cred for merchant
TLV_CRD_ACQUIRERSIG     0x00001808   sig Cred for acquirer
TLV_CRD_ACQUIREREXCH    0x00001809   key exch Cred for acquirer
TLV_CRD_CAEXCH          0x00001813   key exch Cred for bindery
TLV_CRD_CARDISSSIG      0x00001814   sig Cred for card issuer
TLV_CRD_CARDISSEXCH     0x00001815   key exch Cred for card issuer
TLV_CRD_BRANDCASIG      0x00001818   sig Cred for brand bindery
TLV_CRD_BRANDCAEXCH     0x00001819   key exch Cred for brand bindery
```

The TV_CRDLEVEL is a WORD containing the height of the credential in the trust tree. The height is 0 for leaf credentials, i.e., cardholders and merchants. Issuers and Acquirers have height 1, meaning they can sign the credentials of leaf entities. Brand Credential Authorities have height 2, meaning they can sign level-1 credentials, i.e., Acquirers and Issuers.

There are different Credential Type-Dependent Fields for each type of credential. The following streams are mutually exclusive: any credential may have only one of them.

CDF

For cardholder key-exchange credentials, CDF should be replaced by

```
((TV_CARDTYPE    WORD)        ;VISA is 2, all others are reserved
 (TV_CRDACCTHASH BYTE[20])    ;see explanation below
 (TV_KEY_ID      DWORD)       ;assigned by key generator / owner
 (TLV_CRDKEY 76 RSA.5K))
```

The TV_CRDACCTHASH contains the SHA hash of the concatenated card nonce, card account number, and expiration date string - in this specific order Cardholder Signature Crds have the following CDF:

```
((TV_CARDTYPE    WORD)        ;VISA is 2, all others are reserved
 (TV_CRDACCTHASH BYTE[20])    ;as with cardholder Key-exchange Creds
 (TV_KEY_ID      DWORD)       ;assigned by key generator / owner
 (TLV_CRDKEY 140 RSA1K))
```

Merchant signature Creds have the following CDF:

```
((TV_CARDTYPE    WORD)
 (TLV_MERACCTNUM)             ;identifies merchant to acquirer
 (TV_KEY_ID      DWORD)       ;assigned by key generator / owner
 (TLV_CRDKEY 140 RSA1K))
```

Acquirer, Issuer, and Brand Bindery creds all share the same CDF formats:

```
((TV_CARDTYPE       DWORD)
 (TLV_INSTITUTION_ID)         ;assigned by cred signer
 (TV_KEY_ID         DWORD)    ;assigned by key generator / owner
 (TV_CRDROOTNAME CString)     ;name of root of trust tree
 (TLV_CRDKEY 140 RSA1K))
```

The root credential authority key-exchange Cred has the following CDF:

```
((TLV_INSTITUTION_ID)
 (TLV_CRDKEY 140 RSA1K))
```

-60-

Microsoft Corporation's Secure Transaction Tec... gy  ...://www.microsoft.com/windows/ie/stt.htm Merchant key-exchange creds contain the following CDF fields:

```
((TV_CARDTYPE         DWORD)
 (TLV_MERACCTNUM)                 ;identifies merchant to acquirer
 (TV_KEY_ID           DWORD)      ;assigned by merchant
 (TLV_CRDKEY 108      RSA.75K))
 (TV_KEY_IDEX         DWORD)      ;assigned by acquirer
 (TLV_CRDKEYEX 140    RSA1K))
```

Merchant key-exchange creds include the public key-exchange key of the merchant's acquirer in the TLV_CRDKEYEX. This enables cardholder software to encrypt the PI to the acquirer and the GSO to the merchant. The acquirer normally signs this cred, vouching for both keys.

SignatureSection

Following the Credential Type-Dependent fields, a cred includes the creds, recursively, of its signing authorities and the signatures created by the signers. Software will verify the signature on the cred, then the signature on the signer's cred, and so on, until a signature by a root key is reached. A failure at any level of this recursive check must result in a failure to verify the leaf signature. See the cryptography section for details on PKCS #1 signature format.

```
((TLV_SIGNERCRD)                  ;recursively contains signer creds
 (TV_ROOTSIGNATURE BYTE[256]))    ;PKCS #1 sig
``` or, in the case of creds signed directly by the Root Credential Authority (normally, these are just sub-authority creds)

```
(TV_ROOTSIGNATURE BYTE[256])      ;PKCS #1 sig
```

7. Message Formats

An STT Transaction consists of 2 or, in one case, 4 messages. Every STT message can be assigned unambiguously to its transaction via a globally unique XID. Every STT message has its XID explicitly in a field, but the location of the XID is different in each message type. There are two kinds of messages: upward and downward. Upward messages flow from entities lower in the trust hierarchy to higher entities. Downward messages flow from higher authorities to lower. Downward messages may include piggybacked Emergency messages. Emergency messages support global root key replacement in the (very unlikely) case of root key compromise. A proper implementation of STT will ONLY replace the root key if the Emergency message is signed by the old root and if the user successfully types in the hash of the message from an external, trusted source such as Microsoft's support 800 number or an ad in a prominent newspaper. The signature on the Emergency message prevents denial of service attacks, and the hash check ensures that users get crucial information from a trusted source. All Message content fields are TLV/TVs.

A message may be either signed, dual-signed, or hashed, and finally, it may be encrypted. Any signing or hashing is always done before encryption. Every message component includes a TV_DATA_FLAG, which precedes the message content with a WORD specifying extra processing, as follows:

```
Bit#   Mask      Data Form
---------------------------------
1      0x0002    SIGNED
2      0x0004    ENCRYPTED
4      0x0010    DUALSIGNED
5      0x0020    HASHED
```

Bits 1 and 2 are mutually exclusive. That is, a message may be either signed, dual-signed, or hashed. All other bit mask positions are reserved for enhancements and future versions of STT.

Details are documented in the following sections. The following types are recognized:

Upward Messages

```
PURORD
MERCRDREQ
CMRCRDREQ
ATHREQ
```

Downward Messages

```
RCEIPT
ATHRSP
```

Microsoft Corporation's Secure Transaction Te    ogy                                   tp://www.microsoft.com/windows/ie/stt.htm

MERCRDRSP
CMRCRDRSP

Detailed Message Formats

7A. PURORD, or GSO/PI (Goods & Services Order / Payment Instruction)

Sent by cardholder to Merchant, this is an aggregate message containing a hashed GSO followed by a dual-signed PI. The hashed GSO contains a dual-signed GSO core and an unsigned Details field. The Details field is unsigned because secure signature software, without being excessively generic, cannot guarantee display of all formats that might be of interest to merchants and cardholders. Whereas an adversary could tamper with the unsigned Details field through its veil of RC4 encryption, he would not be able to construct a valid hash through that veil without knowing the complete plaintext of the signed GSO core and the Details field.

Typical software scenarios involve a client shopping application interacting with a compatible merchant server application. A shopping protocol must be defined between these applications. For example, the client application must supply a shipping address in a form that the merchant application can interpret. Shopping protocols are out of the scope of STT, but STT provides the Details field for application designers to put higher-level protocol information.

A dual signature is an RSA encryption of the hash of the concatenation of two hashes. A dual signature must be generated for the combined GSO and PI, and affixed to each. The same dual signature is affixed to the GSO and to the PI. The procedure is as follows:

```
1. Hash the GSO, producing H(GSO)
2. Hash the PI, producing H(PI)
3. Concatenate the two, in that order, producing
   H2 = H(GSO) | H(PI)
4. Hash H2, producing H(H2)
5. Sign H(H2), i.e., RSA-encrypt it with the private signature
   key, producing S(H(H2))
6. Affix the concatenation of H2 | S(H(H2)) to each of the
   GSO and the PI.
```

To check the dual signature, if you are a merchant and you have the supposed GSO plaintext, call it GSO',

```
1. Hash GSO', producing H(GSO')
2. Overwrite the first twenty bytes in the H2 received from
   the sender with your own H(GSO'), producing H2'
3. Hash H2', producing H(H2')
4. RSA-decrypt the S(H(H2)) received from the message sender,
   recovering H(H2))
5. Compare, bitwise, H(H2') with H(H2); if they match the
   signature is verified.
```

If you have the ansatz PI' plaintext (you are an acquirer), do the following:

```
1. Hash PI', producing H(PI')
2. Overwrite the LAST twenty bytes in the H2 received from
   the sender with your own H(PI'), producing H2''
3. Hash H2'', producing H(H2'')
4. RSA-decrypt the S(H(H2)) received from the message sender,
   recovering H(H2))
5. Compare, bitwise, H(H2'') with H(H2); if they match the
   signature is verified.
```

The dual signature is an optimization: it reduces the number of time-consuming signatures the cardholder must compute. Linking of the GSO and PI is accomplished by their sharing a single XID. The XID functions as a shared nonce in this context.

A successful purchasing transaction comprises four messages: a GSO/PI, an AuthRequest, an AuthResponse, and a Receipt. The XID for the transaction is generated by the cardholder when he or she initiates the transaction with the GSO/PI. As an optimization, the AuthResponse does not require the XID of the GSO/PI since it bears the additional XID generated by the merchant for the nested AuthRequest transaction. The outer transaction may be terminated by the merchant, in which case there will be no nested AuthRequest transaction and the merchant will send a negative receipt to the cardholder.

STT's strongest encryption secures the bank card number in the RSA envelope, which is packaged in the DESKey.

```
(TLV_PURORD
    (TV_VERSION (DWORD 0x00000110))
```

-62-

```
(TLV_GSO
    (TV_KEY_ID DWORD)                       ;from Merchant's cred
    (TV_DATA_FLAG (WORD 0x0014))            ;dualhashed and encrypted
    (TLV_KEYBLOCK 111 RC4Key)
    (TLV_ENCRYPTED_DATA                     ;RC4-encrypted data
    ;------- The data below is in plaintext form -------
        (TLV_HASHED_DATA
            (TLV_DATA                       ;"XDataToHash"
                (TLV_HASH_NONCE BYTE[16]))  ;foils known plaintext attack
                (TLV_DUALSIGNED_DATA
                    (TLV_DATA
                        (TV_CMR_XID         XID)    ;of this GSO/PI
                        (TV_MER_NAME        CString)
                        (TV_CRDSERIALNUM    BYTE[16])   ;from Mer cred
                        (TV_CMR_AMT         CMoney) ;authorized by Cmr
                        (TLV_CRD_CARDHOLDEREXCH)
                        (TV_CHARGE_SLIP     CString))  ;end of TLV_DATA
                    (TLV_CRD_CARDHOLDERSIG)
                    (TV_DUALHASH BYTE[40])          ;2 SHA hashes
                    (TV_SIGNATURE BYTE[128]))       ;sig of DUALHASH
                (TLV_DETAILS))                      ;unsigned supporting data
            (TV_HASH BYTE[20]))))           ;hash of "XDataToHash"
(TLV_PI
    (TV_KEY_ID DWORD)                       ;of acquirer from MerCrd
    (TV_DATA_FLAG (WORD 0x0014))
    (TLV_KEYBLOCK 148 DESKey)
    (TLV_ENCRYPTED_DATA                     ;DES-encrypted data
    ;------- The data below is in plaintext form -------
        (TLV_DUALSIGNED_DATA
            (TLV_DATA
                (TV_CMR_XID         XID)    ;of this GSO/PI
                (TV_MER_NAME        CString)    ;merchant name
                (TV_CRDSERIALNUM    BYTE[16])   ;from Mer Crd
                (TV_CMR_AMT         CMoney) ;authorized by Cmr
                (TLV_BILLING_INFO)          ;Application-defined
                (TV_CARD_NAME       CString)    ;Name as on Card
                (TV_EXP_DATE        CString)    ;from card, for hash chk
                (TLV_CARD_NONCE))   ;end of data;for hash check
            (TLV_CRD_CARDHOLDERSIG)
            (TV_DUALHASH BYTE[40])          ;2 SHA hashes
            (TV_SIGNATURE BYTE[128])))))    ;sig of DUALHASH
```

7B. Merchant Credential Request

```
(TLV_MERCRDREQ
    (TV_VERSION     (DWORD 0x00000110))
    (TV_KEY_ID      (DWORD AcquirerKeyId))
    (TV_DATA_FLAG (WORD 0x0024))
    (TLV_KEYBLOCK 148 DESKey)
    (TLV_ENCRYPTED_DATA                     ;DES-encrypted data
    ;------- The data below is in plaintext form -------
        (TLV_HASHED_DATA
            (TLV_DATA
                (TV_XID)
                (TV_CREATOR
                    ((WORD wReserved)       ;vendor #, MS is 1
                    (DWORD dwAbilities)))   ;reserved for vendor
                (TV_ALTERNATE_NAME CString)
                (TV_CRDOWNER (CString MerchantName))
                (TLV_DATA)                  ;Application-defined
                (TV_KEY_ID requestedKeyId)
                (TLV_SIGKEY RSA1K)
                (TLV_EXCHKEY RSA.75K))      ;end of TLV_DATA
            (TV_HASH (BYTE[20] HashOfData)))))
```

7C. Cardholder Credential Request

The bank card number goes in the (TLV_KEYBLOCK DESKey), which is the RSA envelope, as with a PI.

```
(TLV_CMRCRDREQ
    (TV_VERSION     (DWORD 0x00000110))
    (TV_KEY_ID      (DWORD IssuerKeyId))
    (TLV_DATA_FLAG (WORD 0x0024))
    (TLV_KEYBLOCK 148 DESKey)
    (TLV_ENCRYPTED_DATA                     ;DES-encrypted data
    ;------- The data below is in plaintext form -------
        (TLV_HASHED_DATA
            (TLV_DATA
                (TV_XID)
                (TV_CREATOR
                    ((WORD wReserved)       ;vendor #, MS is 1
                    (DWORD dwAbilities)))   ;reserved for vendor
```

```
            (TV_ALTERNATE_NAME  CString)
         (TLV_CARDINFO
            (TLV_BILLING_INFO)              ;Application-defined
            (TV_CARD_NAME (CString NameAsOnCard))
            (TV_EXP_DATE  (CString ExpirationDate))
            (TV_ISSUER    (CString IssuerName)))
         (TV_KEY_ID requestedKeyId)
         (TLV_SIGKEY RSA1K)
         (TLV_EXCHKEY RSA.5K))           ;end of TLV_DATA
     (TV_HASH (BYTE[20] HashOfData)))))
```

7D. Merchant Authorization Request (ATHREQ)

This is an aggregate message tied by XID to a GSO/PI and a Receipt. It contains a signed Authorization Request Prefix from the merchant to the acquirer as well as the forwarded PI encrypted by the cardholder to the acquirer. The PI contains the XID of the original GSO/PI. The purpose of the authorization request prefix is to allow the merchant to tell the acquirer the amount he thinks the cardholder has authorized from the GSO. This prevents cardholders and merchants defrauding each other. Some acquirers allow a small percentage difference in the two amounts to account for fluctuations in freight charges and taxes. The existence or width of this slop is entirely a bank policy issue.

```
(TLV_ATHREQ
    (TV_VERSION (DWORD 0x00000110))
    (TLV_MERCHANT_REQUEST
       (TV_KEY_ID     (DWORD AcquirerKeyId))
       (TV_DATA_FLAG (WORD  0x0006))
       (TLV_KEYBLOCK 148 DESKey)
       (TLV_ENCRYPTED_DATA            ;DES-encrypted data
    ;------ The data below is in plaintext form -------
          (TLV_SIGNED_DATA            ;auth request prefix
             (TLV_DATA
                (TV_XID) ;generated by merchant for nested transaction
                (TV_MER_AMT (CMoney MerchantRequestedAmount))
                (TLV_CRD_MERCHANTEXCH))
             (TLV_CRD_MERCHANTSIG)
             (TV_SIGNATURE (BYTE[128] MerchantSig)))))
    (TLV_PI))                          ;See PURORD section
```

7E. Merchant Receipt (RCEIPT)

Signed receipt from the merchant to the cardholder. The TV_RCPT_FLAG WORD holds a code that indicates whether the transaction were successful. The following values are defined for the TV_RCPT_FLAG:

```
         0 - Approved / Card OK
         1 - Declined
         2 - No Reply
         3 - Call Issuer
         4 - Amount Error
         5 - Expired Card
         6 - Invalid Transaction
         7 - System Error (TLV_RCEIPT
    (TV_VERSION    (DWORD 0x00000110))
    (TV_KEY_ID     (DWORD CardholderKeyId))
    (TV_DATA_FLAG (WORD  0x0006))
    (TLV_KEYBLOCK 76 RC4Key)
    (TLV_ENCRYPTED_DATA             ;RC4-encrypted data
    ;------ The data below is in plaintext form -------
       (TLV_SIGNED_DATA
          (TLV_DATA
             (TV_XID      (XID OfOriginalGSO))
             (TV_RCPT_AMT (CMoney))
             (TV_RCPT_FLAG (WORD ReceiptFlags))
             (TV_RCPT_MSG  (CString MessageFromMerchant)))
          (TLV_CRD_MERCHANTSIG)
          (TV_SIGNATURE (BYTE[128] MerchantSig)))))
```

7F. Acquirer Authorization Response (ATHRSP)

Signed authorization response from the acquirer to the merchant. This indicates to the merchant whether the cardholder's bank card is good. The XID of the original GSO is omitted, as an optimization, since the XID of the corresponding AuthRequest identifies the message uniquely. The following values are defined for the TV_ATHRSP_CODE:

```
         0 - Approved / Card OK
         1 - Declined
         2 - No Reply
```

-64-

```
                3 - Call Cardholder's issuing bank
                4 - Amount Error
                5 - Cardholder's card has expired
                6 - Invalid Transaction
                7 - System Error (TLV_ATHRSP
            (TV_VERSION    (DWORD x00000110))
            (TV_KEY_ID     (DWORD MerchantKeyId))
            (TV_DATA_FLAG  (WORDv 0x0006))
            (TLV_KEYBLOCK  111 RC4Key)
            (TLV_ENCRYPTED_DATA                ;RC4-encrypted data
        ;------- The data below is in plaintext form -------
            (TLV_SIGNED_DATA
                (TLV_DATA
                    (TV_XID (XID OfOriginalAuthRequest))
                    (TV_ATHRSP_CODE WORD)
                    (TLV_DATA))            ;Application-defined
                (TLV_CRD_ACQUIRERSIG)
                (TV_SIGNATURE (BYTE[128] AcquirerSig)))))
```

7G. Merchant Credential Response

The TV_CRDRSP_CODE WORD holds a code indicating whether the credential were issued. If the WORD is non-zero, credentials are not present in the response. The following values are defined for the WORD:

```
        0 - Credential issued; no error
        1 - Contact credentialing authority (one level up the tree)
        2 - Try again or contact credentialing authority
        3 - Expired Card (cardholder credential)
        4 - System Error; contact credentialing authority (TLV_MERCRDRSP
        (TV_VERSION    (DWORD 0x00000110))
        (TV_KEY_ID     (DWORD 0))
        (TV_DATA_FLAG  (WORD 0x0004))
        (TLV_KEYBLOCK  111 RC4Key)
        (TLV_ENCRYPTED_DATA                ;RC4-encrypted data
    ;------- The data below is in plaintext form -------
        (TV_CRDRSP_CODE WORD)
        (TV_XID  (XID OfCorrespondingCrdRequest))
        (TLV_CRD_MERCHANTSIG)
        (TLV_CRD_MERCHANTEXCH)))
```

7H. Cardholder Credential Response

The TV_CRDRSP_CODE WORD holds a code indicating whether the credential were issued. If the WORD is non-zero, credentials are not present in the response. The following values are defined for the WORD:

```
        0 - Credential issued; no error
        1 - Contact credentialing authority (one level up the tree)
        2 - Try again or contact credentialing authority
        3 - Expired Card (cardholder credential)
        4 - System Error; contact credentialing authority (TLV_CMRCRDRSP
        (TV_VERSION    (DWORD 0x00000110))
        (TV_KEY_ID     (DWORD 0))
        (TV_DATA_FLAG  (WORD 0x0004))
        (TLV_KEYBLOCK  79 RC4Key)
        (TLV_ENCRYPTED_DATA                ;RC4-encrypted data
    ;------- The data below is in plaintext form -------
        (TV_CRDRSP_CODE WORD)
        (TV_XID  (XID OfCorrespondingCrdRequest))
        (TLV_CARD_NONCE (BYTE[16] Nonce))
        (TLV_CRD_CARDHOLDERSIG)
        (TLV_CRD_CARDHOLDEREXCH)))
```

8. Cryptography

8A. Encryption for US/Canada only

This is work in progress. A high-level summary is that US/Canada versions of STT will use triple-DES (3DES) for all encrypted messages and will put Bank Card Account Numbers in the RSA envelope of one of the 3DES keys, just as with the International version.

Microsoft Corporation's Secure Transaction Tec~~~gy    ~~:://www.microsoft.com/windows/ie/stt.htm

8B. Encryption for the International Version

Two bulk encryption algorithms are used in International STT, RC4 and DES.

1. STT uses RC4 encryption with 8-byte keys, of which 3 bytes are salt, in the clear. See the RC4Key entry under the Low Level Composites section of this document. RC4 is a stream cipher; there are no pad bytes and the encrypted data is the same size as the plaintext data.

2. STT uses the Cipher Block Chaining (CBC) mode of DES, as defined in Federal Information Processing Standard FIPS 81. The key is 8 bytes long, with each byte having a parity bit in position 0. Thus there are 56 bits of random key. STT uses an all-zero byte Initialization Vector (IV). A maximum of 8 bytes of padding is applied to every plaintext message encrypted with DES to pad the message to a length that is a multiple of 8 bytes. Pad bytes have a value of

```
x = 8 - ((length of the plaintext) mod 8)
``` and the number of pad bytes is also x. For example, if the plaintext message was 17 bytes long, then each of the 7 bytes of padding contains the value 0x07. If x is 0, then there are 8 bytes, each containing 0x08. Padding is appended to the end of the plaintext before encryption and is stripped off after decryption.

8C. Signatures

STT uses PKCS #1 Encryption block formatting for RSA signatures. Total length is 128 bytes for the signature (1024-bit modulus), except for signatures by the root key, which are twice as long. The following are the plaintexts:

```
(TV_SIGNATURE
    (BYTE[20]   HashOfData)    ;Hash of the data being signed
    (BYTE       0)             ;parser initializer
    (BYTE[105]  0xff)          ;padding
    (BYTE       0x01)          ;recom. for private key encryptions
    (BYTE       0))            ;overflow protection for RSA (TV_ROOTSIGNATURE
    (BYTE[20]   HashOfData)    ;Hash of the data being signed
    (BYTE       0)             ;parser initializer
    (BYTE[233]  0xff)          ;padding
    (BYTE       0x01)          ;recom. for private key encryptions
    (BYTE       0))            ;overflow protection for RSA
```

8D. Hashing

All hashes in STT are 20-byte SHA hashes. See Federal Information Processing Standard FIPS 181 for the specification of SHA hashes.

9. Protocols

9A. Entities

```
1.  Cmr   - Cardholder
2.  Mer   - Merchant
3.  Iss   - Issuing Bank, signs Cmr Crds
4.  Acq   - Acquirer Bank, signs Mer Crds, also Payment server
5.  Mer   - Merchant
6.  Brand - Card Brand Binder, signs Iss Crds and Acq Crds
7.  Root  - Signs Brand Crds
```

9B. Messages

```
1.  TLV_PURORD
2.  TLV_MERCRDREQ
3.  TLV_CMRCRDREQ
4.  TLV_ATHREQ
5.  TLV_RCEIPT
6.  TLV_ATHRSP
7.  TLV_MERCRDRSP
8.  TLV_CMRCRDRSP
```

9C. Protocol Quick List

Microsoft Corporation's Secure Transaction Tec'  ˙gy  ɔ://www.microsoft.com/windows/ie/stt.htm

```
1.  Card Registration. Sequentially,
    a)   Cmr sends CMRCRDREQ to Iss
    b)   Iss sends CMRCRDRSP to Cmr 2.  Merchant Registration. Sequentially,
    a)   Mer sends MERCRDREQ to Acq
    b)   Acq sends MERCRDRSP to Mer 3.  Purchasing, Sequentially,
    a)   Cmr sends PURORD to Mer
    b)   Either
         (1)   Mer sends ATHREQ to Acq
         (2)   Acq sends ATHRSP to Mer
         (3)   Mer sends RCEIPT to Cmr
    c)   or
         (1)   Mer sends RCEIPT to Cmr
```

9D. Protocol Descriptions

Registration

Merchant Registers with Acquirer

Merchants (or their processing agents) must register with their Acquirers, which have been previously registered with their brand bindery, to be able to accept transactions on a particular brand's cards and pass them on their (the Merchant's) Acquirer.

IMPORTANT NOTE

The signer of the Merchant Credential must operate the payment server. This version of STT cannot separate the Credential Server for merchants from the Payment Server operated by the Acquirer. The reason is that the signer of the Merchant's Credential inserts its public key so the cardholder may encrypt PIs to the Acquirer Payment Server. This version of STT does not support export of the public key from the Payment Server. Nor import of a Payment Server public key into a Merchant Credential Server. Such key export and key import would be required to support separation.

Message Types

```
TLV_MERCRDREQ - the credential request message sent by the
    merchant to the brand bindery TLV_MERCRDRSP - the credential request response message sent by
    the acquirer back to merchant
```

Cardholder Registers with Card Issuer

Cardholders must register their cards. They do this by registering directly with an issuing bindery. This bindery is operated by their bank, or its agent (which could be the brand itself, for example Visa, MasterCard, American Express)

Message Types

```
TLV_CMRCRDREQ - the credential request message sent by the
    cardholder to the bindery that issues the cardholder's card
    credential TLV_CMRCRDRSP - the credential request response message sent by
    the bindery back to the cardholder for the registered card
```

Purchase and Authorization

This is the only two-step or nested transaction in STT.

Once all parties to a transaction are registered, initial distribution of credentials may occur. Distribution of credentials is NOT defined as part of the STT protocol because it is part of the basic (and variable) business relationships between participants (see Initial Credential Distribution, below).

Given that registration and credential distribution has taken place, a purchase transaction may occur. In STT, this is a three-way communication between a cardholder, a merchant, and an acquirer. The back-end communication between the acquirer and the banking system is neither defined nor affected by STT. It exists today.

The flow begins with a cardholder sending a request to a merchant to purchase goods or services. This includes the "Goods and Services Order" (GSO) and "Payment Instruction" (PI). The GSO is processed locally by the merchant, while the PI is passed on to the acquirer for authorization of the means of payment. SST does not specify the "back end" of the acquirer server, that is, the mechanism by which the acquirer processes the authorization request. Presumably, existing banking systems networks and protocols will be used. The response from the acquirer to the merchant is back in-band for STT, as is the final leg of the transaction, consisting of a receipt from merchant to cardholder.

Message types

>TLV_PURORD – The purchase request sent by the cardholder to the merchant. This includes both the GSO and the PI. See the selection on encryption for details on encryption and signing.

>TLV_ATHREQ – The PI, along with additional merchant information is sent from the merchant to the acquirer.

>TLV_ATHRSP – The result of processing the PI (accomplished synchronously, but out of the STT protocol specification) is sent from the acquirer to the merchant.

>TLV_RECEIPT – The receipt (as specified by the merchant) is sent back to the cardholder.

Settlement

TBD – not currently defined in the STT protocol

Credential Distribution

Credential format is defined by STT, but means of distribution, i.e., the transport, is not specified. Web-based scenarios are most likely and will be supported directly by Microsoft's implementations.

9E. Message Flows

Registration

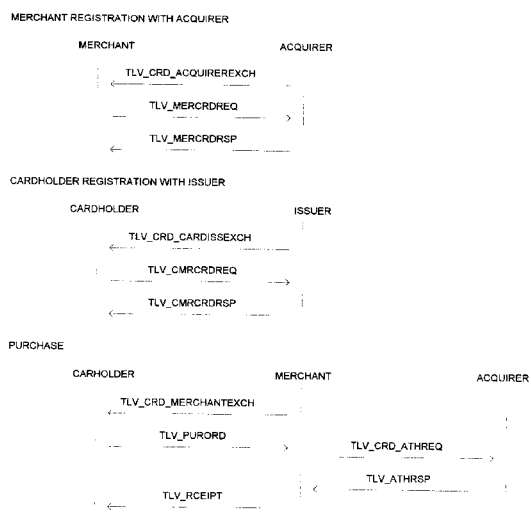

10. References

[1] "A method for Obtaining Digital Signatures and Public Key Cryptosystems" R.L.Rivest, A. Shamir, L. Adelman, MIT Laboratory for Computer Science and Department of Mathematics, S.L.Graham, R.L.Rivest ed. Communications of the ACM, February 1978 (Vol. 21, No. 2) pages 120-126.

[2] "Optimal Asymmetric Encryption", M.Bellare and P.Rogaway, Eurocrypt '94.

11. Appendix

ISO 4217 Currency Country Codes

This is not part of STT proper. Interpretation of these fields is an application issue. The following is a non-authoritative sample of popular currencies.

| | |
|---|---|
| 36 | Australian Dollar; 2; Australia, Christmas Is., Cocos Is., Keeling Is., Heard Is., McDonald Is., Kiribati, Nauru, Norfolk Is., Tuvalu |
| 40 | Austrian Schilling; 2; Austria |
| 56 | Belgium Franc; 0; Belgium |
| 124 | Canadian Dollar; 2; Canada |
| 156 | Yuan Renminbi; 2; China |
| 280 | Deutsche Mark; 2; Germany |
| 300 | Drachma; 0; Greece |
| 344 | Hong Kong Dollar; 2; Hong Kong |
| 348 | Forint; 2; Hungary |
| 360 | Rupiah; 2; Indonesia |
| 372 | Irish Pound; 2; Ireland |
| 376 | Shekal; 2; Israel |
| 380 | Italian Lira; 0; Italy; San Marino; Vatican City |
| 392 | Yen; 0; Japan |
| 410 | Won; 0; Korea; Rep. of Korea; South Korea |
| 442 | Luxembourg Franc; 0; Luxembourg |
| 484 | Mexican Nuevo Peso; 2; Mexico |
| 528 | Netherlands Guilder; 2; Netherlands |
| 620 | Portuguese Escudo; 0; Portugal |
| 724 | Apanish Peseta; 0; Spain; Andorra |
| 752 | Swedish Krona; 2; Sweden |
| 756 | Swiss Franc; 2; Switzerland; Liechtenstein |
| 818 | Egyptian Pound; 2; Egypt |
| 826 | Pound Sterling; 2; United Kingdom |
| 840 | U.S. Dollar; 2; United States; US; USA; U.S.; U.S.A.; Guam; American Samoa; Wake Is.; U.S. Misc. Pac. Is.; Panama Canal Zone; British Virgin Is.; Johnston Is.; Marianas Is.; Saipan; Midway Is. |

What is claimed is:

1. A machine for generating secure transaction data comprising:
   a computer processor;
   a secured technology module stored in a computer readable storage media, said secured technology module executable in said computer processor, said secured technology module configured to receive transaction data and audit data, said transaction data comprising a purchase order for goods or services including all information required by a merchant to fill said order and payment instructions, said audit data comprising a copy of at least a portion of said purchase order for goods or services, said secured technology module further configured to encrypt said transaction data into a first encryption format and encrypt said audit data into a second encryption format wherein said first encryption format is different than said second encryption format and each is adapted to be decrypted by a different party; and
   an order module in communication with said secured technology module, said order module configured to combine said encrypted transaction data and said encrypted audit data into a secure message.

2. The machine of claim 1 wherein said encrypted audit data in said secure message is only accessible by a network service provider.

3. The machine of claim 1 wherein said secured technology module is configured to encrypt said payment instructions into a third encryption format.

4. A secure system for monitoring secure commercial transactions comprising:
   a computer network interconnecting multiple computers; and
   a transaction auditing service executing in said computer network, said transaction auditing service configured to receive secure transaction messages from any one of said computers, said secure transaction messages configured to contain one or more encrypted transaction packets and at least one encrypted audit packet, wherein each of said encrypted transaction packets comprises a purchase order for goods or services including all information required by a merchant to fill said order and payment instructions and said at least one encrypted audit packet comprises a copy of at least a portion of said purchase order for goods or services selected from at least one of said encrypted transaction packets, and wherein said one or more encrypted transaction packets and said at least one encrypted audit packet are encrypted with different encryption formats each adapted to be decrypted by a different party, said transaction auditing service comprising:
   a first secured technology module configured to decrypt said at least one encrypted audit packet; and
   a decryption module in communication with said first secured technology module and said computer network, said decryption module configured to receive said secure transaction messages and direct said first secured technology module to decrypt said at least one encrypted audit packet, said decryption module further configured to forward said one or more encrypted transaction packets to one or more of said computers connected to said computer network.

5. The secure system of claim 4 wherein said decryption module is further configured to store said at least one decrypted audit packets in a database.

6. The secure system of claim 4 wherein said at least one decrypted audit packet contains one or more transaction identifiers, each of said transaction identifiers corresponding to one of said encrypted transaction packets, each of said transaction identifiers identifying one of said computers connected to said computer network.

7. The secure system of claim 6 wherein said decryption module is configured to use each of said transaction identifiers to route each of said one or more encrypted transaction packets to one of said computers connected to said computer network.

8. The secure system of claim 4 wherein said purchase order for goods or services and said payment instructions of said transaction packet are encrypted into different encryption formats.

9. The secure system of claim 8 wherein one or more of said computers connected to said computer network are configured to receive said one or more encrypted transaction packets, each of said computers further comprising a second secured technology module configured to decrypt said encrypted information relating to said order for goods and services in said one or more encrypted transaction packets.

10. The secure system of claim 9 wherein said second secured technology module is further configured to decrypt said encrypted payment instructions.

11. A secure system for monitoring secure commercial transactions comprising:
   a computer network interconnecting a plurality of computers;
   a consumer module executing in at least one of said interconnected computers, said consumer module configured to generate encrypted purchase order data including all information required by a merchant to fill said order, encrypted payment instruction data, and encrypted audit data comprising a copy of at least a portion of said purchase order data, wherein said encrypted purchase order data, said encrypted payment instruction data and said encrypted audit data are encrypted into different encryption formats each adapted to be decrypted by a different party;
   an auditor module executable in one of said interconnected computers, said auditor module configured to receive said encrypted audit data, said encrypted purchase order data and said encrypted payment instruction data, said auditor module including decryption routines and a database wherein said decryption routines direct said interconnected computer to decrypt said encrypted audit data, said auditor module further including storage routines which store copies of said decrypted audit data, said encrypted purchase order data and said encrypted payment instruction data in said database;
   a merchant module executing in at least one of said interconnected computers, said merchant module configured to receive and decrypt said encrypted purchase order data; and
   an acquirer module executing in at least one of said interconnected computers, said acquirer module configured to receive and decrypt said encrypted payment instruction data.

12. The secure system of claim 11 wherein said acquirer module and said merchant module both execute in one of said computers connected to said computer network.

13. The secure system of claim 11 wherein said consumer module is further configured to combine said encrypted purchase order data and said encrypted payment instruction data into an encrypted transaction packet.

14. The secure system of claim 13 wherein said consumer module is further configured to store said encrypted audit data in an encrypted audit packet.

15. The secure system of claim 14 wherein said auditor module is configured to forward said encrypted transaction packet to said merchant module.

16. The secure system of claim 15 wherein said merchant module is configured to forward said encrypted payment instructions to said acquirer module.

17. A secure system for monitoring secure commercial transactions comprising:

a computer network interconnecting multiple computers;

a first electronic mail module executing in a first one of said computers, said first electronic mail module configured to receive a secure transaction message from a second one of said computers, said secure transaction message containing an encrypted transaction packet and an encrypted audit packet, said encrypted transaction packet comprising a purchase order for goods or services including all information required by a merchant to fill said order and payment instructions, said encrypted audit packet comprising a copy of at least a portion of said purchase order for goods or services and a transaction identifier which identifies a third one of said computers, wherein said encrypted transaction packet and said encrypted audit packet are encrypted into different encryption formats each adapted to be decrypted by a different party; and a security means for decrypting said encrypted audit packets, said security means executing in said first one of said computers and in communication with said first electronic mail module, said security means utilizing said transaction identifier in said decrypted audit packet to properly route said encrypted transaction packet to said third one of said computers.

18. The secure system of claim 17 wherein said second one of said computers further comprises an order processing means for generating said encrypted transaction packet and said encrypted audit packet and for combining said encrypted transaction packet and said encrypted audit packet into said secure transaction message; and a second electronic mail module for sending said secure transaction message to said first electronic mail module.

* * * * *

UNITED STATES PATENT AND TRADEMARK OFFICE
CERTIFICATE OF CORRECTION

PATENT NO. : 5,903,652
DATED : May 11, 1999
INVENTOR(S) : MITAL

It is certified that errors appear in the above-identified patent and that said Letters Patent is hereby corrected as shown below:

ON THE TITLE PAGE:

Under [56] References Cited: Please add --5,882,737 10/1998 Ogram .......705/26--.

Under [56] References Cited: Please add --5,825,881 10/1998 Colvin ....... 380/24--.

Under [56] References Cited: Please add --5,809,144 9/1998 Sirbu et al. ... 380/25--.

In Column 2, Line 25: "Public key private key pair" should read --public key/private key pair--

Signed and Sealed this

Twenty-first Day of December, 1999

Attest:

Q. TODD DICKINSON

*Attesting Officer*    *Acting Commissioner of Patents and Trademarks*